(12) United States Patent
Nishikawa et al.

(10) Patent No.: US 8,567,260 B2
(45) Date of Patent: Oct. 29, 2013

(54) SENSOR-EQUIPPED BEARING FOR WHEEL

(75) Inventors: Kentarou Nishikawa, Iwata (JP); Toru Takahashi, Iwata (JP); Takayuki Norimatsu, Iwata (JP); Yujiro Ono, Iwata (JP); Kentaro Ikki, Iwata (JP)

(73) Assignee: NTN Corporation, Osaka (JP)

( * ) Notice: Subject to any disclaimer, the term of this patent is extended or adjusted under 35 U.S.C. 154(b) by 207 days.

(21) Appl. No.: 13/064,738

(22) Filed: Apr. 12, 2011

(65) Prior Publication Data

US 2011/0185823 A1 Aug. 4, 2011

Related U.S. Application Data

(63) Continuation of application No. PCT/JP2009/005251, filed on Oct. 8, 2009.

(30) Foreign Application Priority Data

| Oct. 15, 2008 | (JP) | ................................ 2008-266080 |
| Oct. 23, 2008 | (JP) | ................................ 2008-272654 |
| Dec. 10, 2008 | (JP) | ................................ 2008-314165 |
| Dec. 10, 2008 | (JP) | ................................ 2008-314166 |
| Feb. 3, 2009 | (JP) | ................................ 2009-022216 |

(51) Int. Cl.
*G01D 7/00* (2006.01)
*G01L 3/02* (2006.01)

(52) U.S. Cl.
USPC ................................ 73/862.041; 73/862.322

(58) Field of Classification Search
USPC ...................... 73/115.07, 862.041, 862.322
See application file for complete search history.

(56) References Cited

U.S. PATENT DOCUMENTS

| 6,508,128 | B2 * | 1/2003 | Bode ................................ 73/593 |
| 7,604,413 | B2 * | 10/2009 | Koike et al. ................... 384/448 |
| 7,762,128 | B2 * | 7/2010 | Ozaki et al. ................ 73/117.01 |
| 7,878,411 | B2 * | 2/2011 | Muranaka et al. ............ 235/492 |
| 8,167,497 | B2 * | 5/2012 | Ozaki et al. ................... 384/448 |
| 8,360,649 | B2 * | 1/2013 | Norimatsu et al. ........... 384/448 |

(Continued)

FOREIGN PATENT DOCUMENTS

| JP | 1-206113 | 8/1989 |
| JP | 2002-098138 | 4/2002 |

(Continued)

OTHER PUBLICATIONS

Japanese Office Action issued Nov. 20, 2012 in corresponding Japanese Patent Application No. 2008-314166.

(Continued)

*Primary Examiner* — Max Noori

(57) ABSTRACT

A sensor equipped wheel support bearing assembly includes rolling elements interposed between double row rolling surfaces defined respectively in outer and inner members in face-to-face relation with each other. One of the inner and outer members, which serves as a stationary member, has an outer diametric surface provided with three or more sensor units. Each of the sensor units includes a strain generating member having two or more contact fixing segments, fixed to the outer diametric surface of the stationary member in contact with therewith, and one or more strain sensors fitted to the strain generating member for detecting a strain occurring in the strain generating member. A load estimating section is provided for estimating a radial load and an axial load in the wheel support bearing assembly, from respective output signals of the sensors.

14 Claims, 44 Drawing Sheets

(56) References Cited

U.S. PATENT DOCUMENTS

| | | |
|---|---|---|
| 8,393,795 B2 * | 3/2013 | Aritake et al. ............... 384/489 |
| 2002/0012484 A1 | 1/2002 | Salou et al. |
| 2002/0061148 A1 | 5/2002 | Salou et al. |
| 2006/0153482 A1 | 7/2006 | Koike et al. |
| 2007/0065060 A1 | 3/2007 | Koike et al. |
| 2009/0120184 A1 | 5/2009 | Ozaki et al. |
| 2010/0135604 A1 | 6/2010 | Ozaki et al. |
| 2010/0262383 A1 | 10/2010 | Isobe et al. |
| 2010/0310202 A1 | 12/2010 | Takahashi et al. |

FOREIGN PATENT DOCUMENTS

| | | |
|---|---|---|
| JP | 2002-349558 | 12/2002 |
| JP | 2003-530565 | 10/2003 |
| JP | 2005-043336 | 2/2005 |
| JP | 2007-057299 | 3/2007 |
| JP | 2007-078597 | 3/2007 |
| JP | 2008-185497 | 8/2008 |
| JP | 2008-190706 | 8/2008 |
| JP | 2008-190707 | 8/2008 |
| WO | 01/77634 A2 | 10/2001 |
| WO | 2005/121731 A1 | 12/2005 |
| WO | 2009/101793 A1 | 8/2009 |

OTHER PUBLICATIONS

Chinese Office Action issued Jul. 23, 2012 in corresponding Chinese Patent Application No. 200980140912.6.

English Translation of the International Preliminary Report on Patentability mailed May 26, 2011 in corresponding International Patent Application PCT/JP2009/005251.

European Search Report dated Feb. 23, 2012 issued in corresponding European Patent Application No. 09820406.8.

Japanese Office Action issued Sep. 4, 2012 in corresponding Japanese Patent Application No. 2008-266080.

Japanese Office Action issued Sep. 4, 2012 in corresponding Japanese Patent Application No. 2008-314166.

Japanese Office Action issued Sep. 4, 2012 in corresponding Japanese Patent Application No. 2009-022216.

Japanese Decision of Rejection mailed Jan. 29, 2013, in corresponding Japanese Patent Application No. 2008-266080.

* cited by examiner

Fig. 8
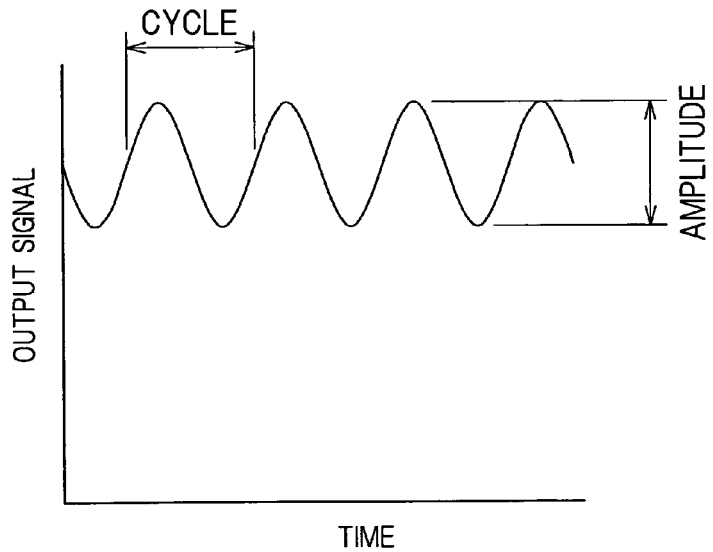
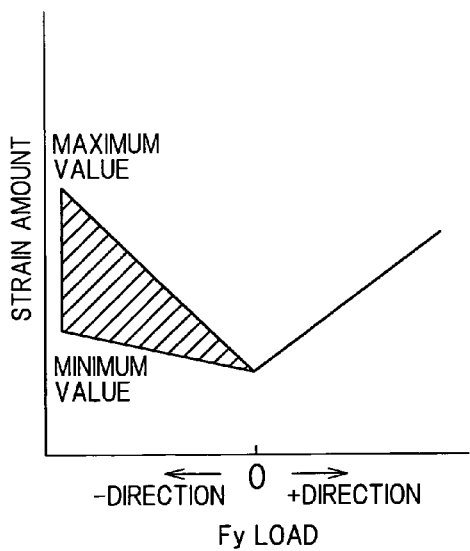
Fig. 9A
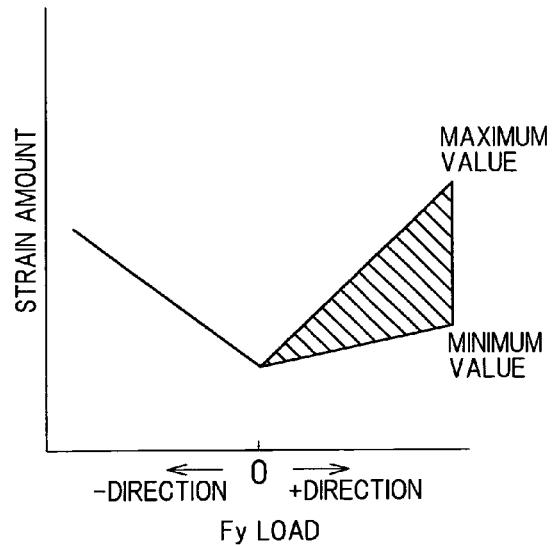
Fig. 9B

← OUTBOARD SIDE

INBOARD SIDE →

Fig. 27
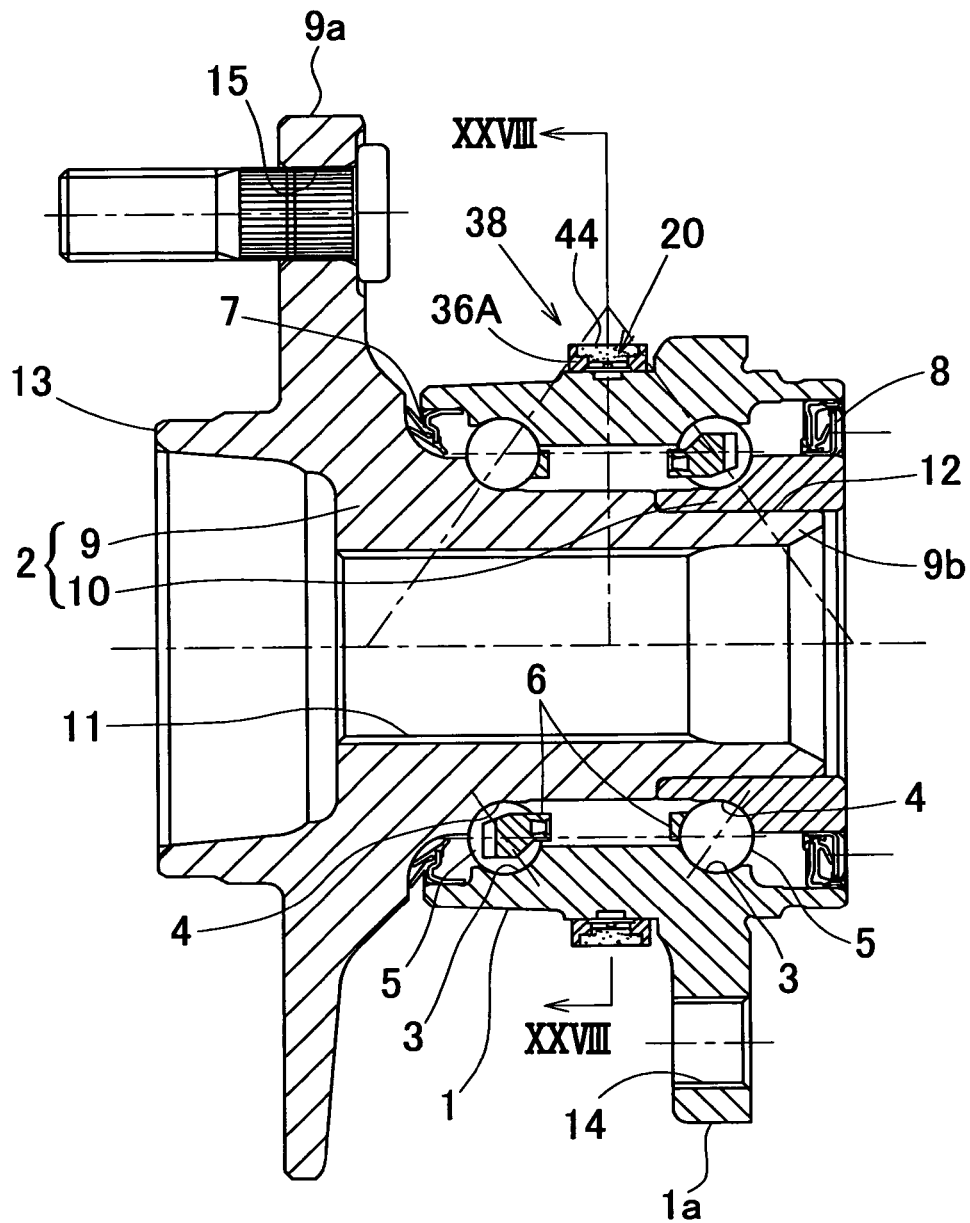
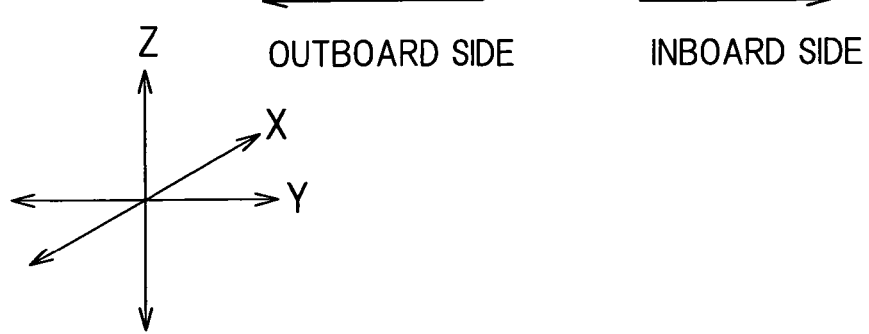

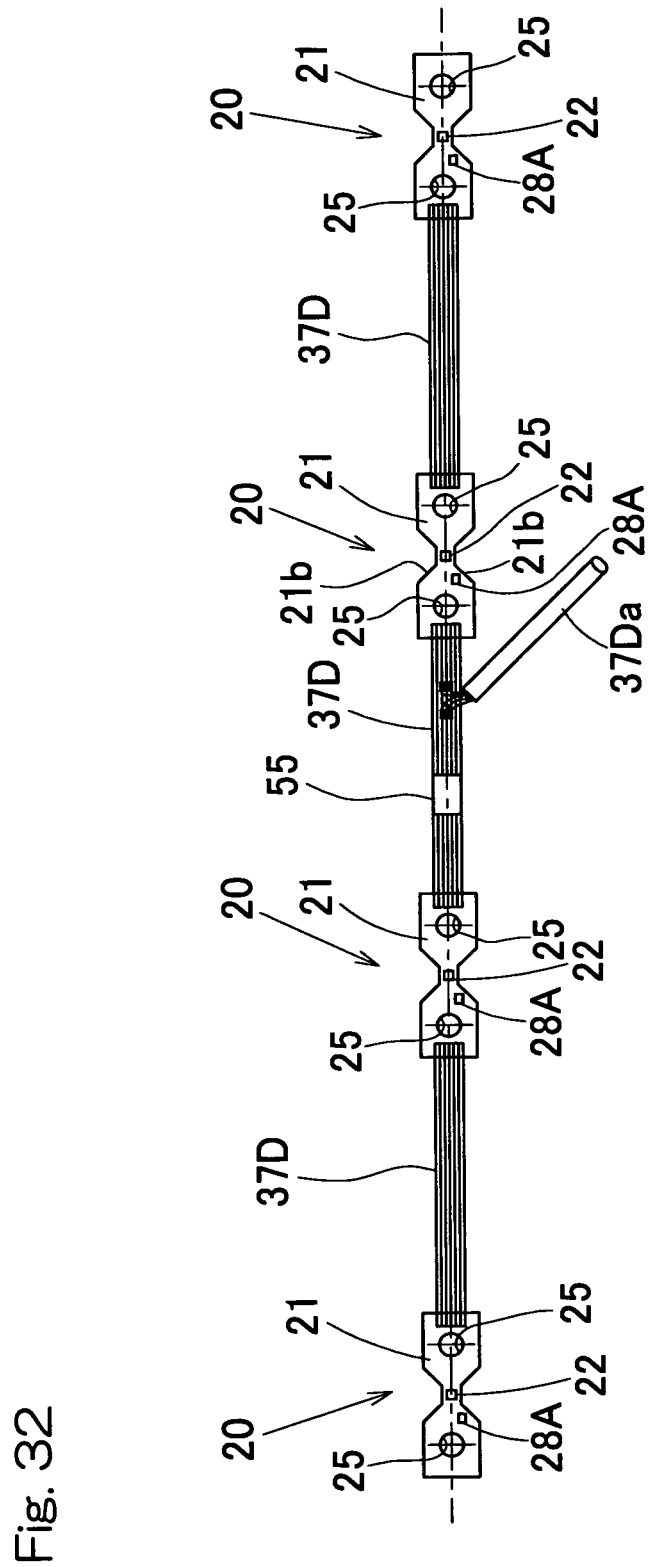

Fig. 40
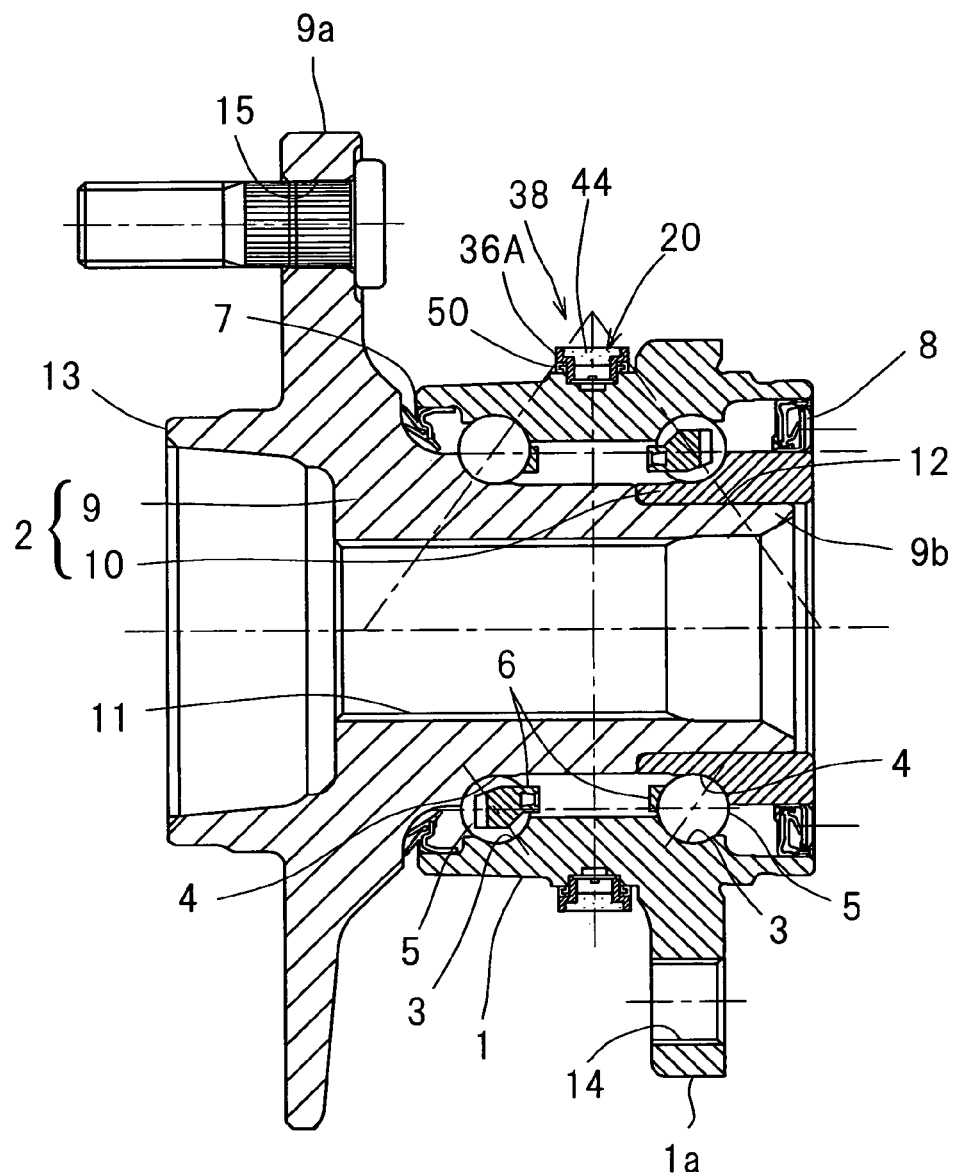
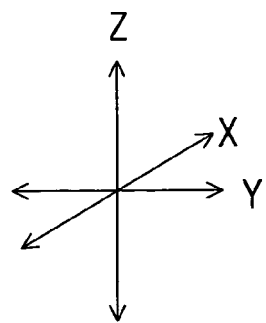

PRIOR ART

SENSOR-EQUIPPED BEARING FOR WHEEL

CROSS REFERENCE TO THE RELATED APPLICATION

This application is a continuation application, under 35 U.S.C §111(a) of international application No. PCT/JP2009/005251, filed Oct. 8, 2009, which claims priority to Japanese patent application No. 2008-266080, filed Oct. 15, 2008; Japanese patent application No. 2008-272654, filed Oct. 23, 2008; Japanese patent applications No. 2008-314165 and No. 2008-314166, both filed Dec. 10, 2008; and Japanese patent application No. 2009-022216, filed Feb. 3, 2009, the entire disclosures of which are herein incorporated by reference as a part of this application.

BACKGROUND OF THE INVENTION

Field of the Invention

The present invention relates to a wheel bearing with sensor, more specifically a sensor-equipped wheel support bearing assembly of a kind having a load sensor incorporated in a bearing unit of a vehicle wheel for detecting a load imposed thereon.

As a technique for detecting a load imposed on each of vehicle wheels of an automotive vehicle, a sensor-equipped wheel support bearing assembly has been suggested, in which a strain induced in a flange outer diametric surface of an outer ring that serves as a stationary ring of the bearing assembly, is detected. (See, for example, the Patent Document 1 listed below.) The sensor-equipped wheel support bearing assembly of a type, in which a strain gauge is pasted to an outer ring of the bearing assembly for detecting the strain, has also been suggested. (See, for example, the Patent Document 2 listed below.)

[Patent Document 1] JP Laid-open Patent Publication No. 2002-098138
[Patent Document 2] JP Published Int'l Application No. 2003-530565
[Patent Document 3] JP Laid-open Patent Publication No. 2007-057299

According to the technique disclosed in the Patent Document 1 referred to above, arrangement has been made to detect the strain generated as a result of deformation of a flange portion of the stationary ring. This technique, however, has such a problem that the deformation of the flange portion of the stationary ring tends to be accompanied by a hysteresis occurring in an output signal since a slippage occurs between a flange surface and a knuckle surface when a force exceeding the stationary frictional force acts.

For example, if the load acting on the wheel support bearing assembly in a certain direction becomes large, no slippage occurs at first between the stationary ring flange surface and the knuckle surface because the stationary frictional force is larger than the load, but in the event that the load exceeds a certain magnitude, it overcomes the stationary frictional force, resulting in slippage. When an attempt is made to estimate the load at a portion where the deformation takes place, a hysteresis such as shown in FIG. 62 appears in the output signal. Once this hysteresis appears, the detecting resolution will be lowered.

Also, where the strain gauge is pasted to the outer ring such as disclosed in the Patent Document 2 listed above, a problem is found in assemblability. Where a load Fz acting on the wheel support bearing assembly in an up and down direction, i.e., a direction generally perpendicular to the road surface is to be detected, the amount of strain is small because the amount of deformation of the stationary ring relative to the load Fz is small. Accordingly, with the technique now under discussion, the detecting sensitivity becomes so low that the load Fz cannot be detected accurately.

In an attempt to resolve the problems discussed hereinabove, the inventors of the present invention have developed a sensor equipped wheel support bearing assembly of the following structure. (See, for example, the Patent Document 3 listed above.) A bearing unit employed in the sensor equipped wheel support bearing assembly in the Patent Document 3 includes an outer member having an inner periphery formed with double row rolling surfaces, an inner member having an outer periphery formed with rolling surfaces held in face-to-face relation with the previously described rolling surfaces, and double row rolling elements interposed between the respective rolling surfaces in the outer and inner members and is operable to rotatably support a vehicle wheel relative to a vehicle body structure. One of the outer and inner members, which defines a stationary member, has an outer diametric surface provided with one or more sensor units. The sensor unit is made up of a strain generating member, which has two contact fixing segments fixed in contact with the outer diametric surface of the stationary member and a cutout defined therein at a location between those two contact fixing segments, and a strain sensor fitted to the strain generating member for detecting a strain occurring in the strain generating member.

It has, however, been found that where the sensor equipped wheel support bearing assembly is so constructed as hereinabove described, a change in output signal from the sensor is small relative to a change in load and for this reason, a detection error tends to become considerable due to a drift occurring in the output signal caused by temperature and/or noises. As a result thereof, in a condition in which a composite load (for example, a cornering force Fy and a vertical load Fz) is applied, it is difficult to calculate the load acting in each direction.

In view of the above, in the sensor equipped wheel support bearing assembly of the structure described above, an attempt has been made to provide the outer diametric surface of the stationary member, which is one of the outer and inner members, with one or more sensor unit pairs, each pair made up of two sensor units arranged having been spaced from each other in a direction circumferentially thereof a distance enough to have a 180° phase difference therebetween. The bearing assembly is further provided with a radial load estimating section for estimating a radial load acting in a direction radially of the bearing unit from a difference between respective output signals of the two sensor units of the sensor unit pairs and an axial load estimating section for estimating an axial load acting in a direction axially of the bearing unit from the sum of those output signals of the two sensor units of the sensor unit pairs.

However, where in this sensor equipped wheel support bearing assembly, the axial load and the vertical load are to be estimated by the utilization of the sensor unit pairs positioned at, for example, upper and lower locations of the outer diametric surface of the stationary member, when a load which is expected to become a driving force (a load acting in a forward and rearward direction of the wheel support bearing assembly), is applied, the mode of deformation of the stationary member as a whole tends to change under the influence brought about thereby. Therefore, an error in the estimated loads increases. Even where the axial load and the load expected to become the driving force are to be estimated by the utilization of the sensor units positioned at left and right locations of the stationary member, it is similarly affected.

Also, where the axial load and the radial load are to be estimated from the difference and the sum of the output signals by the utilization of the average value of sensor output signals of the sensor units, the detection error tends to increase under the influence of the temperature dependent drift and/or hysteresis. Where the load is to be estimated from the difference and the sum of the output signals by the utilization of amplitudes of the sensor outputs, only a load side of the stationary member, on which side a rolling element load acts, gives rise to amplitude and, therefore, when the sensor units are arranged at, for example, upper and lower locations of the outer diametric surface of the stationary member, it will become difficult to separate the loads into axial and radial loads.

SUMMARY OF THE INVENTION

An object of the present invention is to provide a sensor equipped wheel support bearing assembly capable of accurately detecting a load acting on a vehicle wheel under any load condition.

The sensor equipped wheel support bearing assembly according to the present invention is a wheel support bearing assembly for rotatably supporting a vehicle wheel relative to a vehicle body structure and including an outer member having an inner periphery formed with double row rolling surfaces, an inner member having an outer periphery formed with rolling surfaces held in face-to-face relation with the rolling surfaces of the outer member, and double row rolling elements interposed between the respective rolling surfaces in the outer and inner members, in which one of the inner and outer members, which serves as a stationary member, has an outer diametric surface provided with at least three or more sensor units; in which each of the sensor units includes a strain generating member, having two or more contact fixing segments fixed to the outer diametric surface of the stationary member in contact with such outer diametric surface, and one or more strain sensors fitted to the strain generating member for detecting a strain occurring in the strain generating member; and in which a load estimating section is provided for estimating a radial load, acting in a direction radially of the wheel support bearing assembly, and an axial load, acting in a direction axially of the wheel support bearing assembly, from respective output signals of the sensors of the three or more sensor units.

In this case, the output signal of each of the sensors may be inputted to the load estimating section after having been separated by an output signal separator into a direct current component and an alternating current component. The load estimating section may estimate the load acting in each of those directions from a linear equation in which using amplitude values of the direct and alternating current components as variables, those variables are multiplied by a correction coefficient determined for each of the loads in the various directions that are estimated for each of the variables. The correction coefficient referred to above can be determined by means of a series of experiments and/or analyses. For the variables, other than the direct current component and the alternating current component (amplitude value), two or more of an average value of the sensor output signals, an amplitude value and the absolute value may be employed and, also, two or more out of a group including those values plus the direct current component and the alternating current component (amplitude value) may be employed.

When a load acts on the wheel support bearing assembly or between the vehicle wheel tire and the road surface, such load is applied to the stationary member (such as, for example, the outer member), accompanied by deformation. In this construction, since the two or more contact fixing segments of the strain generating member of the sensor unit are fixed to the outer diametric surface of the outer member in contact therewith, the strain appearing in the outer member is apt to be transmitted to the strain generating member after having been amplified and such strain can be detected by the sensor with a high sensitivity and, accordingly, the load can be estimated accurately.

Also, since the use is made of the load estimating section for estimating the radial load, acting in a direction radially of the wheel support bearing assembly, and the axial load, acting in a direction axially of the wheel support bearing assembly, from the output signal of the sensor of the three or more sensor units, the radial load (the load Fx expected to become the driving force or the vertical load Fz) and the axial load Fy can be accurately detected with a high sensitivity.

In particular, if the use is made of the output signal separator for separating the output signal of the sensor of each of the sensor units into the direct current component and the alternating current component and then inputting them to the load estimating section and the load estimating section estimates the load acting in each of those directions from a linear equation in which using the direct current component and alternating current component (amplitude values) as variables, those variables are multiplied by a correction coefficient determined for each of the loads in the various directions that are estimated for each of the variables, the process of correcting the sensor output signal in the load estimating section can be finely performed for each of the direct current component and the alternating current component and, therefore, the load can be detected further accurately.

In the present invention, the load estimating section may include a radial load estimating section for estimating a radial load, acting in a direction radially of the wheel support bearing assembly, from a difference between the respective output signals of the sensors in two of the three or more sensor units and an axial load estimating section for estimating an axial load, acting in a direction axially of the wheel support bearing assembly, from a sum of the respective output signals of the sensors of such two of the three or more sensor units.

In the present invention, two of the three or more sensor units may be arranged on upper and lower surface areas of the outer diametric surface of the stationary member, which correspond respectively to top and bottom positions relative to a tire tread surface or a tire periphery in contact with a road surface, in which case the radial load estimating section estimates a vertical load, acting on the wheel support bearing assembly, from a difference between the respective output signals of the sensors of such two sensor units. In the case of this construction, the vertical load Fz can be accurately detected with a high sensitivity.

In the present invention, two of the three or more sensor units may be arranged on left and right surface areas of the outer diametric surface of the stationary member, which correspond respectively to forward and rearward positions relative to a tire tread surface, in which case the radial load estimating section estimates a load, expected to become a driving force, from a difference between the respective output signals of the sensors of such two sensor units. In the case of this construction, the load Fx expected to become the driving force can be accurately detected with a high sensitivity.

In the present invention, the radial load estimating section may include a correcting section for correcting a estimated value, given thereby, with an estimated value given by the axial load estimating section. The amount of deformation of the stationary member relative to the radial load (the vertical load Fz and the load Fx expected to become the driving force) of the wheel support bearing assembly is apt to be affected by the axial load Fy because it is very small as compared with the amount of deformation relative to the axial load Fy. Accordingly, if the value estimated by the radial load estimating section is corrected with a value estimated by the axial load, the radial load can be further accurately estimated.

In the present invention, two of the three or more sensor units may be arranged on upper and lower surface areas of the outer diametric surface of the stationary member, which correspond respectively to top and bottom positions relative to a tire tread surface, in which case an axial load direction determining section is provided for determining a direction of the axial load, acting in a direction axially of the wheel support bearing assembly, from amplitudes of the respective output signals of the sensors of such two sensor units.

In the case of the above construction, with no need to employ any extra sensor dedicated to determine the direction, the direction of the axial load Fy can be determined.

In the present invention, a temperature corrector may be provided for correcting the sensor output signal of the sensor unit in dependence on a temperature of the wheel support bearing assembly or an ambient temperature thereof.

Once the temperature of the wheel support bearing assembly changes due to heat emission incident to rotation of the wheel support bearing assembly and/or the ambient temperature, the sensor output signal of the sensor unit changes by the effect of thermal expansion even though no load change, and therefore, the influence of the temperature remains in the load detected. Accordingly, the use of the temperature corrector for correcting the sensor output signal of the sensor unit in dependence on the temperature of the wheel support bearing assembly or the ambient temperature is effective to reduce the detection error brought about by temperature.

In the present invention, the sensor equipped wheel support bearing assembly may further include a sensor temperature sensor fitted to the strain generating member for detecting a temperature of a site of installation of the strain sensor; a rolling surface temperature sensor fitted to a circumferential location of the stationary member in the vicinity of the sensor unit for detecting a temperature in the vicinity of the rolling surface; and a temperature corrector for correcting the output signal of the sensor of the sensor unit with respective outputs of the sensor temperature sensor and the rolling surface temperature sensor; in which case the load estimating section estimates the load acting on the wheel support bearing assembly or the wheel tire from a signal which has been corrected by the temperature corrector. The stationary member referred to above may be, for example, the outer member. The circumferential location in the vicinity of the sensor unit provided with the rolling surface temperature may be either the same circumferential location as the sensor unit or in the vicinity thereof.

In the load estimating section for estimating the load, the output signal of the sensor of the sensor unit is corrected by the temperature corrector from respective outputs of the sensor temperature sensor, fitted to the strain generating member of the sensor unit for detecting the temperature of the site of installation of the sensor, and of the rolling surface temperature sensor, fitted to the circumferential location of the stationary member in the vicinity of the sensor unit for detecting the temperature in the vicinity of the rolling surface. Since the load acting on the wheel support bearing assembly or the wheel tire can be estimated from the signal so corrected, correction of the detecting error brought about by the temperature difference between the inside and the outside of the wheel support bearing assembly makes it possible to reduce the influence of the change in the external temperature and/or in heat emission inside the wheel support bearing assembly brought about by the change in load, allowing the load acting on the wheel support bearing assembly or the wheel tire surface to be stably detected with a high accuracy.

In the present invention, the rolling surface temperature may be employed in a number equal to the number of the sensor units employed, in which case the rolling surface temperature sensor is provided in accord with the circumferential location and the phase of the sensor units in the stationary member. In the case of this construction, the temperature of the vicinity of the rolling surface corresponding to each of the sensor units can be detected and, therefore, the temperature correction with the load estimating section can be performed further accurately, allowing the accuracy of detection of the load to be correspondingly increased.

In the present invention, the temperature corrector may correct the output signal of the sensor of the sensor unit in dependence on a difference between an output of the sensor temperature sensor and an output of the rolling surface temperature sensor, and the amount of correction is determined according to a linear approximate relational equation which has been formulated beforehand using the difference between the respective outputs of the sensor temperature sensor and the rolling surface temperature sensor. In the case of this construction, the amount of offset superimposed on the output signal of the sensor of the sensor unit, that is, the thermal strain resulting from the temperature gradient from the interior to the surface of the stationary member can be reduced sufficiently and as a result, the precision of the load estimated value cal also be increased.

In the present invention, the sensor equipped wheel support bearing assembly may further include a temperature sensor fitted to the strain generating member for detecting a temperature of a site of installation of the strain sensor; a heat insulating material interposed between the sensor unit and an ambient air in around such sensor unit; and a temperature corrector for correcting the sensor output signal of the sensor unit with an output of the temperature sensor; in which case the load estimating section estimates a load, acting on the wheel support bearing assembly or the wheel tire, from a signal which has been corrected by the temperature corrector. The stationary member referred to above may be, for example, the outer member. While it is desirable to dispose the heat insulating material to shield the sensor unit from the ambient air, where an extra material, for example, a protective covering as will be described later is employed, the sensor unit may be shielded from the ambient air by the extra material such as the protective covering in cooperation with the heat insulating material.

Since the use is made of the temperature sensor fitted to the strain generating member of the sensor unit for detecting the temperature of the site of installation of the strain sensor and since in the load estimating section, the output signal of the strain sensor is corrected by the temperature corrector in dependence on the output of the temperature sensor so that the load acting on the wheel support bearing assembly or the wheel tire can be estimated from such corrected signal, in the event that the temperature of the wheel support bearing assembly changes because of heat emission incident to the rotation of the wheel support bearing assembly and/or the ambient environment, any change in the output signal of the strain sensor resulting from, for example, the difference in coefficient of linear expansion between the outer member and the sensor unit can be corrected.

In such case, if the heat insulation between the sensor unit and the ambient air is insufficient, the resistance to heat dissipation changes depending on the condition of the ambient air and/or the condition around the strain sensor (such as, for example, the air flow and the presence or absence of water deposition) and therefore, the temperature of the outer member and the temperature detected by the temperature sensor displace from each other, accompanied by a displacement between the corrected value, calculated by the load estimating section and the actual condition of temperature expansion, to such an extent that an error may occur in the load finally estimated by the load estimating section. In the sensor equipped wheel support bearing assembly above mentioned, since the heat insulating material is interposed between the sensor unit and the ambient air therearound, the previously described influence of the outside environment can be minimized without being affected by the condition of the ambient air and the water deposition, allowing the load acting on the wheel support bearing assembly or the wheel tire tread or contact surface to be stably detected with a high accuracy.

In the present invention, the sensor units, a signal processing IC for processing the output signal of the sensors and a wiring system for the sensors and the signal processing IC may be arranged on an inner side of an annular protective covering that is fitted to a peripheral surface of the stationary member, in which case the protective covering has an opening defined at sites of installation of the sensor units to permit the sensor units to be exposed, and the opening is sealed by the heat insulating material.

In the case of the above construction, the protective covering protect not only the sensor of the sensor unit and the wiring system from contact with foreign matters such as, for example, stepping stones, but also minimizes the possibility that the sensor unit may be affected by influences brought about by external environments such as, for example, the ambient air and/or water.

In the present invention, the sensor equipped wheel support bearing assembly may further include a first load estimating section for calculating and estimating a load, acting on the wheel support bearing assembly, using an average value of the output signals of the sensors; a second load estimating section for calculating and estimating a load, acting on the wheel support bearing assembly, using an amplitude value of the output signals of the sensors, or the amplitude value and the average value; and an output selector for selectively switching one of the loads estimated by the first and second load estimating section in dependence on a vehicle wheel rotating speed.

Since the use is made of the first load estimating section for calculating and estimating a load, acting on the wheel support bearing assembly, using an average value of the output signals of the sensors, and the second load estimating section for calculating and estimating a load, acting on the wheel support bearing assembly, using an amplitude value of the output signal of the sensor, or the amplitude value and the average value and since the output selector is also provided in the sensor equipped wheel support bearing assembly for selectively switching one of the loads estimated by the first and second load estimating sections in dependence on a vehicle wheel rotating speed, during halt or low speed rotation of the vehicle wheel the estimated load value of the first load estimating section is outputted, which can be obtained from the average value that can be determined without the time averaging process being performed, and as a result, the length of the detecting time can be shortened. Also, when the vehicle wheel is under a normal speed rotating condition, the average value and the amplitude value of the sensor output signal can be accurately calculated and, therefore, when the estimated load value of the second load estimating section, which can be obtained from the amplitude value, or the average value and the amplitude value, is outputted, the error of the estimated load value can be reduced and the delay in detecting time can be sufficiently reduced.

As a result thereof, the load acting on the vehicle wheel can be accurately estimated and the load signal detected can be outputted with no delay. For this reason, the response and the controllability in vehicle control utilizing the load signal so detected can be increased and the safety and the travelling stability can be increased.

In the present invention, when the vehicle wheel rotating speed is lower than a predetermined lowermost speed, the output selector may select and output the load estimated by the first load estimating section. The lowermost speed referred to above may be of any arbitrarily selected speed, but is preferably chosen to be of a value approximately equal to, for example, the human walking speed.

When the vehicle wheel is halted or is rotating at a low speed, calculation of the amplitude value requires a length of time corresponding to one cycle of the sensor output and, hence, the delay in time in outputting the estimated load value increased, but the load signal detected can be outputted, with no delay, from the first load estimating section capable of calculating the load value only from the average value.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 8 is a chart showing the waveform of an output signal from a sensor unit employed in the sensor equipped wheel support bearing assembly;

FIG. 9A is a chart showing the relation between the difference in sensor output signal amplitude between the maximum and minimum value and an axial load at a upper surface area of an outer diametric surface of the outer member;

FIG. 9B is a chart showing the relation between the difference in sensor output signal amplitude between the maximum and minimum value and an axial load at a lower surface area of an outer diametric surface of the outer member;

FIG. 27 is a sectional view showing the sensor equipped wheel support bearing assembly according to a fifth preferred embodiment of the present invention;

FIG. 32 illustrates electronic component parts built in the sensor assembly, which are shown as developed in a plane;

FIG. 40 is a sectional view showing the sensor equipped wheel support bearing assembly according to a tenth preferred embodiment of the present invention.

DESCRIPTION OF PREFERRED EMBODIMENTS

A first embodiment of the present invention will be hereinafter described in detail with particular reference to FIGS. 1 to 11. This first embodiment is directed to an inner ring rotating model of a third generation type and is applied to a wheel support bearing assembly for the support of a vehicle drive wheel. It is to be noted that in the description that follows, one side of a vehicle body structure laterally away from the longitudinal center thereof in a condition, in which the bearing assembly is mounted on the vehicle body structure, is referred to as "outboard" whereas the opposite side of the vehicle body structure laterally close towards the longitudinal center thereof in the same condition is referred to as "inboard".

Figure 1:
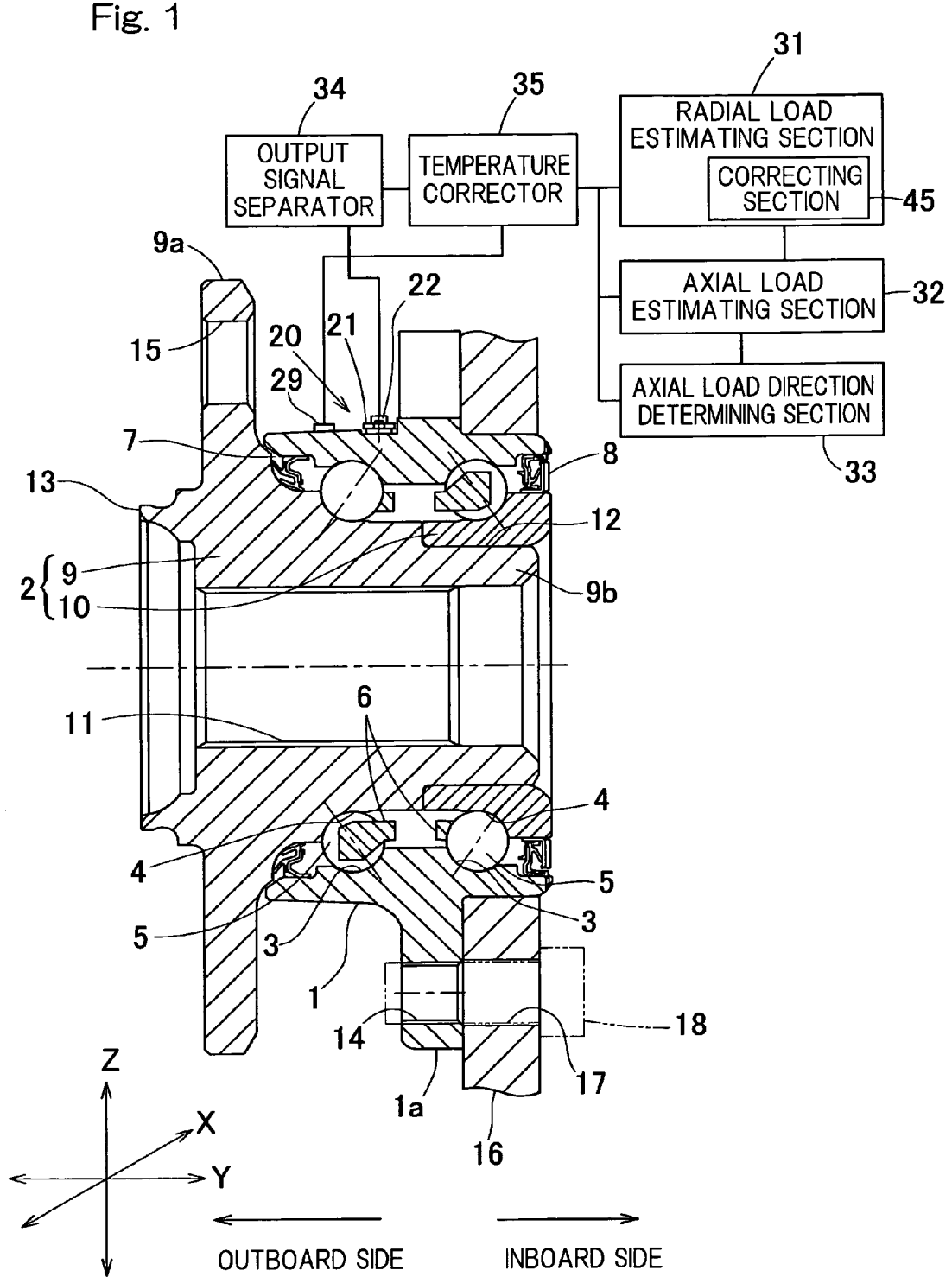
FIG. 1 is a diagram showing a sectional view of a sensor equipped wheel support bearing assembly according to a first preferred embodiment of the present invention, shown together with a block diagram of a conceptual construction of a detecting system therefor.

A bearing unit in this wheel support bearing assembly includes, as shown in FIG. 1 in a sectional view, an outer member 1 having an inner periphery formed with a plurality of rolling surfaces 3, an inner member 2 having an outer periphery formed with rolling surfaces 4 in face-to-face relation with the respective rolling surfaces 3, and a plurality of rows of rolling elements 5 interposed between the plurality of those rolling surfaces 3 and 4. This wheel support bearing assembly is rendered to be a double row angular contact ball bearing design, in which the rolling elements 5 are employed in the form of balls and retained by a retainer 6 employed for each of the rows. The rolling surfaces 3 and 4 referred to above have a sectional shape representing an arcuate shape and are so formed as to permit the ball contact angles to assume a back-to-back relation to each other. Opposite ends of a bearing space delimited between the outer member 1 and the inner member 2 are sealed respectively by sealing devices 7 and 8.

The outer member 1 is of a type that serves as a stationary member and is of one piece construction including a vehicle body fitting flange 1a defined in an outer periphery thereof and adapted to be secured to a knuckle 16 of a suspension system (not shown) of an automotive vehicle. The vehicle body fitting flange 1a has internally threaded mounting holes 14 defined therein at a plurality of locations spaced in a direction circumferentially thereof and, therefore, the vehicle body fitting flange 1a can be secured to the knuckle 16 when knuckle bolts 18 inserted from an inboard side into respective bolt insertion holes 17 defined in the knuckle 16 are threaded into the corresponding mounting holes 14. The mounting holes 14 may be bolt insertion holes, in which case fixing nuts (not shown) are used for fastening the knuckle bolts 18.

The inner member 2 is of a type that serves as a rotating member and includes a hub unit 9 having a wheel mounting hub flange 9a formed therein, and an inner ring 10 mounted on an outer periphery of an inboard end of a hub axle 9b of the hub unit 9. The rolling surfaces 4 referred to above are formed respectively in the hub unit 9 and the inner ring 10. An outer periphery of an inboard end of the hub unit 9 is provided with an inner ring mounting surface 12 that is stepped radially inwardly to render it to have a reduced diameter, with the inner ring 10 mounted on this inner ring mounting surface 12. The hub unit 9 has a center portion formed with a throughhole 11 extending completely therethrough. The hub flange 9a is provided with a plurality of press fitting holes 15 defined at respective circumferential locations, spaced in a direction circumferentially thereof, for receiving corresponding hub bolts (not shown). In a periphery of a root portion of the hub flange 9a of the hub unit 9, a cylindrical pilot portion 13 for guiding a vehicle wheel and a brake component protrudes (not shown) towards the outboard side.

Figure 2:
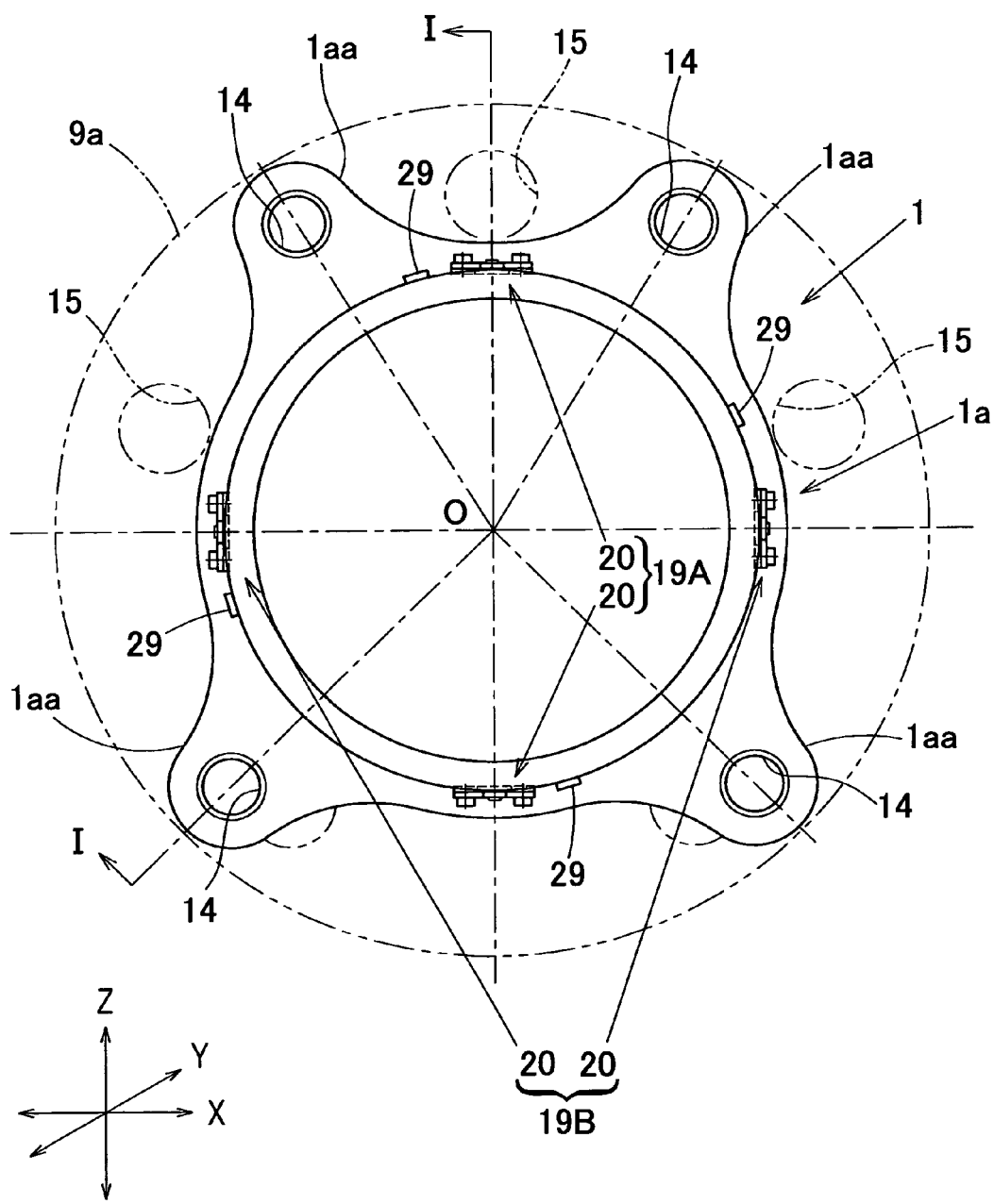
FIG. 2 is a front elevational view showing an outer member, employed in the sensor equipped wheel support bearing assembly, as viewed from an outboard side.

FIG. 2 illustrates a front elevational view showing the outer member 1 of the wheel support bearing assembly as viewed from the outboard side. It is to be noted that FIG. 1 illustrates a cross sectional view taken along the arrow headed line I-I in FIG. 2. As best shown in FIG. 2, the vehicle body fitting flange 1a referred to previously has projecting lugs 1aa at respective circumferential locations where the corresponding mounting holes 14 are defined, which protrude in a direction radially outwardly beyond the remaining area.

The outer member 1 serving as the stationary member has an outer diametric surface on which three or more sensor units 20 are mounted. In the instance as shown, two sensor unit pairs each pair comprised of two sensor units 20 are employed. The two sensor units 20 forming each of the first and second sensor unit pairs 19A and 19B are positioned at respective circumferential locations on the outer diametric surface of the outer member 1, which are spaced a distance enough to have a 180° in phase difference therebetween in a direction circumferentially of the outer member 1. In the instance as shown, the two sensor units 20 forming one of the sensor unit pairs, for example, the first sensor unit pair 19A are mounted on the outer diametric surface of the outer member 1 at upper and lower surface areas thereof which occupy vertically top and bottom positions relative to a tire tread surface in contact with a road surface. On the other hand, the two sensor units 20 forming the other of the sensor unit pairs, that is, the sensor unit pair 19B are mounted on the outer diametric surface of the outer member 1 at left and right surface areas thereof which occupy horizontally opposed, forward and rearward positions relative to the tire tread surface.

More specifically, one of the two sensor units 20 forming the first sensor unit pair 19A is, as best shown in FIG. 2, mounted on the upper surface area of the outer diametric surface of the outer member 1 at a position intermediate between the neighboring flange lugs 1*aa* whereas the other of the two sensor units 20 forming the second sensor unit pair 19A is mounted on the lower surface area of the outer diametric surface of the outer member 1 at a position intermediate between the neighboring flange lugs 1*aa*.

Figure 3:
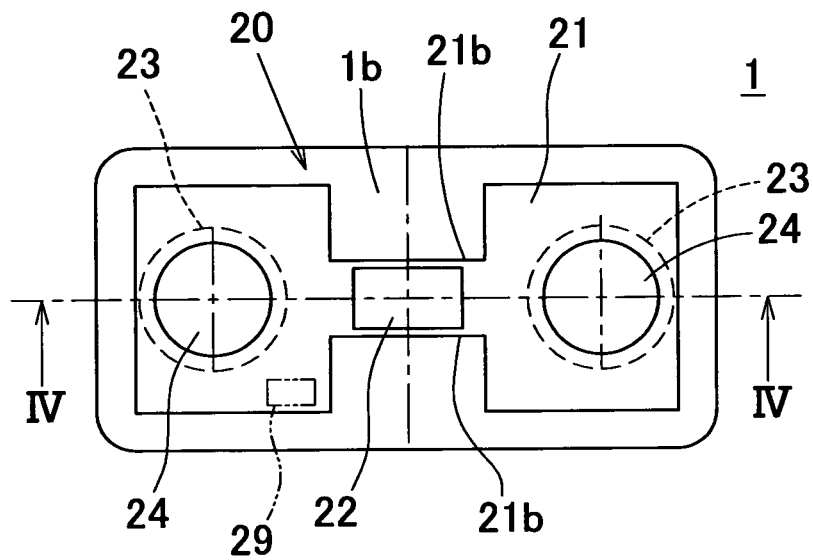
FIG. 3 is an enlarged plan view of a sensor unit employed in the sensor equipped wheel support bearing assembly.
Figure 4:
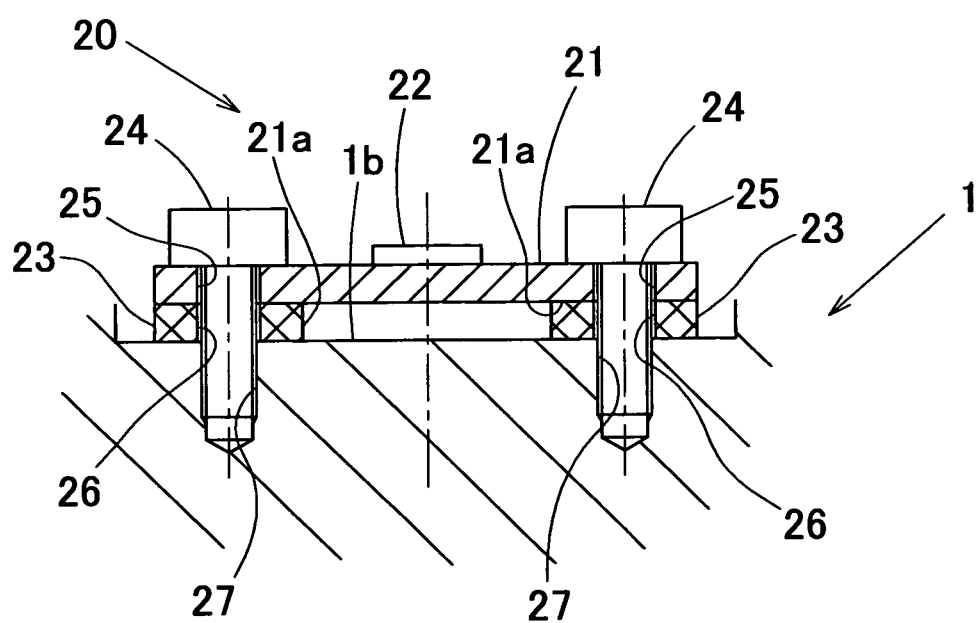
FIG. 4 is a cross sectional view taken along the line IV-IV in FIG. 3.

Each of those sensor units 20 includes, as shown in an enlarged top plan view and an enlarged sectional view shown respectively in FIGS. 3 and 4, a strain generating member 21 and a strain sensor 22 fitted to the strain generating member 21 for detecting a strain induced in the strain generating member 21. The strain generating member 21 is in the form of an elastically deformable thin metallic plate having a wall thickness not greater than 2 mm such as, for example, a steel plate and has a strip shape in a plan view with cutout 21*b* formed at its opposite side edge portions. The strain generating member 21 in each of the sensor units 20 has its opposite end portions forming respective contact fixing segments 21*a* defined therein and adapted to be fixed to the outer diametric surface of the outer member 1 through respective spacers 23 in contact therewith. On the other hand, the strain sensor 22 is pasted to a portion of the strain generating member 21, where a considerable strain can be induced relative to a load acting in various directions. In the instance as shown, for that portion of the strain generating member 21 to which the strain sensor 22 is pasted, an outer surface of the constricted bridge portion left by the formation of the cutouts 21*b* is chosen and, accordingly, the strain sensor 22 so pasted can detect a circumferentially occurring strain induced in the vicinity of the cutouts 21*b*. It is to be noted that the strain generating member 21 is preferably of a type incapable of deforming plastically even when the maximum expected force is applied as a force acting on the outer member 1, which serves as the stationary member, or as a working force acting between the vehicle tire and the road surface. This is because once the plastic deform occurs in the strain generating member 21, the deformation of the outer member 1 will not be transmitted to the sensor unit 20, with the strain measurement being consequently affected adversely. The maximum expected force means the highest force within the range of force with which, for example, the wheel support bearing assembly will not be impaired even when such force acts thereon, but will readily assume a normal functioning once such force is removed.

The sensor unit 20 referred to above is so positioned that the two contact fixing segments 21*a* of the strain generating member 21 thereof are spaced in a direction circumferentially of the outer member 1 from each other at respective positions of the same dimension in a direction axially of the outer member 1, and those contact fixing segments 21*a* of the strain generating member 21 so positioned as described above are fixed to the outer diametric surface of the outer member 1 through the associated spacers 23 by means of bolts 24. Accordingly, the strain sensor 22 of the sensor unit 20 detects the strain occurring in the vicinity of the cutouts 21*b* in the strain generating member 21 in a direction circumferentially of the outer member. Those bolts 24 are, after having been passed through bolt insertion holes 25, defined in the respective contact fixing segments 21, again passed through corresponding bolt insertion holes 26, defined in the respective spacers 23, threadingly engaged in internally threaded holes, or bolt holes 27 defined in an outer peripheral portion of the outer member 1. With the contact fixing segments 21*a* having been fixed to the outer diametric surface of the outer member 1 through the respective spacers 23 as hereinabove described, the bridge portion of the strain generating members 21 made of the thin plate configuration, where the associated cutout 21*b* are formed, are held in position spaced from the outer diametric surface of the outer member 1 and, accordingly, a deformation induced by strain may occur easily in the vicinity of those cutout 21*b*.

For the axial position where each of the contact fixing segments 21*a* is arranged, an axial position in the vicinity of the rolling surface 3 of the outboard row may be selected. The vicinity of the rolling surface 3 of the outboard row referred to above means a region ranging from a middle position between the rolling surface 3 of the inboard row and the rolling surface 3 of the outboard row, to an area in which the rolling surface 3 of the outboard row is formed. In order for the sensor unit 20 to be stably fixed to the outer diametric surface of the outer member 1, an area of the outer diametric surface of the outer member 1, on which the respective spacer 23 is fixed in contact therewith, is formed as a flat surface area 1*b*.

For each of the sensors 22, any of various sensors may be employed. For example, the sensor 22 may be constructed in the form of a metal foil strain gauge. In such case, it is fixed to the strain generating member 21 by means of bonding. Also, the strain sensor 22 may be constructed in the form of a thick film resistance element on the strain generating member 21.

The strain sensor 22 of each of the sensor units 20 is connected with a radial load estimating section 31 and an axial load estimating section 32 through an output signal separator 34. The radial load estimating section 31 is a section operable to estimate the radial load acting in a direction radially of the wheel support bearing assembly. The axial load estimating section 32 is a section operable to estimate the axial load (a cornering force) Fy acting in a direction axially of the wheel support bearing assembly. In the instance as shown, the radial load estimating section 31 estimates a vertical load Fz, acting in a direction vertically of the wheel support bearing assembly (i.e., in a direction substantially perpendicular to the longitudinal sense of the wheel support bearing assembly) and a load Fx which will become a driving force and a braking force acting in a direction longitudinally of the wheel support bearing assembly.

The output signal separator 34 is operable to separate a sensor output signal from each of the sensor units 20 into a direct current component and an alternating current component and then to input them to the radial load estimating section 31 and the axial load estimating section 32. The direct current component referred to above can be obtained when the sensor output signal is passed through a low pass filter.

Methods of estimating the load Fx brought about by the driving force, the axial load Fy and the vertical load Fz by means of the radial load estimating section 31 and the axial load estimating section 32 will now be described in detail.

Figure 5:
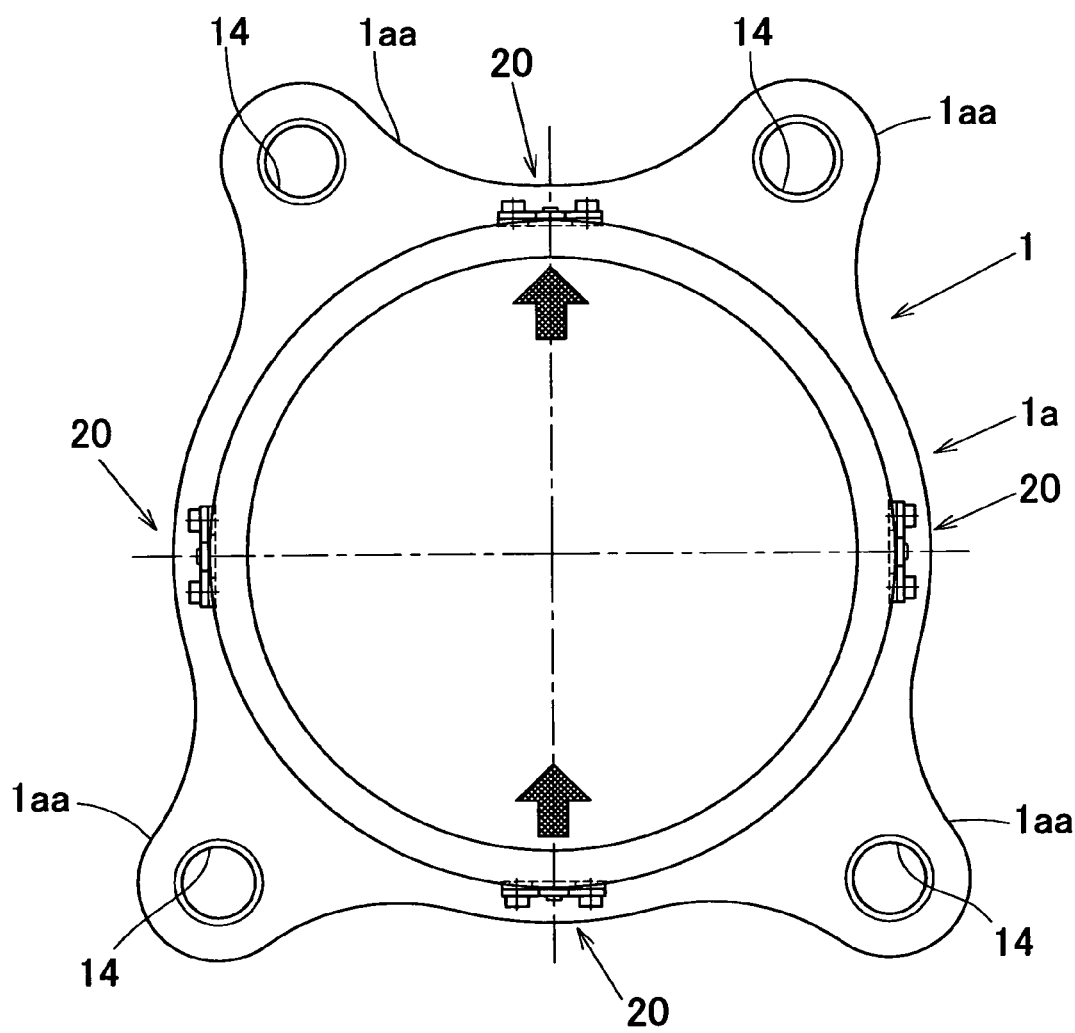
FIG. 5 is an explanatory diagram showing one example of the deformation mode occurring in the outer member outer diametric surface of the sensor equipped wheel support bearing assembly.

When the vertical load Fz is applied under a condition in which the load Fx brought about by the driving force and the axial load Fy are zero, a mode of deformation of the outer diametric surface of the outer member 1 is such as shown by the arrows in FIG. 5, in which an upper surface portion of the outer diametric surface of the outer member 1 deforms in an outer diametric direction while a lower surface portion thereof deforms in an inner diametric direction. In the embodiment now under discussion, for the strain acting in the circumferential direction to be detected, the sensor unit 20 is so arranged that the two contact fixing segments 21a of the strain generating member 21 employed therein may assume the respective positions of the same dimension in a direction axially of the outer member 1 and respective portions spaced from each other in a direction circumferentially of the outer member 1 as hereinbefore described. Accordingly, the strain generating member 21 of the sensor unit 20 fixedly mounted on the upper surface area undergoes a deformation in a tensile direction in which the strain becomes considerable, whereas the strain generating member 21 of the sensor unit 20 fixedly mounted on the lower surface area undergoes a deformation in a compressive direction in which the strain become small. In contrast thereto, deformation taking place in the left and right surface areas of the outer diametric surface of the outer member 1 are minimal. In view of the above, in estimating the vertical load Fz, the difference between respective sensor output signals of the two sensor units 20 of the sensor unit pairs 19A disposed respectively on the upper and lower surface areas of the outer diametric surface of the outer member 1 will constitute a prominent factor.

Figure 6:
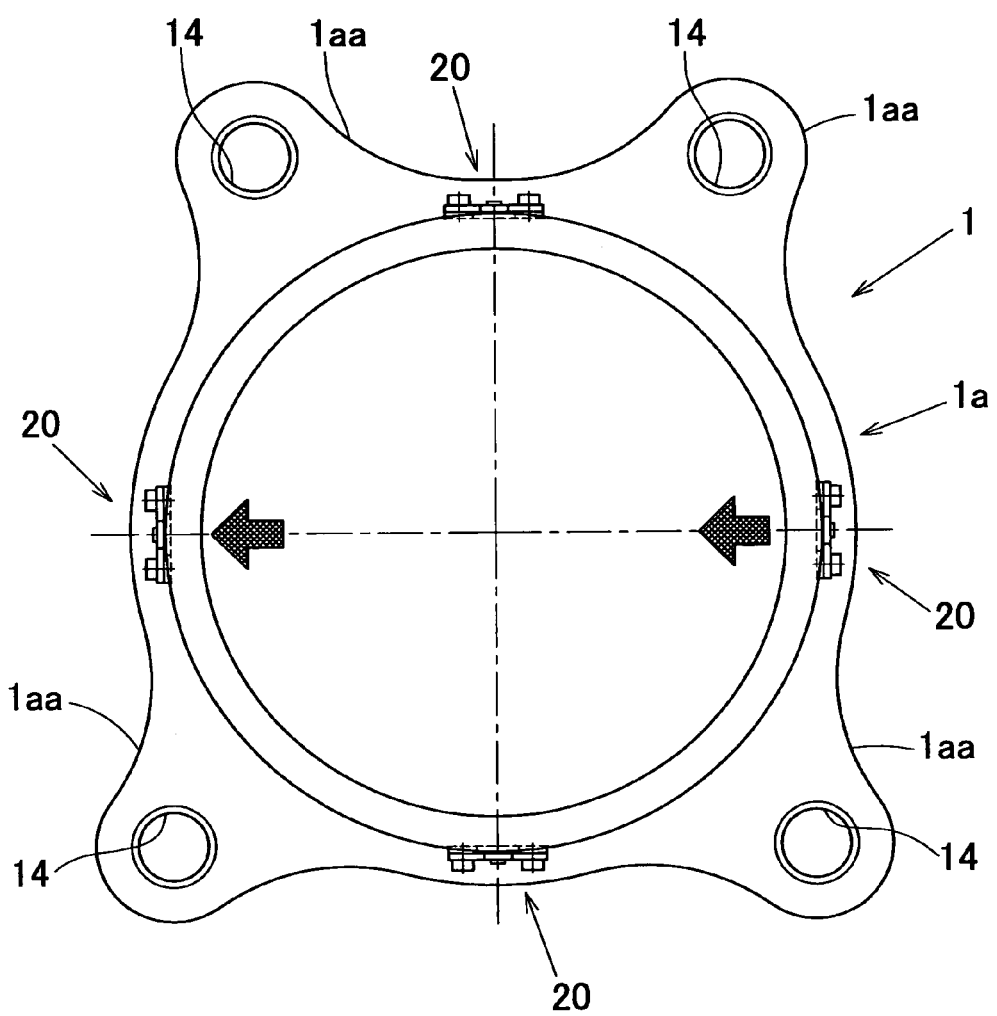
FIG. 6 is an explanatory diagram showing a different example of the deformation mode occurring in the outer member outer diametric surface of the sensor equipped wheel support bearing assembly.

Even when the load Fx brought about by the driving force is applied to, for example, a left side under a condition in which the axial load Fy and the vertical load Fz are zero, the mode of deformation of the outer diametric surface of the outer member 1 is such as shown by the arrows in FIG. 6, in which the left surface area of the outer diametric surface of the outer member 1 undergoes a deformation in the outer diametric direction and, on the other hand, the right surface area thereof undergoes a deformation in the inner diametric direction. Accordingly, the strain generating member 21 of the sensor unit 20 fixedly mounted on the left surface area undergoes a deformation in the tensile direction in which the strain becomes considerable, whereas the strain generating member 21 of the sensor unit 20 fixedly mounted on the right surface area undergoes a deformation in the compressive direction in which the strain become small. In contrast thereto, deformation taking place in the upper and lower surface areas of the outer diametric surface of the outer member 1 are minimal. In view of the above, in estimating the load Fx brought about by the driving force, the difference between respective sensor output signals of the two sensor units 20 of the sensor unit pairs 19B disposed respectively on the left and right surface areas of the outer diametric surface of the outer member 1 will constitute a prominent factor.

Figure 7:
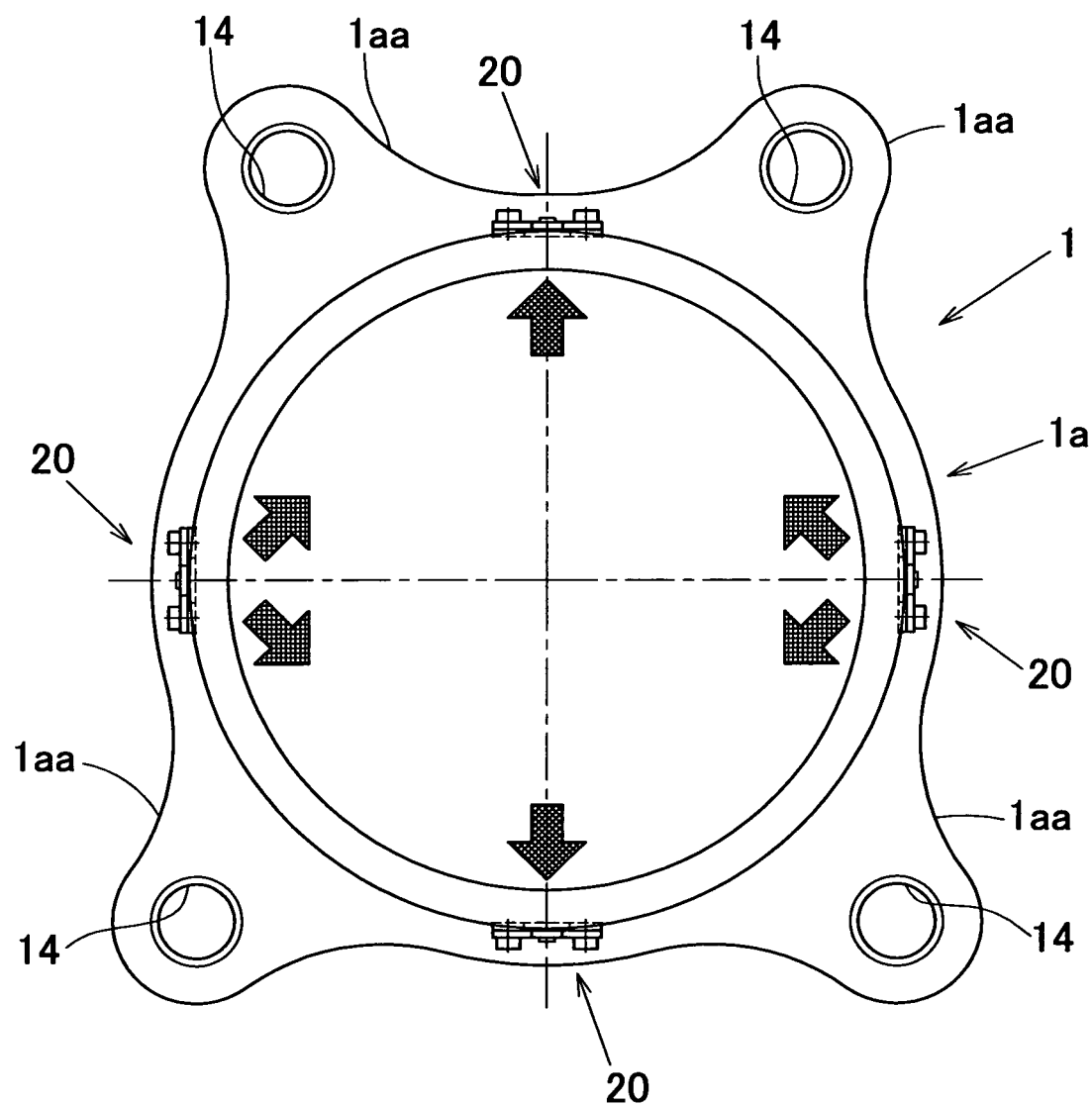
FIG. 7 is an explanatory diagram showing a further different example of the deformation mode occurring in the outer member outer diametric surface of the sensor equipped wheel support bearing assembly.

Also, when the axial load Fy is applied under a condition in which the load Fx brought about by the driving force and the vertical load Fz are zero, the mode of deformation of the outer diametric surface of the outer member 1 is such as shown by the arrows in FIG. 7, in which the upper and lower surface areas of the outer diametric surface of the outer member 1 undergo a deformation in the outer diametric direction and, on the other hand, the left and right surface areas thereof undergo a deformation in the inner diametric direction. Accordingly, the strain generating members 21 of the sensor units 20 fixedly mounted on the upper and lower surface areas undergo a deformation in the tensile direction in which the strain becomes considerable, whereas the strain generating members 21 of the sensor units 20 fixedly mounted on the left and right surface areas undergo a deformation in the compressive direction in which the strain become small. In view of the above, in estimating the axial load Fy, the sum of the respective sensor output signals of the two sensor units 20 of the sensor unit pairs 19A disposed respectively on the upper and lower surface areas of the outer diametric surface of the outer member 1 will constitute a prominent factor.

As discussed above, the mode of deformation of the outer diametric surface of the outer member 1 changes depending on the load Fx brought about by the driving force, the axial load Fy or the vertical load Fz and, in the event that a composite of those loads is applied, the mode of deformation will be a composite of those deformations.

Accordingly, in the radial load estimating section 31 and the axial load estimating section 32, the respective estimated value of those loads Fx, Fy and Fz can be determined by the following determinant:

$$F = (M1 \quad M2 \quad \ldots \quad Mn \quad m1 \quad m2 \quad \ldots \quad mn) \begin{pmatrix} S1 \\ S2 \\ \vdots \\ Sn \\ s1 \\ s2 \\ \vdots \\ sn \end{pmatrix}$$

In the above determinant, S1, S2, . . . and Sn represent respective direct current components separated by the output signal separator 34 from the sensor output signal of the sensor units 20, and s1, s2, . . . and sn represent respective amplitude values of the alternating current components separated by the output signal separator 34 from the sensor output signals of the sensor units 20. Also, M1, M2, . . . and Mn represent respective correction coefficients used to correct values of the respective direct current components, and m1, m2, . . . and mn represent respective correction coefficients used to correct the corresponding amplitude values of the alternating current components. Those correction coefficients vary for the loads Fx, Fy and Fx to be estimated and can be determined beforehand by means of experiments and/or analyses and are stored in a memory (not shown) employed in each of the radial load estimating section 31 and the axial load estimating section 32. The suffix "n" allocated to each of the direct current component, the alternating current component and the correction coefficient represents the number of the sensor units 20 employed, that is, the number of the sensor output signals and is represented by 4 in the instance as shown and described.

Specifically, in the radial load estimating section 31 and the axial load estimating section 32, using the direct current components and the alternating current component (amplitude values) as variables, the load Fx, Fy and Fz acting in the associated directions can be estimated by means of the linear equation, in which each of those variables is multiplied by the respective correction coefficient determined for each of the loads Fx, Fy and Fz acting in the respective directions to be estimated.

In such case, even when any of those loads Fx, Fy and Fz is to be estimated, the direct current components and the alternating current components (amplitude values) of the sensor output signals of all of the sensor units 20 are contained as prominent factors. As hereinabove described, since in the embodiment now under discussion, the two sensor units 20 forming the first sensor unit pair 19A are arranged on the upper and lower surface areas of the outer diametric surface of the outer member 1, respectively, whereas the remaining two sensor units 20 forming the second sensor unit pair 19B are arranged on the left and right side surface areas of the outer diametric surface of the outer member 1, respectively, such modes of deformation relative to the load as shown in FIGS. 5 to 7 appear.

For this reason, for the vertical load Fz estimated by the radial load estimating section 31 based on the foregoing determinant, the difference between the respective sensor output signals of the two sensor units 20 of the first sensor unit pair 19A, which are arranged on the outer and lower surface areas of the outer diametric surface of the outer member 1, constitute the prominent factor. Accordingly, in the estimation of the load in this case, even though the respective sensor output signals of the two sensor units 20 of the second sensor unit pair 19B, which are arranged on the left and right surface areas of the outer diametric surface of the outer member 1, is negligible, a result similar to that described above can be obtained.

Also, for the load Fx, which is brought about by the driving force, estimated by the radial load estimating section 31, the difference between the respective sensor output signals of the two sensor units 20 of the second sensor unit pair 19B, which are arranged on the left and right surface areas of the outer diametric surface of the outer member 1, constitute the prominent factor. Even in the estimation of the load in this case, even though the respective sensor output signals of the two sensor units 20 of the first sensor unit pair 19A, which are arranged on the upper and lower surface areas of the outer diametric surface of the outer member 1, is negligible, a result similar to that described above can be obtained.

Figure 10:
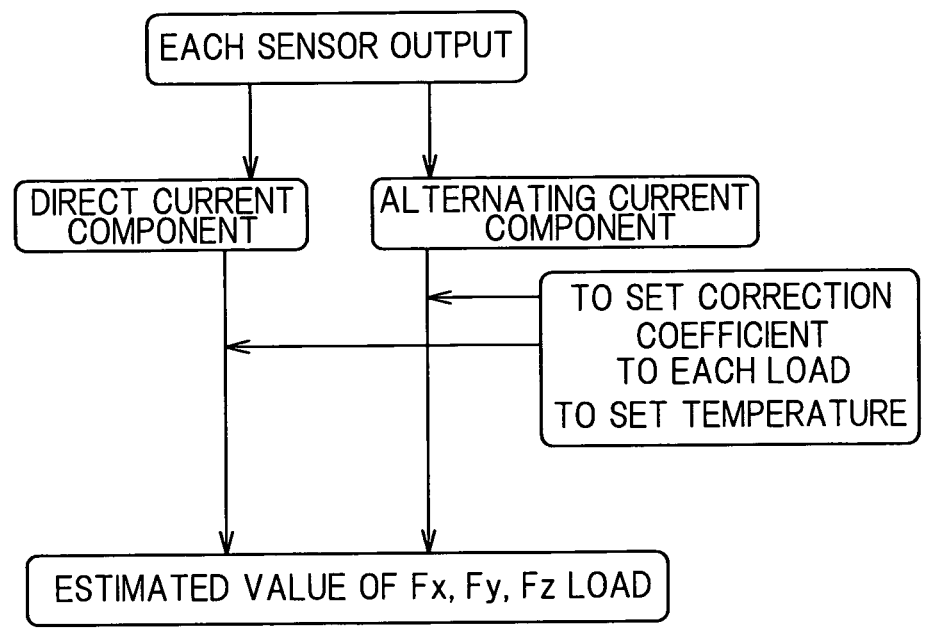
FIG. 10 is an explanatory diagram showing how the sensor output signal is processed.

For the axial load Fy estimated by the axial load estimating section 32, the sum of the respective sensor output signals of the two sensor units 20 of the first sensor unit pair 19A, which are arranged on the upper and lower surface areas of the outer diametric surface of the outer member 1, constitute the prominent factor. Even in the estimation of the load in this case, even though the respective sensor output signals of the two sensor units 20 of the second sensor unit pair 19B, which are arranged on the left and right surface areas of the outer diametric surface of the outer member 1, is negligible, a result similar to that described above can be obtained. FIG. 10 schematically illustrates the process flow of estimation of each of the loads Fx, Fy and Fz accomplished by the load estimating section (the radial load estimating section 31 and the axial load estimating section 32) from each of the sensor outputs of the sensor units 20.

The amount of deformation of the outer member 1 due to not only the vertical load Fz, but also the radial load (including the load Fx expected to become the driving force) acting on the wheel support bearing assembly in the radial direction is extremely small as compared with the amount of deformation thereof due to the axial load Fy and is, therefore, apt to be affected by the axial load Fy. Accordingly, in the embodiment now under discussion, the radial load (the vertical load, the load Fx brought about by the driving force) determined by the previously described estimating method is corrected by means of an estimated value of the axial load Fy determined by the axial load estimating section 32. If the estimated value given by the radial load estimating section 31 is corrected by means of the estimated value of the axial load Fy determined by the axial load estimating section 32 in this way, the radial load (the vertical load Fz, the load Fx brought about by the driving force) can be estimated accurately. The radial load estimating section 31 includes a correcting section 45 capable of performing the foregoing correction process.

In the first embodiment described above, the two sensor units 20 forming the first sensor unit pair 19A are arranged on the upper and lower surface areas of the outer diametric surface of the outer member 1 serving as the stationary member, which surface areas correspond respectively to the vertically top and bottom positions of the outer diametric surface of the outer member 1 relative to the tire tread surface. In addition, since the sensor units 20 are disposed at respective axial positions, which will become perimeters of one of the double row rolling surfaces 3 in the outer member, which is situated on the outboard side, a cyclic change such as represented by the waveform in FIG. 8 occurs in the amplitude value of the output signal of the strain sensor 22 in the sensor unit 20 during the rotation of the wheel support bearing assembly. The reason therefor is that depending on the presence or absence of the rolling elements 5 moving past a portion of the rolling surface 3 in the vicinity of the sensor unit 20, the amount of deformation of the strain generating member 21 in the sensor unit 20 varies and the amplitude of the output signal of the sensor 22 has a peak value for each cycle of movement of the rolling elements 5 past that portion of the rolling surface 3. This amplitude represents detection of the deformation of the outer member 1 caused by the load of the individual rolling elements 5 moving in the vicinity of the sensor unit 20 and, accordingly, the amplitude value thereof changes with the magnitude of the axial load (moment force) Fy.

FIG. 9A illustrates the sensor output of the sensor unit 20 that is disposed on the upper surface area of the outer diametric surface of the outer member 1 whereas FIG. 9B illustrates the sensor output of the sensor unit 20 that is disposed on the lower surface area of the outer diametric surface of the outer member 1. In those figures, the axis of abscissas represents the axial load Fy whereas the axis of ordinates represents the amount of strain occurring in the outer member 1, that is, the amplitude of the output signal of the sensor 22, in which the maximum and minimum values mean the maximum and minimum values of the amplitude, respectively. Those figures make it clear that when the axial load Fy lies in a plus (+) direction, the load of the individual rolling elements 5 is small at the upper surface area of the outer diametric surface of the outer member 1 (in other words, the difference between the maximum and minimum values of the amplitude becomes small), but large at the lower surface area of the outer diametric surface of the outer member 1 (in other words, the difference between the maximum and minimum value of the amplitude becomes large). Conversely, they also make it clear that when the axial load Fy lies in the minus (−) direction, the load of the individual rolling elements 5 becomes large at the upper surface area of the outer diametric surface of the outer member 1, but small at the lower surface area of the outer diametric surface of the outer member 1.

In view of the above, an axial load direction determining section 33 determines the direction of the axial load Fy by determining the above discussed difference in amplitude of the respective sensor output signals of the sensor units 20 disposed on the corresponding upper and lower surface areas of the outer diametric surface of the outer diameter 1 and then comparing them with each other. In other words, when the difference between the maximum and minimum value of the amplitude of the sensor output of the sensor unit 20 at the upper surface area of the outer diametric surface of the outer member 1 is small, the axial load direction determining section 33 determines that the axial load Fy lies in the plus direction. Conversely, when the difference between the maximum and minimum value of the amplitude of the sensor output of the sensor unit 20 at the upper surface area of the outer diametric surface of the outer member 1 is large, the axial load direction determining section 33 determines that the axial load Fy lies in the minus direction.

Figure 11:
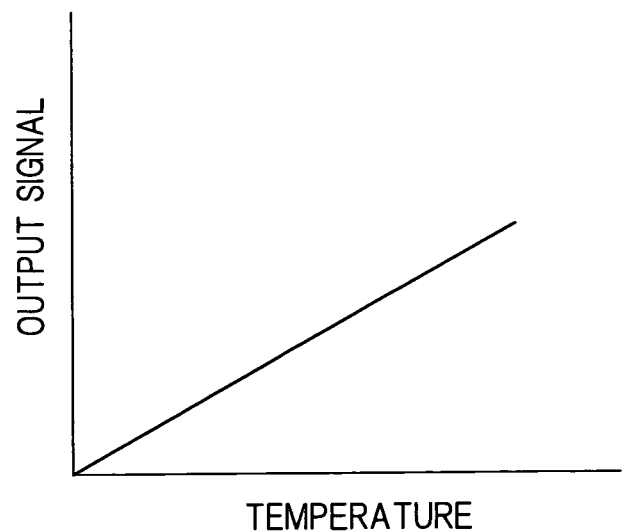
FIG. 11 is a chart showing the relation between the sensor output signal and temperature.

FIG. 11 illustrates the chart showing the relation between the sensor output signal in the sensor unit 20 and the temperature of the outer member 1. The chart in FIG. 11 makes it clear that the sensor output signal tends to drift under the influence of temperature. For this reason, in order to increase the accuracy of detection of the loads Fx, Fy and Fz which are estimated by the radial load estimating section 31 and the axial load estimating section 32, it is necessary to effect a temperature correction to the sensor output signal. Accordingly, in the embodiment now under discussion, a temperature corrector 35 is provided for correcting the sensor output signal of the sensor unit 20 in dependence on the ambient temperature or the temperature of the wheel support bearing assembly. As shown in FIG. 2, a temperature sensor 29 for detecting the temperature of the outer diametric surface of the outer member 1 is disposed in the vicinity of each of the surface areas of the outer diametric surface of the outer member 1 where the corresponding sensor units 20 are disposed. For the temperature sensor 29, a thermister or a platinum resistance element, for example, can be employed. The temperature corrector 35 corrects the sensor output signal of the associated sensor unit 20 based on an output signal of the temperature sensor 29. Accordingly, the sensor output signal which has been corrected by the temperature corrector 35 is supplied to the radial load estimating section 31 and the axial load estimating section 32. It is eventually to be noted that the temperature sensor 29 may be disposed on the strain generating member 21 of each of the sensor units 20 as shown by double dotted chain line in FIG. 3.

When a load acts between the tire on the vehicle wheel and the road surface, such load is applied to the outer member 1, which is the stationary member of the wheel support bearing assembly, accompanied by deformation of the outer member 1. If an attempt is made to dispose the sensor unit 20 on, for example, the lug 1aa of the vehicle body fitting flange 1a and then to estimate the load from the deformation of the vehicle body fitting flange 1a, hysteresis occurs in the output signal as hereinbefore described in connection with the related art. However, in the embodiment now under discussion, the two or more contact fixing segments 21a of the strain generating member 21 in the sensor unit 20 are fixed to the outer diametric surface of the outer member 1 in contact therewith, the strain appearing in the outer member 1 can be easily transmitted to the strain generating member 21 after having been amplified, wherefore such strain is highly sensitively detected by the strain sensor 22 and the hysteresis occurring in the output signal is reduced, allowing the load to be detected with a high accuracy.

Also, since the three or more sensor units 20 are provided on the outer diametric surface of the outer member 1 serving the stationary member and the provision has been made of the load estimating section (the radial load estimating section 31 and the axial load estimating section 32) for estimating the radial load (the load Fx brought about by the driving force and the vertical load Fz) acting in the direction radially of the wheel support bearing assembly and the axial load Fy acting in the direction axially of the wheel support bearing assembly, the radial load Fx and Fz and the axial load Fy can be estimated with a high sensitivity under any loading condition without relying on the use of a number of sensors.

In particular, the provision has been made of the output signal separator 34 for separating the sensor output signal of each of the sensor units 20 into the direct current component and the alternating current component and then inputting them to the load estimating section (the radial load estimating section 31 and the axial load estimating section 32). The loads Fx, Fy and Fz in the various directions are estimated by the load estimating section (the radial load estimating section 31 and the axial load estimating section 32) from the linear equation, in which the direct current component and the alternating current component (amplitude) are used as variable and each of those variables is multiplied by the respective correction coefficient determined for each of the loads Fx, Fy and Fz acting in the respective directions to be estimated. Accordingly, the process of correction of the sensor output in the load estimating section can be precisely carried out for each of the direct current component and the alternating current component and, therefore, the load can be further accurately estimated.

In addition, since in the foregoing embodiment now under discussion, the two sensor units 20 of at least one sensor unit pair 19A are disposed respectively on the upper and lower surface areas of the outer diametric surface of the outer member 1, serving as the stationary member, which surface areas corresponds to the vertically top and bottom positions relative to the tire tread surface, and the provision has been made of the axial load direction determining section 33 for determining the direction of the axial load Fy from the amplitude of the sensor output signal of the sensor unit pair 19A, the direction of the axial load Fy can be determined with no need to employ any extra sensor for the determination of the direction.

Although in the foregoing description, reference has been made to detection of the working force acting between the tire on the vehicle wheel and the road surface, not only the working force acting between the wheel tire and the road surface, but also a force acting on the wheel support bearing assembly (for example, the preload amount) may be detected.

When the detected load obtained from the sensor equipped wheel support bearing assembly is utilized in vehicle control in the automotive vehicle, contribution can be made to the stabilized travel of the automotive vehicle. Also, when this sensor equipped wheel support bearing assembly is used, the load sensor can be snugly and neatly installed in the automotive vehicle, resulting in the excellent productivity with the cost reduced.

It is to be noted that in the foregoing embodiment, the following structural particulars are not specifically limited.

The number of the sensor units 20 installed (at least three or more), the number and the site of installation of each of the contact fixing segments 21a, the sensors 22 and the cutouts 21b.

The shape of the sensor unit 20, the fixing method thereof (Either bonding or welding may be used. The two contact fixing segments 21a may be fixed directly to the outer diametric surface of the outer member 1 with no intervention of any spacer 23 and a groove may be provided at a portion of the outer diametric surface of the outer member 1 between sites where the contact fixing segments 21 are fixed.), and the fixing direction thereof (The contact fixing segments may be fixed having been oriented axially so that the strain acting in the axial direction may be detected.).

Figure 12:
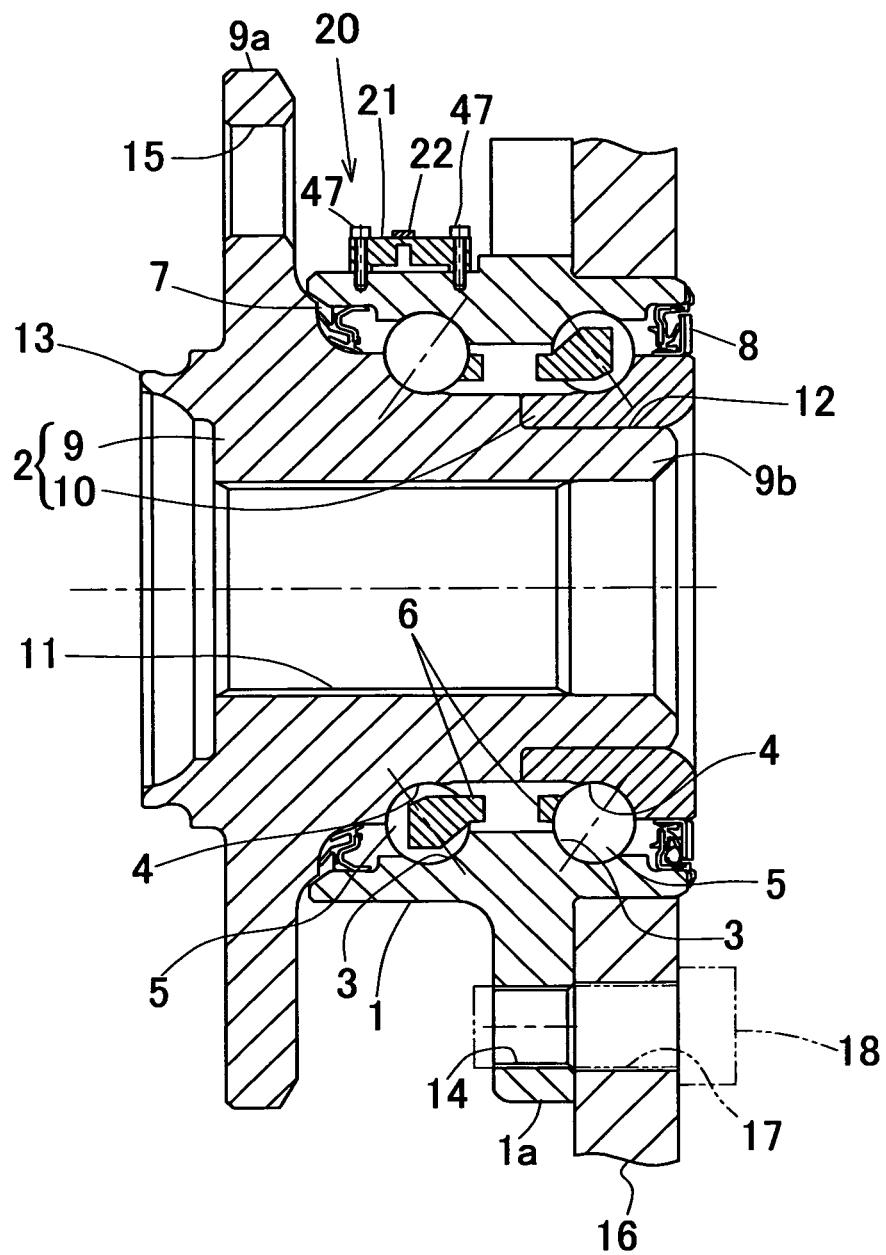
FIG. 12 is a sectional view showing the sensor equipped wheel support bearing assembly according to a second preferred embodiment of the present invention.
Figure 13:
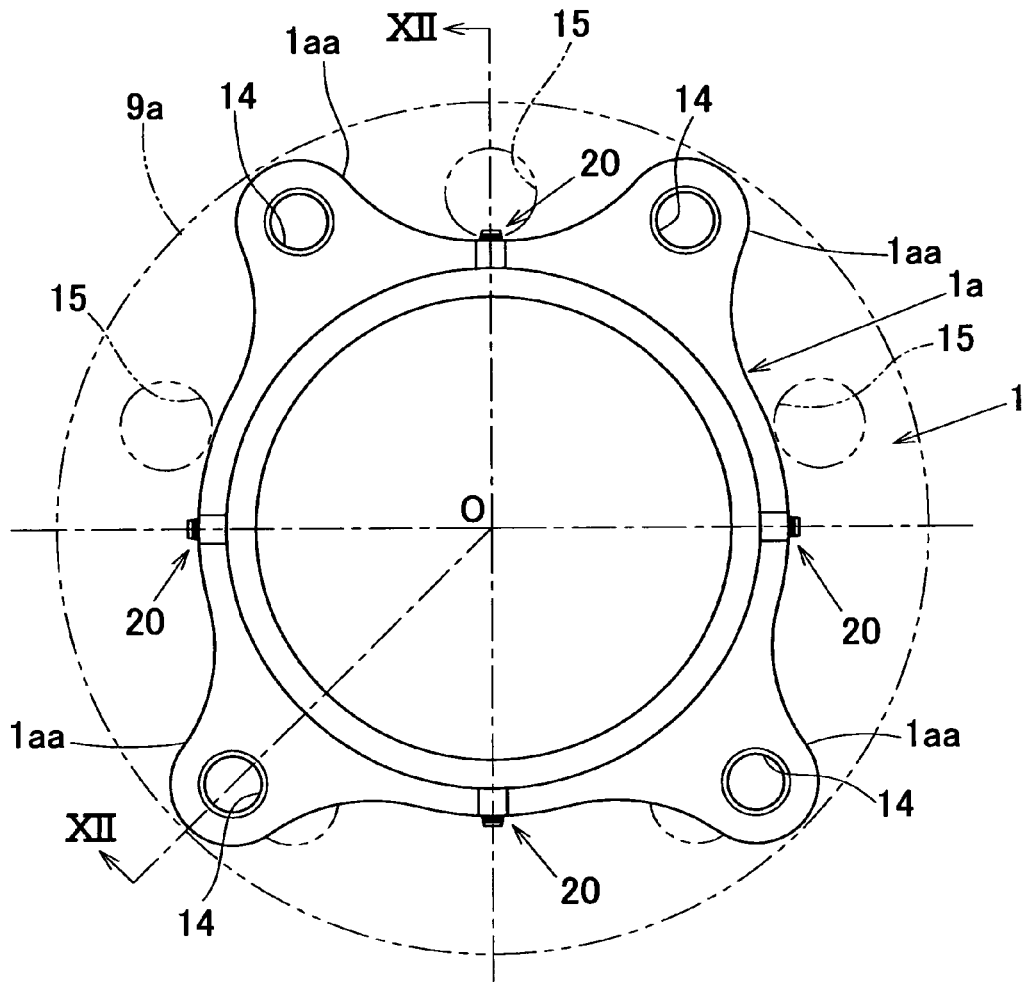
FIG. 13 is a front elevational view showing the outer member of the sensor equipped wheel support bearing assembly as viewed from the outboard side.
Figure 14:
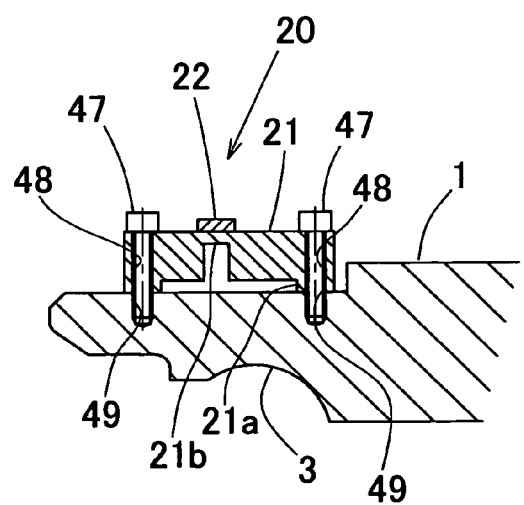
FIG. 14 is an enlarged sectional view showing the sensor unit employed in the sensor equipped wheel support bearing assembly.

FIGS. 12 to 14 illustrate a second preferred embodiment of the present invention. The sensor equipped wheel support bearing assembly according to the second embodiment is similar to that according to the first embodiment shown in and described with reference to FIGS. 1 to 11, but differs therefrom in respect of the structure of each of the sensor units 20 as detailed subsequently. Even in this case, as best shown in an enlarged sectional representation in FIG. 14, the respective sensor unit 20 is made up of a strain generating member 21 and a sensor 22 fitted to the strain generating member 21 for detecting the strain appearing in the strain generating member 21. The strain generating member 21 has its opposite end portions provided with respective contact fixing segments 21a protruding towards an inner surface side confronting the outer diametric surface of the outer member 1 and is adapted to be mounted on the outer diametric surface of the outer member 1 with those contact fixing segments 21 fixed thereto in contact therewith. One of the two contact fixing segments 21a is arranged at an axial position, which will become the perimeter of the outboard row of the rolling surface 3 in the outer member 1, and the other of the two contact fixing segments 21a is arranged at a position on the outboard side of the first described axial position and those two contact fixing segments 21a are arranged at the respective positions on the same phase in the direction of circumferentially of the outer member 1 relative to each other. In other words, the sensor unit 20 is so arranged on the outer diametric surface of the outer member 1 that the two contact fixing segments 21a of the strain generating member 21 occupy the same circumferential positions of the outer member 1, serving as the stationary member, and axially spaced from each other. Even in this case, in order to fix the sensor unit 20 to the outer diametric surface of the outer member 1 in a stabilized fashion, it is desirable to form a flat surface area at a site on the outer diametric surface of the outer member 1, to which the contact fixing segments 21a of the strain generating member 21 are fixed in contact therewith.

Also, the strain generating member 21 has an intermediate portion formed with a cutout 21b that opens towards the inner surface side leaving a constricted bridge portion. The strain sensor 22 is pasted to a portion of the strain generating member 21 where a considerable strain can be induced therein relative to a load acting in various directions. In the instance as shown, for that portion of the strain generating member 21 to which the strain sensor 22 is pasted, a portion of the strain generating member 21 in the vicinity of the cutout 21b, more particularly an outer surface portion of the strain generating member 21 on a rear side of the cutout 21b is chosen and, accordingly, the strain sensor 22 can detect a strain appearing in the strain generating member 21 in the vicinity of the cutout 21b.

The two contact fixing segments 21a of the strain generating member 21 are fixed to the outer diametric surface of the outer member 1 by means of respective bolts 47 threaded to the latter. More specifically, those bolts 47 are, after having been passed through associated bolt insertion holes 48 defined in the contact fixing segments 21a so as to extend in the radial direction, firmly threaded into corresponding bolt holes 49 defined in an outer peripheral portion of the outer member 1. It is to be noted that as a method of fixing the contact fixing segments 21a, other than the use of the bolts 47 described above, a bonding agent, for example, may be employed. At a location other than the contact fixing segments 21a of the strain generating member 21, a gap may be formed between the strain generating member 21 and the outer diametric surface of the outer member 1. Other structural features than those described above are similar to those in the first embodiment shown in and described with reference to FIGS. 1 to 11. It is, however, to be noted that FIG. 12 illustrates a cross sectional view taken along the line XII-XII in FIG. 13, showing the outer member 1 of the wheel support bearing assembly as viewed from the outboard side.

In each of the foregoing embodiments, reference has been made to the separation of the sensor output signal of the sensor unit 20 into the direct and alternating current components by means of the output signal separator 34 and the subsequent estimation of each of the loads Fx, Fy and Fz in reference to the values of the direct and alternating current components which have been corrected with the correction coefficient. Alternatively, in view of the fact that a cyclic change occurs in amplitude of the sensor output signal of the sensor unit 20 as shown in FIG. 8, by determining various values such as the average value, the amplitude value and the absolute value of such sensor output signal and by using two or more of those values as variables, each of the loads Fx, Fy and Fz can be estimated by correcting them with the correction coefficient in a manner similar to the previously described embodiment. For those value in such case, the direct current component and the alternating current component (amplitude) may be further included.

A third preferred embodiment of the present invention will now be described with particular reference to FIGS. 15 to 20. In FIGS. 15 to 20, component parts similar to those shown in and described with reference to FIGS. 1 to 11 in connection with the first embodiment of the present invention are designated by like reference numerals and the details thereof are not therefore reiterated for the sake of brevity. This third embodiment differs from the previously described first embodiment in that a sensor temperature sensor 28A fitted to the strain generating member 21 for detecting the temperature of a site of installation of the strain sensor 22 and a rolling surface temperature sensor 28B provided at a circumferential position of the stationary member in the vicinity of the sensor unit 20 for detecting the temperature in the vicinity of the rolling surface. There is also provided a temperature corrector 35A for correcting the sensor output signal of the sensor unit 20 with respective outputs of the sensor temperature sensor 28A and the rolling surface temperature sensor 28B so that the load estimating section 30 can estimate the load, imposed on the wheel support bearing assembly or the wheel tire, from a signal corrected by the temperature corrector 35A.

Figure 15:
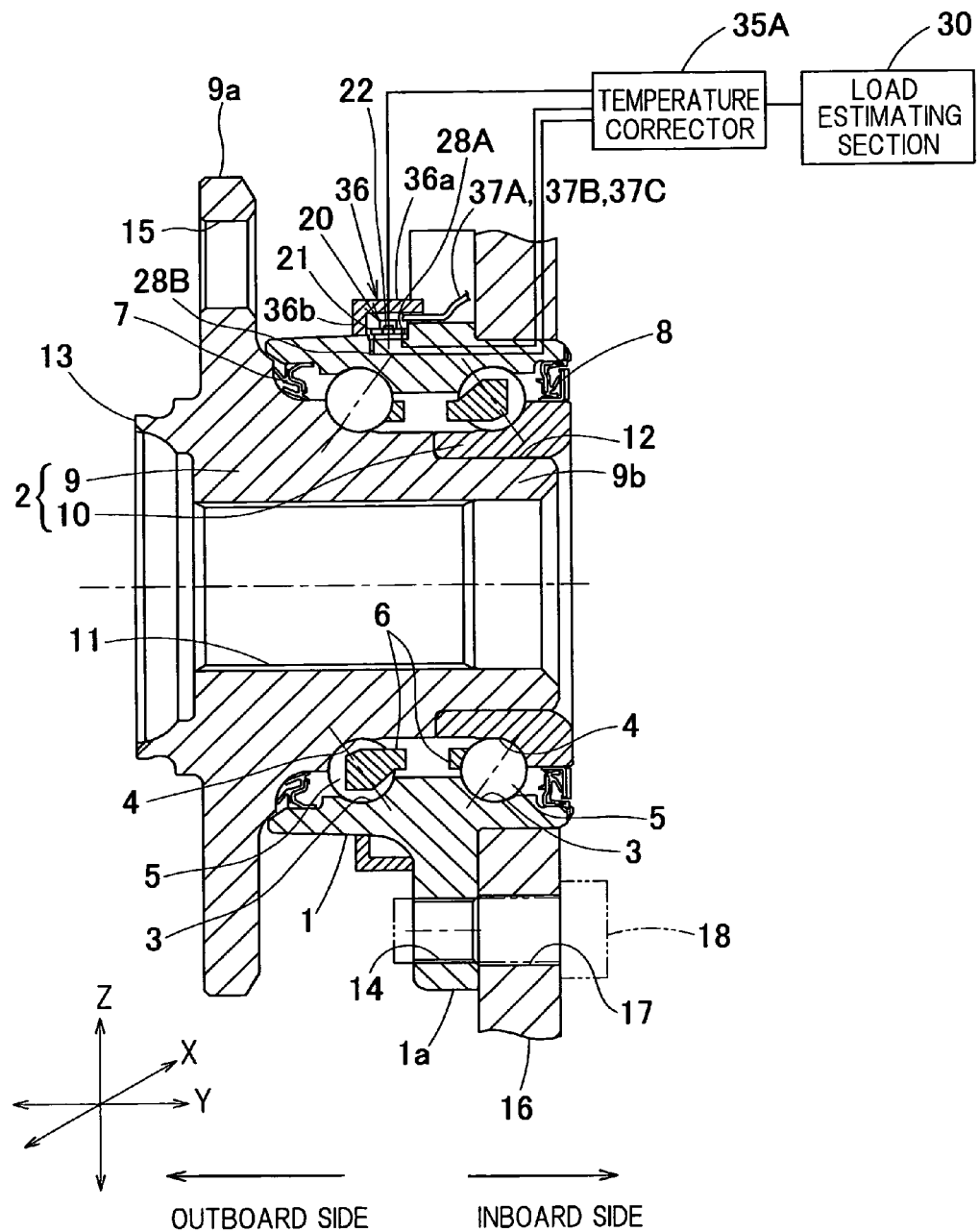
FIG. 15 is a diagram showing a sectional view of the sensor equipped wheel support bearing assembly according to a third preferred embodiment of the present invention, shown together with a block diagram of a conceptual construction of a detecting system therefor.
Figure 16:
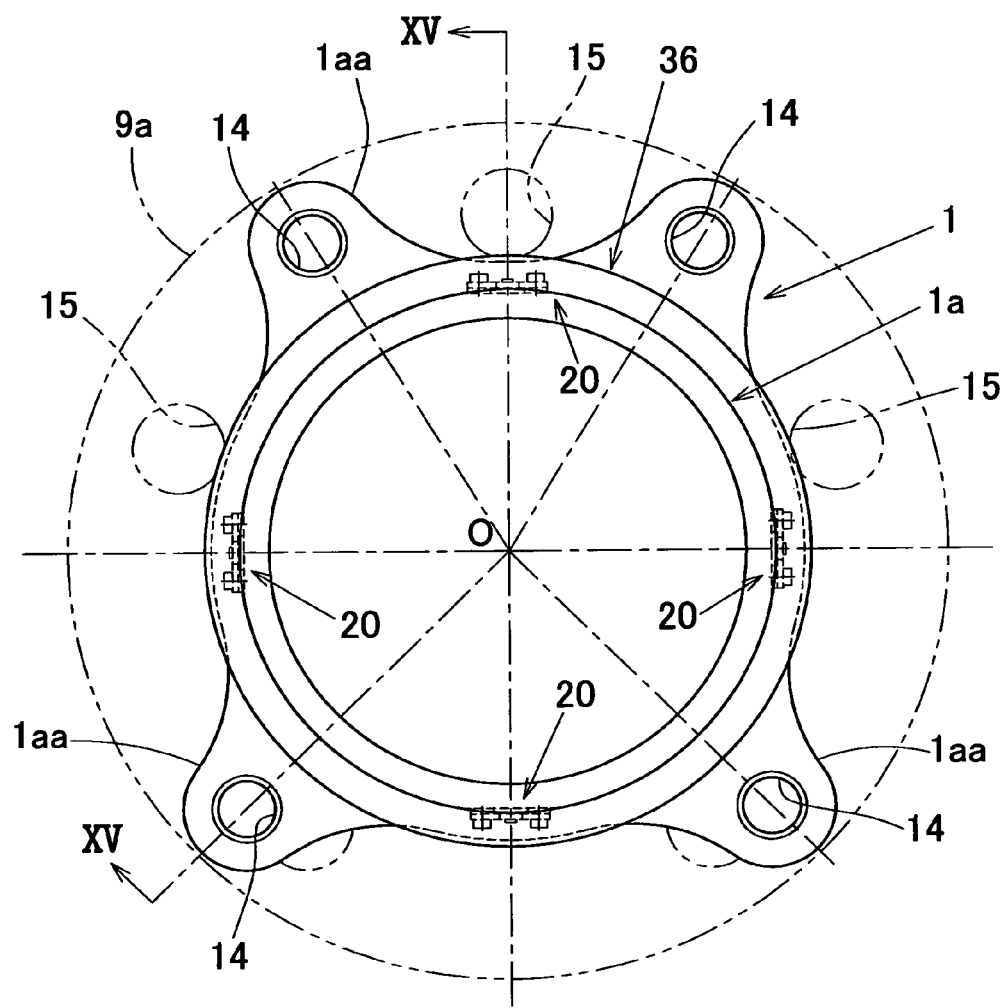
FIG. 16 is a front elevational view showing the outer member of the sensor equipped wheel support bearing assembly as viewed from the outboard side.

FIG. 16 illustrates a front elevational view showing the outer member 1 of the wheel support bearing assembly as viewed from the outboard side. It is, however, to be noted that FIG. 15 illustrates a cross sectional representation taken along the line XV-XV in FIG. 16. FIGS. 15 and 16 correspond respectively to FIGS. 1 and 2 pertaining to the previously described first embodiment.

As best shown in FIG. 16, the outer diametric surface of the outer member 1 serving as the stationary member is provided with four sensor units 20. In the instance as shown, the sensor units 20 are provided respectively on the upper, lower, left and right surface areas of the outer diametric surface of the outer member 1, which correspond to top, bottom, forward and rearward positions relative to the tire tread surface and are spaced a distance enough to have a 90° in phase difference therebetween in the circumferential direction.

Figure 17:
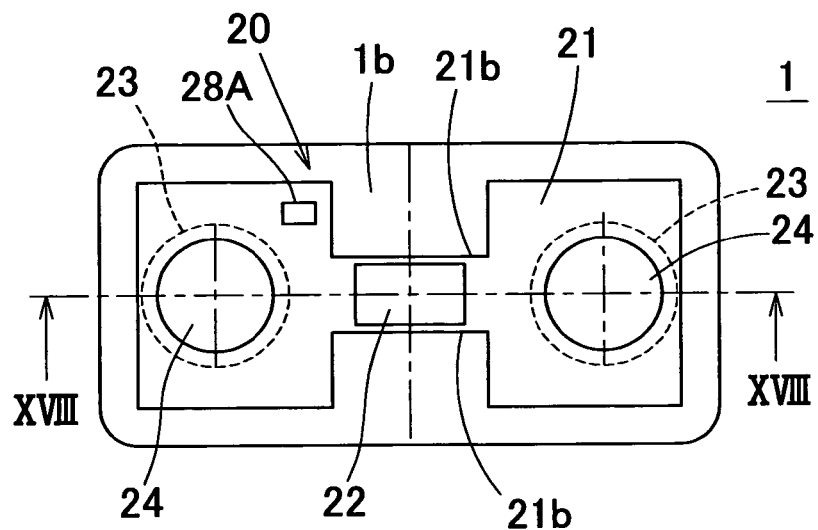
FIG. 17 is an enlarged plan view showing the sensor unit employed in the sensor equipped wheel support bearing assembly.
Figure 18:
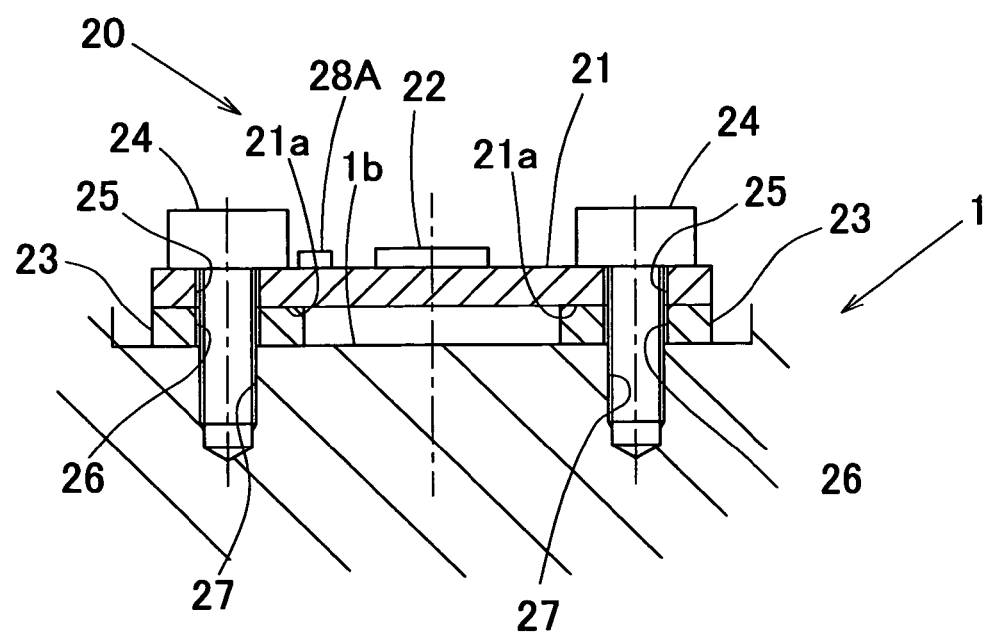
FIG. 18 is a cross sectional view taken along the line VXIII-VXIII in FIG. 17.

Those sensor units 20, shown in an enlarged top plan view and an enlarged sectional view in FIGS. 17 and 18, correspond to those shown in FIGS. 3 and 4 pertaining to the previously described first embodiment of the present invention, but differ therefrom in respect of only the presence or absence of the sensor temperature sensor 28A, but since the shape of and the material for the strain generating member 21 are similar to those of the strain generating member 21 employed in the practice of the previously described first embodiments, the details thereof are not reiterated for the sake of brevity.

The outer member 1 serving as the stationary member has an outer periphery provided with a protective covering 36 for covering each of the sensor units 20. This protective covering 36 is in the form of a ring shaped member coaxial with the outer member 1 and having an L-sectioned configuration including an axially extending cylindrical wall 36a and a radial upright wall 36b extending radially inwardly from an outboard end of the cylindrical wall 36a. With an inner diametric side end of the radial upright wall 36b of the protective covering 36 fixed to the outer diametric surface of the outer member 1 and, at the same time, with an inboard end of the cylindrical wall 36a of the protective covering 36 fixed to an outboard oriented side face of the vehicle body fitting flange 1a, the protective covering 36 is fitted to the outer member 1 so as to cover all of the sensor units 20 provided on the outer diametric surface of the outer member 1. A gap is provided between the inboard end of the cylindrical wall 36a of the protective covering 36 and the outer diametric surface of the outer member 1. Material for the protective covering 36 may be plastics or rubber or metal.

Also, as shown in FIG. 15, a signal line 37A of the strain sensor 22, a signal line 37B of the sensor temperature sensor 28A and a signal line 37C of the rolling surface temperature sensor 28B as will be described later, of all of the sensor units 20 covered by the protective covering 36, are drawn outwardly from one location of the protective covering 36 and through the gap between the protective covering 36 and the outer diametric surface of the outer member 1 to the outside of the protective covering 36. By way of example, in the case as shown in FIG. 15, the signal lines 37A of all of the strain sensors 22, the signal lines 37B of all of the sensor temperature sensor 28A and the signal lines 37C of all of the rolling surface temperature sensors 28B are drawn from one circumferential location of the inner peripheral surface of the cylindrical wall 36a of the protective covering 36 towards the inboard side and then drawn outwardly from a concave portion of the vehicle fitting flange 1a of the outer member 1, that is, a location intermediate between the lugs 1aa (FIG. 16) that are neighboring in the circumferential direction.

Figure 19:
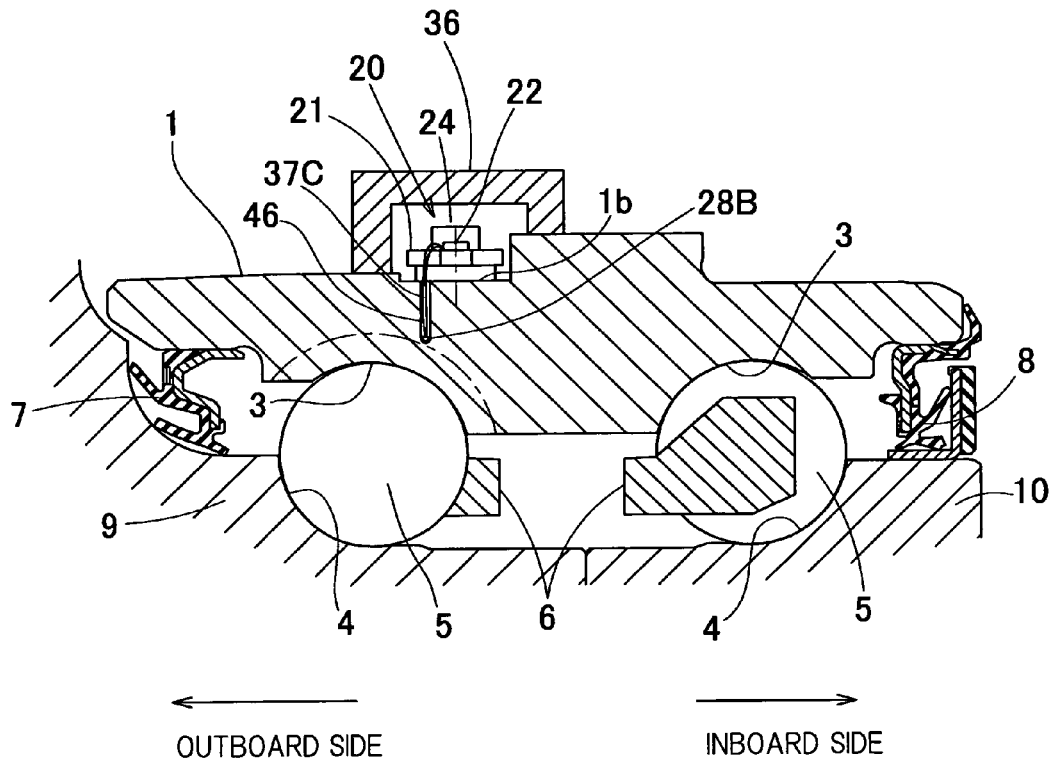
FIG. 19 is an enlarged sectional view showing the site where a rolling surface temperature sensor is installed in the sensor equipped wheel support bearing assembly.

Also, as shown in an enlarged sectional representation in FIG. 19, the rolling surface temperature sensor 28B for detecting the temperature in the vicinity of one of the double row rolling surfaces 3, which is on the outboard side, is provided in the outer member 1 serving as the stationary member. This rolling surface temperature sensor 28B is employed four in number in correspondence with the four sensor units 20 provided on the outer diametric surface of the outer member 1. Each of those rolling surface temperature sensors 28B is arranged at a circumferential location adjacent the respective sensor unit 20 on the outer member 1 serving as the stationary member. More specifically, the outer member 1 is provided with four temperature sensor embedding holes 46 each defined in the outer diametric surface of the outer member 1 so as to extend in a radial direction from a location adjacent the site of installation of the corresponding sensor unit 20 on the outer diametric surface towards a location adjacent the associated rolling surface 3, and the rolling temperature sensors 28B are respectively embedded within bottom portions of those embedding holes 46 adjacent the rolling surface 3. The bottom portion of each of the embedding holes 46 is preferably as close to the rolling surface 3 as possible so long as formation of each of those embedding holes 46 will not lower the bearing lifetime, and is positioned in the vicinity of, for example, the boundary between a hardened layer of the rolling surface 3 and a non-hardened portion thereof. The signal lines 37C connected with those rolling surface temperature sensors 28B are drawn to the outside of the protective covering 36 together with the other signal lines 37A and 37B, after having been passed from the associated temperature sensor embedding holes 46 and through the corresponding sensor units 20.

The strain sensor 22, the sensor temperature sensor 28A and the rolling surface temperature sensor 28B of the sensor unit 20 are connected with the load estimating section 30 through the temperature corrector 35A. The load estimating section 30 is operable to estimate the force (the vertical load Fz, the load Fx expected to become the driving force, and the axial load Fy) acting on the wheel support bearing assembly or between the wheel tire and the tire tread surface (the tire contact surface) in reference to the output signal of the strain sensor 22. The temperature corrector 35A is operable to correct the output signal of the strain sensor 22 with respective outputs of the sensor temperature sensor 28A and the rolling surface temperature sensor 28B. As such, the load estimating section 30 is operable to estimate the vertical load Fz, the load Fx expected to become the driving force and the axial load Fy in reference to the output signal of the strain sensor 22 corrected by the temperature corrector 35A.

Since the output signal of the strain sensor 22 contains a temperature dependent drift characteristic, a detection error resulting from the temperature dependent drift characteristic can be reduced if the output signal of the strain sensor 22 is corrected with the outside temperature and the temperature of the sensor unit 20 measured by the sensor temperature sensor 28A provided in the sensor unit 20. However, once the heat release value inside the bearing assembly and the condition of the bearing assembly to dissipate heat to the outside atmosphere change, a heat induced strain component of the outer member 1 is superimposed on the output signal of the strain sensor, thus reducing the detecting accuracy.

In view of that, in the temperature corrector 35A, using the temperature Ts of the site of installation of the strain sensor 22, which is detected by the sensor temperature sensor 28A, and the temperature Ti in the vicinity of the rolling surfaces 3, which represents the inside temperature of the outer member 1 and is detected by the rolling surface temperature sensor 28B, the output signal of the strain sensor 22 is corrected in the following manner.

Figure 20:
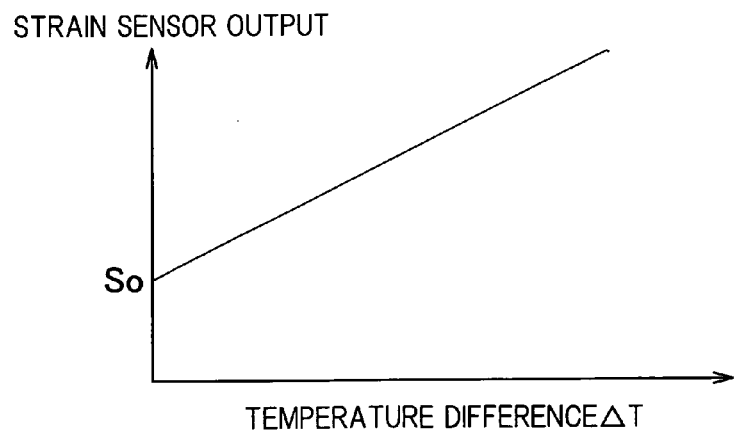
FIG. 20 is a chart showing the relation between the difference in temperature between the inside and outside of the outer member and a strain sensor output.

In the first place, as the difference in temperature between the inside and the outside of the outer member 1, $\Delta T = Ti - Ts$ is determined. The relation between the temperature gradients of the inside and the outside of the outer member 1 and the amount of offset superimposed on the output signal of the strain sensor 22 is determined depending on the structure of the outer member 1 or the like and can be approximated to such a proportional relation as shown in the chart of FIG. 20. It is to be noted that in FIG. 20, the temperature of the sensor unit 20 is assumed to be constant and the output signal of the strain sensor 22 is assumed to be So when the temperature difference $\Delta T$ is zero.

In the next place, in the temperature corrector 35A, while the coefficient is determined from the chart shown in FIG. 20, using the inside and outside temperature difference $\Delta T$, a correction value for the output signal of the strain sensor 22 is determined according to the following equation:

Correction Value=(Output of Strain Sensor 22)+(Offset $O(Ts)$ due to Sensor Temperature)+(Offset $G(\Delta T)$ due to Temperature Gradient)

wherein:

O(Ts): (Amount of Offset due to Difference in Linear Expansion)+(Temperature Dependent Characteristic of Strain Sensor 22), and G(ΔT): (Amount Offset due to Temperature Gradient)

The load estimating section 30 includes a relation setting module (not shown), in which relations between the previously described working force and the correction value for the output signal of the strain sensor 22 determined by the temperature corrector 35A are set in the form of calculation equations or tables, and is operable to output a value of the working force from the inputted correction value by the utilization of the relation setting module. The contents of the relation setting module are determined by means of a series of experiments and/or simulations before they are set in the relation setting module.

When a load acts between the wheel tire and the road surface, such load is also applied to the outer member 1, serving as the stationary member of the wheel support bearing assembly, accompanied by deformation. Since the two contact fixing segments 21a of the strain generating member 21 in each of the sensor units 20 are fixed to the outer member 1 in contact therewith, the strain occurring in the outer member 1 is transmitted to the strain generating member 21 after having been amplified and such strain is subsequently detected by the strain sensor 22 with a high sensitivity and, therefore, the load can be estimated accurately.

In particular, the sensor temperature sensor 28A for detecting the temperature of the site of installation of the strain sensor 22 is fitted to the strain generating member 21 in each of the sensor units 20 and the rolling surface temperature sensor 28B for detecting the temperature Ti in the vicinity of the rolling surface 3 is provided at the circumferential locations in the vicinity of the sensor unit 20 on the outer member 1 and since the load estimating section 30 is so designed and so configured that the temperature corrector 35A corrects the output signal of the strain sensor 22 with respective outputs of the sensor temperature sensor 28A and the rolling surface temperature sensor 28B and the load acting on the wheel support bearing assembly or the wheel tire is then estimated from the signal so corrected. Accordingly, influences brought about by a change caused by heat emission inside the bearing assembly resulting from a change in load or a change in the outside temperature can be reduced and, therefore, the load acting on the wheel support bearing assembly and/or the tire tread surface or tire contact surface can be stably detected with a high accuracy, thus making it possible for the load detection to be insensible to those influences even when during the travel of the automotive vehicle a rain falls or the outside temperature changes.

While in the foregoing description, reference has been made to the detection of the working force acting between the wheel tire and the road surface, the detection may not be always limited to the working force acting between the wheel tire and the road surface and may be made of the force (for example, the preload amount) acting on the wheel support bearing assembly.

When the detected load obtained from this sensor equipped wheel support bearing assembly is used in controlling the automotive vehicle, the detecting accuracy will not be deteriorated even when the automotive vehicle is driven under a condition, in which a high load prevails, and the safety can be increased through an accurate vehicle control.

Also, since in the third embodiment of the present invention described hereinbefore, the four sensor units 20 are employed and arranged on the upper, lower, left and right surface areas of the outer diametric surface of the outer member 1, which correspond respectively to the top, bottom, forward and rearward positions relative to the tire tread surface or tire contact surface and are spaced a distance to have a 90° in phase difference therebetween in the circumferential direction, the load can be estimated with a high accuracy even under any load condition. In other words, when the load acting in a certain direction increases, a portion, in which the rolling elements 5 and the rolling surfaces 3 and 4 contact with each other, and a portion, in which they do not contact with each other, appear in 180° phase difference. Therefore, if the sensor units 20 are installed in a 180° phase difference to suit to such direction, the load applied to the outer member 1 through the rolling elements 5 can be by necessity transmitted to either one of the sensor units 20 and as a result, such load can be detected by the strain sensor 22.

Also, since in this third embodiment described hereinabove, the number of the rolling surface temperature sensors 28B is chosen to be four, that is, the same as the number of the sensor units 20 employed and those rolling surface temperature sensors 28B are provided in phase matched relation with the circumferential locations of the associated sensor units 20 on the outer member 1, the temperatures in the vicinity of respective portions of the rolling surfaces adjacent the corresponding sensor units 20 can be detected and the correction performed by the temperature corrector 35A of the load estimating section 30 can be accomplished accurately and, therefore, the accuracy of the estimated load value finally obtained can be increased correspondingly.

In addition, since in the third embodiment described hereinabove, arrangement has been made that the temperature corrector 35A of the load estimating section 30 corrects the output signal of the strain sensor 22 of each of the sensor units 20 with the difference between the output of the sensor temperature sensor 28 and the output of the rolling surface temperature sensor 28B and that the amount of correction is determined from a linear approximated relational expression between the difference in output of those temperature sensors 28A and 28B and the amount of correction, the amount of offset superimposed on the output signal of the strain sensor 22, that is, the heat strain resulting from the temperature gradient occurring from inside to surface of the outer member 1 can be sufficiently reduced, allowing the accuracy of the load estimated value to be increased.

Figure 21:
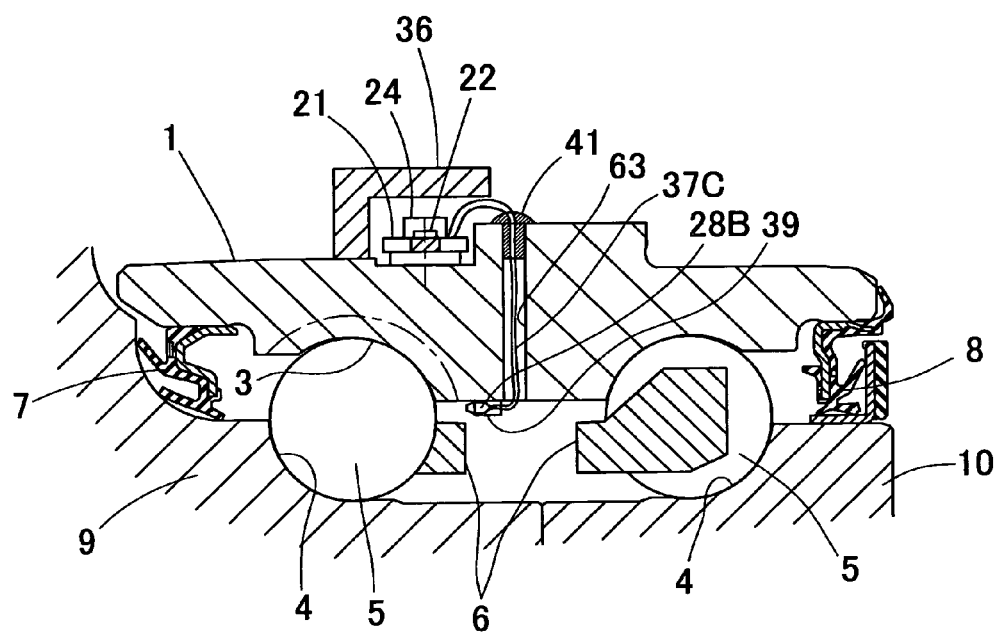
FIG. 21 is an enlarged sectional view showing the different site where the rolling surface temperature sensor is installed in the sensor equipped wheel support bearing assembly.
Figure 22A:
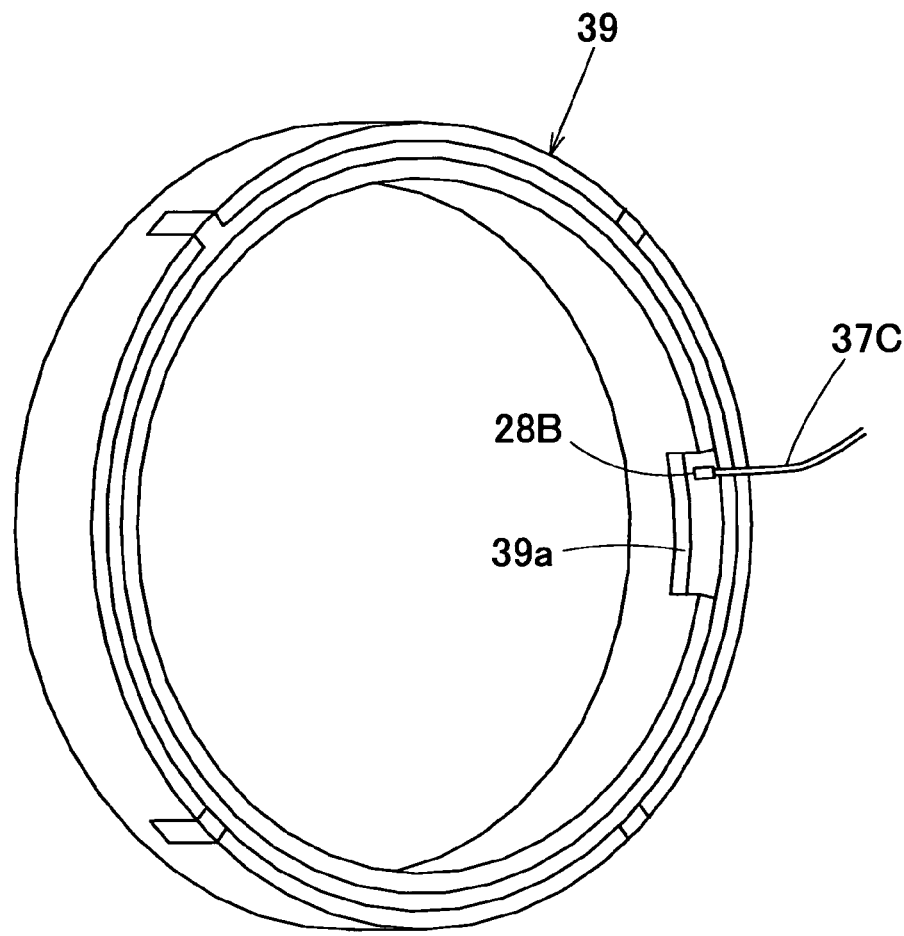
FIG. 22A is a perspective view showing a temperature sensor supporting member used in the site where the rolling surface temperature sensor is installed.
Figure 22B:
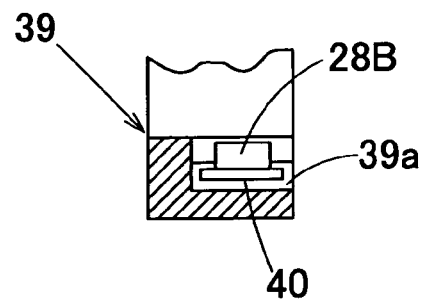
FIG. 22B is a fragmentary sectional view of FIG. 22A.
Figure 23:
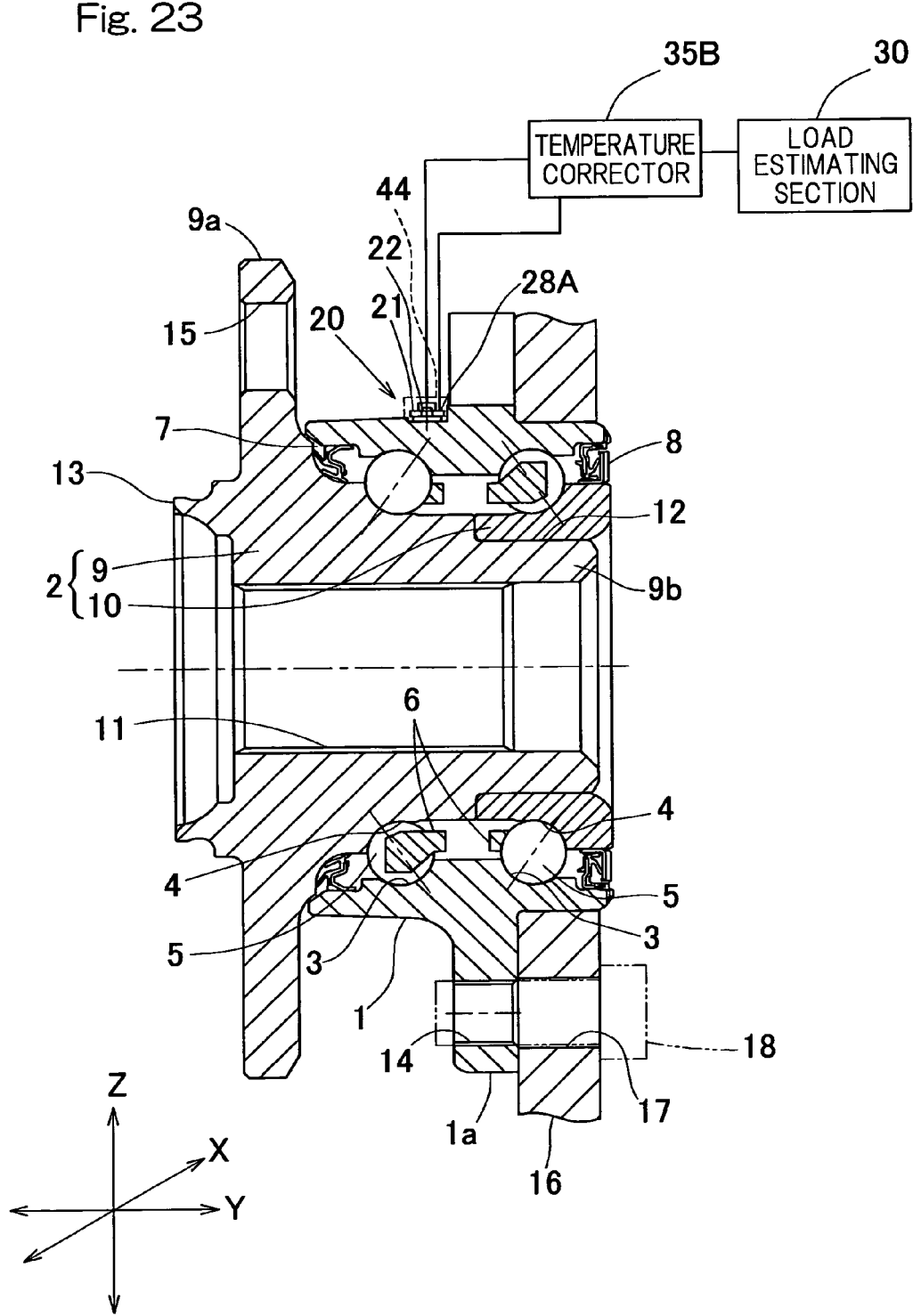
FIG. 23 is a diagram showing a sectional view of the sensor equipped wheel support bearing assembly according to a fourth preferred embodiment of the present invention, shown together with a block diagram of a conceptual construction of a detecting system therefor.

FIG. 21 and FIGS. 22A and 22B illustrate a different example of installation of the rolling surface temperature sensor 28B in the practice of the third embodiment of the present invention described hereinbefore. In this example, a radially extending throughhole 63 is defied in the outer member 1, serving as the stationary member, at a location intermediate of the double row rolling surfaces 3 and the signal line 37C connected with the rolling surface temperature sensor 28B is inserted through this throughhole 63 with the raceway temperature sensor 28B positioned in the vicinity of the rolling surfaces 3 in the outer member 1. The signal line 37C of the rolling surface temperature sensor 28B is drawn outwardly from one location of the protective covering 36 together with the respective signal lines 37A and 37B of the strain sensor 22 and the sensor temperature sensor 28A by way of the sensor unit 20.

In the vicinity of the rolling surface 3 in the inner diametric surface of the outer member 1, the temperature of which is to be detected by the rolling surface temperature sensor 28B, a ring shaped temperature sensor support member 39 best shown in FIG. 22A is press-fitted and the rolling surface temperature sensor 28B is embedded in this temperature sensor support member 39. As shown in a fragmentary sectional representation in FIG. 22B, the temperature sensor support member 39 has a portion of its inner diametric surface formed with a recess 39a, within which a flexible substrate 40 having circuits for the rolling surface temperature sensor 28B formed therein is provided with the rolling surface temperature sensor 28B mounted on such flexible substrate 40. Although in FIG. 22A, the rolling surface temperature sensor 28B has been shown and described as provided in the recess 39a defined at one location of the temperature sensor support member 39, four rolling surface temperature sensors 28B may be employed one for each of the circumferential locations corresponding to the respective sites of installation of the sensor units 20. When the rolling surface temperature is measured at those four locations, the temperature correction can be accomplished further accurately. The signal line 37C of each of those rolling surface temperature sensors 28B is drawn outwardly through the common throughhole 63 to an outer peripheral side and the throughhole 63 is then sealed by a sealing device 41.

In the example in which the rolling surface temperature sensor 28B is installed as hereinabove described, since the throughhole 63 is defined in a portion of the outer member 1 intermediate of the double row rolling surfaces 3 so as to extend radially and the rolling surface temperature sensor 28B connected with the signal line 37C inserted in the throughhole 63 is provided in the vicinity of the rolling surface 3, the rolling surface temperature sensor 28B can be easily installed in the vicinity of the rolling surface 3 in the inner diametric surface of the outer member 1.

Also, since the ring shaped temperature sensor support member 39 is engaged in the inner diametric surface of the outer member 1, where the rolling surface 3 is formed, and the rolling surface temperature sensor 28B is embedded in this temperature sensor support member 39, a work of fixing and positioning of the rolling surface temperature sensor 28B can be facilitated.

In addition, since the flexible substrate. 40 for wiring and surface mounting of the rolling surface temperature sensor 28B is provided inside the temperature sensor support member 39, wiring of the rolling surface temperature sensor 28B within the temperature sensor support member 39 can be accomplished by the utilization of the flexible substrate 40, wherefore the wiring can be easily accomplished, the structure can be compactized and an undesirable occurrence of wiring breakage can be removed. Also, even when the plurality of the rolling surface temperature sensors 28B are to be arranged, the wiring and fixing work can be performed simply.

Yet, since the use is made of the plural rolling surface temperature sensors 28B and the signal lines 37C connected respectively with those rolling surface temperature sensors 28B are commonly passed through the throughhole 63, which is in turn sealed by the sealing device 41, the wiring can be facilitated and an undesirable ingress of a water component into the inside of the outer member through the throughhole 63 can be avoided.

A fourth preferred embodiment of the present invention will be described in detail with particular reference to FIGS. 23 to 26. In FIGS. 23 to 26, component parts similar to those shown in and described with reference to FIGS. 1 to 11 in connection with the first embodiment of the present invention are designated by like reference numerals and the details thereof are not therefore reiterated for the sake of brevity. As compared with the previously described first embodiment, this fourth embodiment differs therefrom in that the further provision is made of a sensor temperature sensor 28A fitted to the strain generating member 21 for detecting the temperature of the site of installation of the strain sensor 22, a heat insulating material 44 interposed between the sensor unit 20 and the ambient air around this sensor unit 20, and a temperature corrector 35B for correcting the sensor output signal of the sensor unit 20 with an output of the sensor temperature sensor 28A such that the load estimating section 30 can estimate the load, acting on the wheel support bearing assembly or the wheel tire, from a signal corrected by the temperature corrector 35B.

Figure 24:
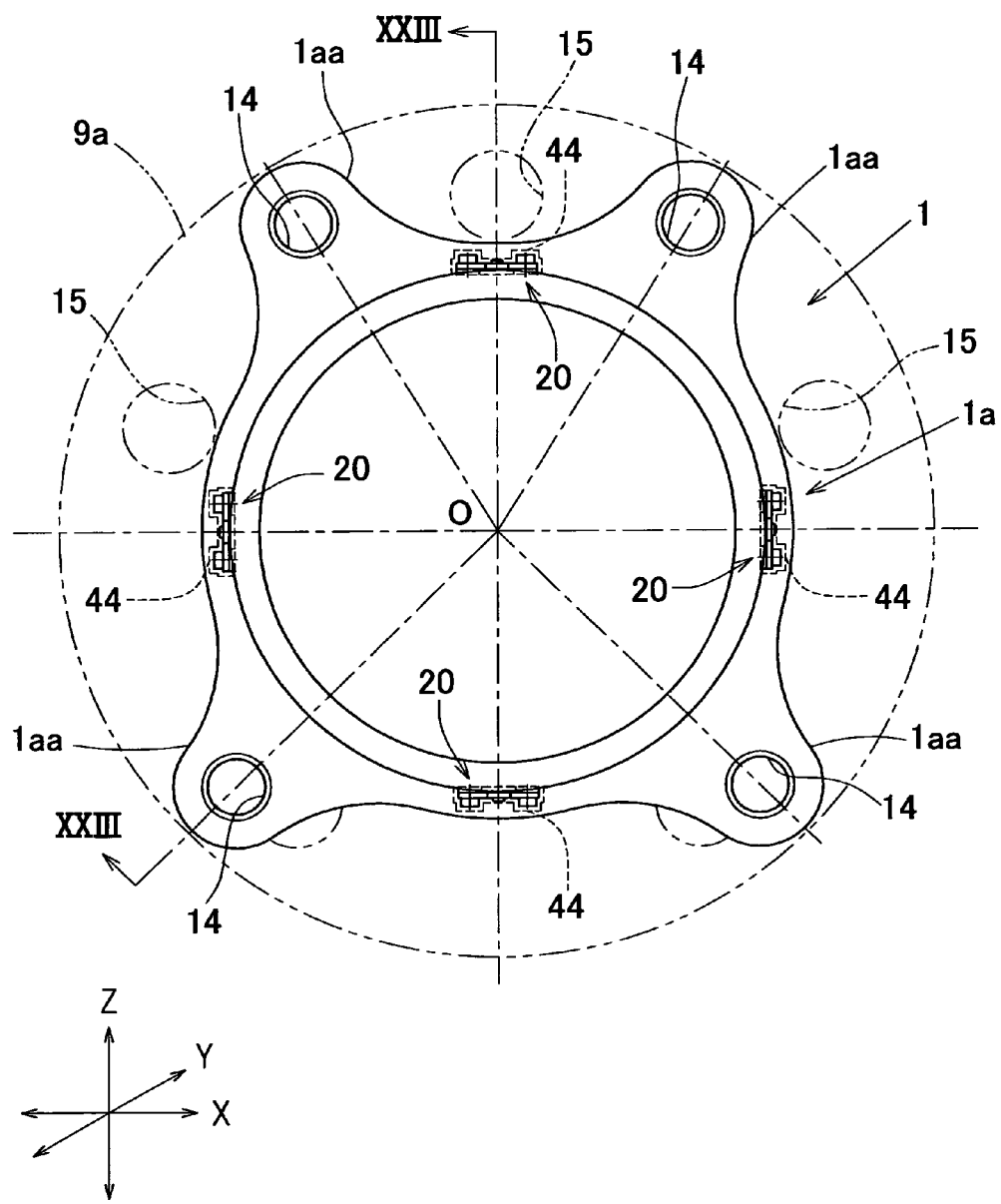
FIG. 24 is a front elevational view showing the outer member of the sensor equipped wheel support bearing assembly as viewed from the outboard side.

As best shown in FIG. 24, three or more sensor units 20 are provided on the outer diametric surface of the outer member 1 serving as the stationary member. In the instance as shown, the four sensor units 20 are provided on the upper, lower, left and right surface areas of the outer diametric surface of the outer member 1, which correspond respectively to the top, bottom, forward and rearward positions relative to the tire tread surface or tire contact surface, and spaced a distance enough to have a 90° in phase difference therebetween in a direction circumferentially thereof. In this embodiment, the two sensor units 20 forming one of the sensor unit pairs are provided at two locations, that is, on the upper and lower surface area of the outer diametric surface of the outer member 1, which correspond respectively to the top and bottom positions relative to the tire tread surface. Also, the two sensor units 20 of the other of the sensor unit pairs are provided at two locations, that is, on the left and right surface areas of the outer diametric surface of the outer member 1, which correspond respectively to the forward and rearward positions relative to the tire tread surface.

Figure 25:
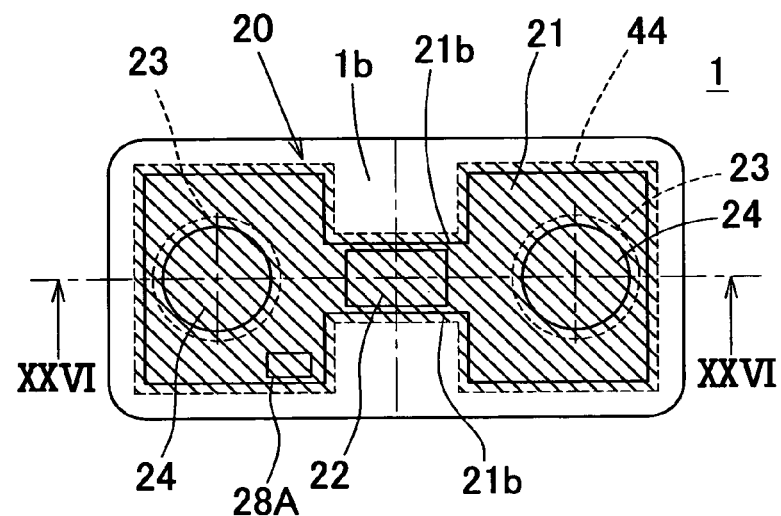
FIG. 25 is an enlarged plan view showing the sensor unit employed in the sensor equipped wheel support bearing assembly.
Figure 26:
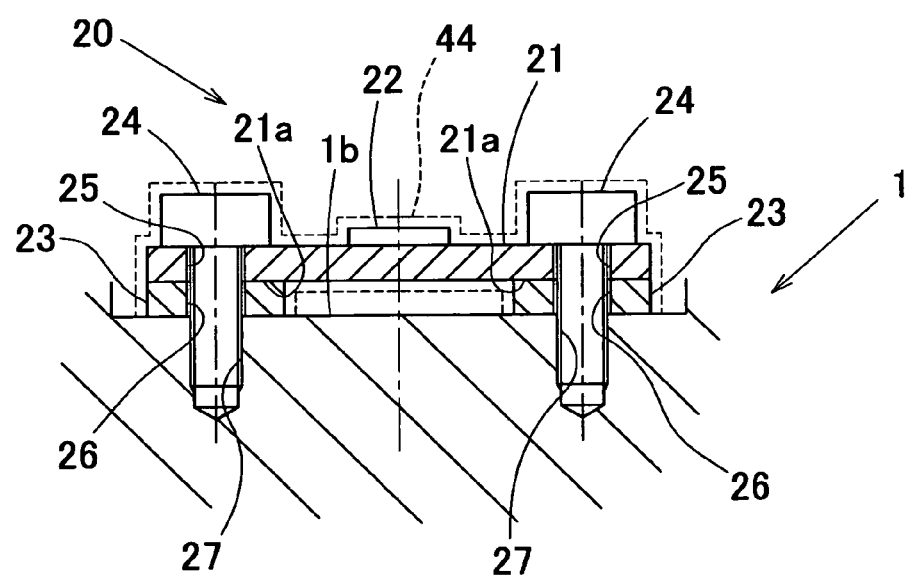
FIG. 26 is a cross sectional view taken along the line XXVI-XXVI in FIG. 25.

As shown in an enlarged plan view in FIG. 25 and in an enlarged sectional view in FIG. 26, those sensor units 20 correspond to those shown and described with reference to FIGS. 3 and 4 in connection with the previously described first embodiment and the shape of and the material for the strain generating member 21 employed in the practice of the fourth embodiment are similar to those employed in the previously described first embodiment, and therefore, the details thereof are not reiterated for the sake of brevity, noting that the only difference therefrom resides in that the fourth embodiment of the present invention makes use of the heat insulating material 44 and the sensor temperature sensor 28A.

The sensor unit 20 has its surface covered by the heat insulating material 44 and, accordingly, the sensor unit 20 is shielded from the ambient air. The heat insulating material 44 is provided as a covering layer for covering the sensor unit 20 and covers the entire surface of the sensor unit 20 except for the surface of contact with the outer member 1. The heat insulating material 44 employed in the instance as shown is a material of a low heat conductivity selected from the group consisting of, for example, urethane foam, foamed resin molding material, resin molding material of a urethane system, and rubber.

The strain sensor 22 and the sensor temperature sensor 28A employed in each of the sensor units 20 are connected with the load estimating section 30 through the temperature corrector 35B. The load estimating section 30 is operable to estimate the force (the vertical load Fz, the load Fx expected to become the driving force or the braking force and the axial load Fy) acting on the wheel support bearing assembly or between the vehicle wheel and the road surface in reference to the output signal of the strain sensor 22. The temperature corrector 35B is operable to correct the output signal of the strain sensor 22 with the output of the sensor temperature sensor 28A. This temperature corrector 35B corrects the output signal of the strain sensor 22 in accordance with, for example, calculation equations or tables (not shown), in which relations between the temperature and the corrected value or the output signal which forms results of corrections are set. The load estimating section 30 is operable to estimate the vertical load Fz, which is a radial load, and the load Fx expected to become the driving force or the braking force, and the axial load Fy, which is a cornering force, from the output signal of the strain sensor 22 which has been corrected by the temperature corrector 35B.

The load estimating section 30 includes a relation setting module (not shown), in which relations between the previously described working force and correction values of the output signal of the strain sensor 22 obtained from the temperature corrector 35B are set in the form of calculation equations or tables, and outputs the value of the working force from the inputted correction value by the utilization of the relation setting module. The contents of the relation setting module are determined by means of a series of experiments and/or simulations before they are set in the relation setting module.

When a load acts between the tire on the vehicle wheel and the road surface, such load is applied to the outer member 1, which is the stationary member of the wheel support bearing assembly, accompanied by deformation of the outer member 1. Since the two contact fixing segments 21a of the strain generating member 21 in each of the sensor units 20 are fixed to the outer diametric surface of the outer member 1 in contact therewith, the strain appearing in the outer member 1 can be transmitted to the strain generating member 21 after having been amplified and such strain is highly sensitively detected by the strain sensor 22, allowing the load to be detected with a high accuracy.

The sensor temperature sensor 28A for detecting the temperature at the site of installation of the strain sensor 22 in the strain generating member 21 of the sensor unit 20 is fitted to such strain generating member 21 and since in the load estimating section 30 the output signal of the strain sensor 22 is corrected by the temperature corrector 35B with the output of the sensor temperature sensor 28A so that from the corrected signal the load acting on the wheel support bearing assembly or the wheel tire can be estimated. Accordingly, any change occurring in the output signal of the strain sensor 22 because of the difference in coefficient of linear expansion between the outer member 1 and the sensor unit 20 can be corrected in the event of the change in temperature of the wheel support bearing assembly as a result of heat emission incident to rotation of the wheel support bearing assembly and/or the ambient environment. In such case, if the heat insulation between the sensor unit 20 and the ambient air is insufficient, the heat dissipation resistance changes depending on the ambient condition around the strain sensor 22 (such as, for example, the air flow and/or the presence or absence of water deposit) or the condition of the ambient air. Therefore, the temperature of the outer member 1 and the temperature detected by the sensor temperature sensor 28A displace from each other to such an extent that the correction value calculated by the temperature corrector 35B and the actual condition of temperature dependent expansion displace relative to each other, and an error will finally occur in the load estimated by the load estimating section 30. However in this sensor equipped wheel support bearing assembly, the sensor unit 20 is insulated from the ambient air by the presence of the heat insulating material 44, the influence brought about by the external environment as described above can be minimized and the load acting on the wheel support bearing assembly or between the wheel tire and the road surface can be stably detected with a high accuracy.

Also, since in the fourth embodiment described hereinabove, the four sensor units 20 are employed and arranged on the upper, lower, left and right surface areas of the outer diametric surface of the outer member 1, which correspond respectively to the top, bottom, forward and rearward positions relative to the tire tread surface or tire contact surface and are spaced a distance enough to have a 90° in phase difference therebetween in the circumferential direction, the load can be estimated with a high accuracy even under any load condition. In other words, when the load acting in a certain direction increases, a portion, in which the rolling elements 5 and the rolling surfaces 3 and 4 contact with each other, and a portion, in which they do not contact with each other, appear in 180° phase difference. Therefore, if the sensor units 20 are installed in a 180° phase difference to suit to such direction, the load applied to the outer member 1 through the rolling elements 5 can be by necessity transmitted to either one of the sensor units 20 and as a result, such load can be detected by the strain sensor 22.

FIG. 27 to FIGS. 35A and 35B illustrate a fifth preferred embodiment of the present invention. The sensor equipped wheel support bearing assembly according to this fifth embodiment is of a structure, in which the sensor unit 20 is fitted to an annular protective covering 36A. The sensor unit 20 is made up of, as best shown in FIG. 32 illustrating the previously described electronic component parts arranged inwardly of the protective covering 36A in a developed form, the strain generating member 21, the strain sensor 22 fitted to the strain generating member 21 for detecting the strain appearing in this strain generating member 21, and the sensor temperature sensor 28A fitted to the strain generating member 21 for detecting the temperature at the site of installation of the strain sensor 22. An insertion hole 25 for passage of a bolt 24 (FIG. 28) used to secure the sensor unit 20 to the outer diametric surface of the outer member 1 is provided at two locations on respective sides of the strain sensor 22 on the strain generating member 21 and spaced a distance from each other in a lengthwise direction.

Figures 30A, 30B:
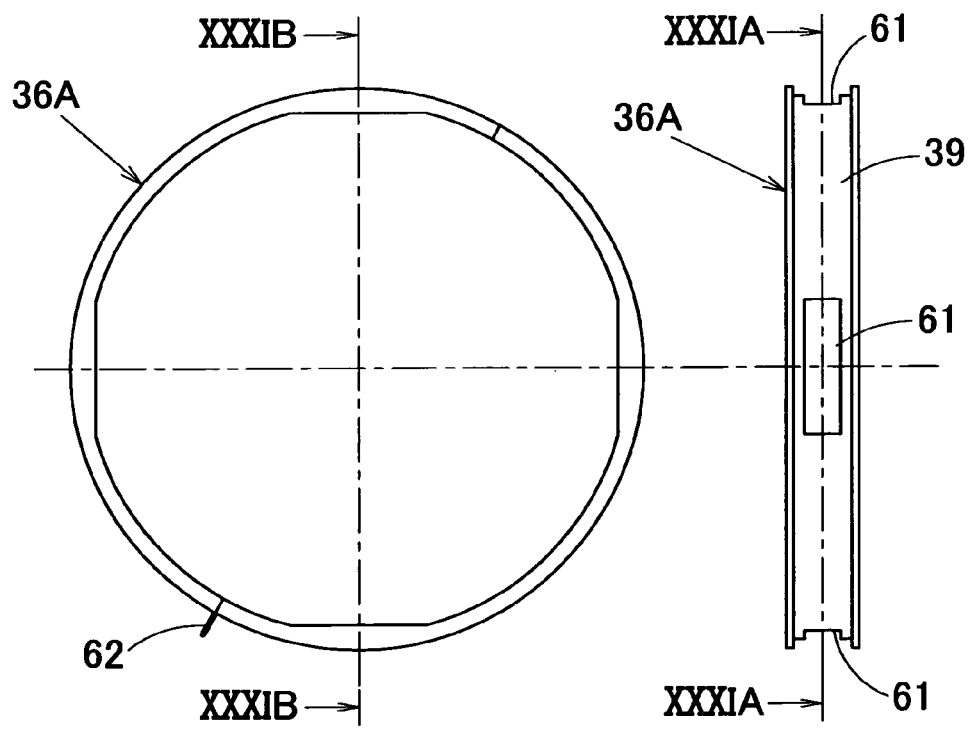
FIG. 30A is a front elevational view showing an annular protecting covering.
FIG. 30B is a side view showing the annular protecting covering.
Figure 33A:
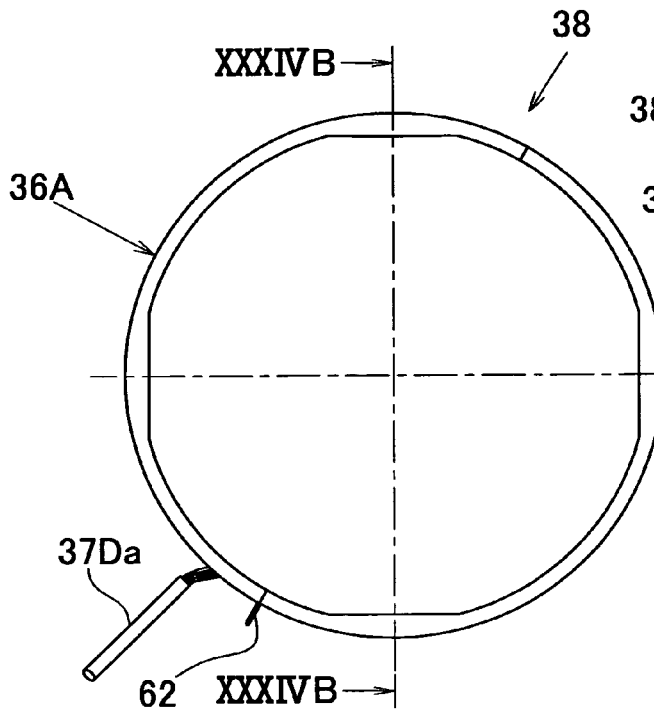
FIG. 33A is a front elevational view showing the sensor assembly.
Figure 33B:
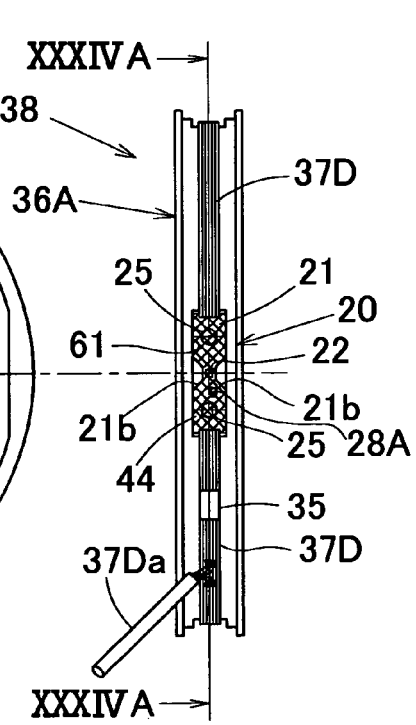
FIG. 33B is a side view showing the sensor assembly.

Even in this fifth embodiment, the sensor unit 20 is rendered to be four in number and they, together with electronic component parts including, for example, a signal processing IC 55 for processing the output signal of the strain sensor 22 of each sensor unit 20 and a respective signal cable 37D (FIG. 32) for transmitting the processed output signal to the outside of the wheel support bearing assembly, are arranged inwardly of the annular protective covering 36A, shown respectively in front elevation and side view in FIGS. 30A and 30B, to provide an annular sensor assembly 38 shown respectively in front elevational and side views in FIGS. 33A and 33B. The signal cable 37D between the neighboring sensor units 20 is wired along a groove 60 (FIGS. 31A and 31B) defined in the protective covering 36A and the signal processing IC 55 is arranged halfway along the signal cable 37D. A draw-out portion 37Da, from which the signal cables 37 are drawn outwardly towards the automotive body structure, is drawn outwardly of the protective covering 36A from one location of the protective covering 36A. Material for the protective covering 36 may be either a plastic material or a rubber material or a metal such as, for example, stainless steel.

Figures 31A, 31B:
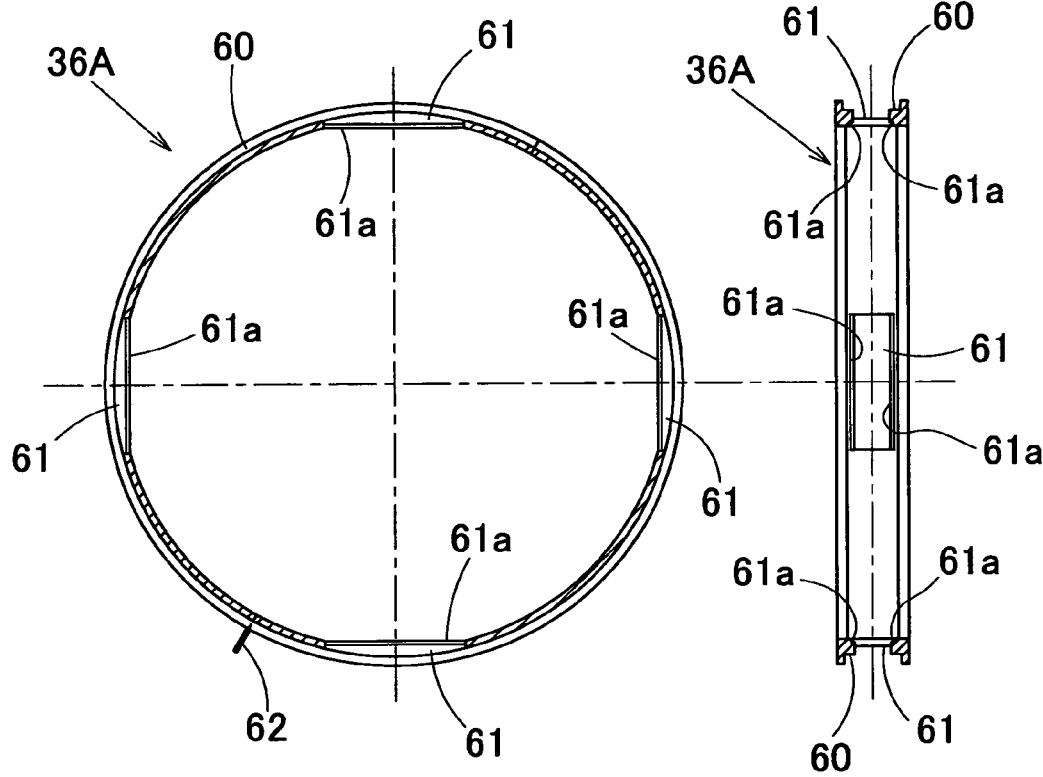
FIG. 31A is a cross sectional view taken along the line XXXIA-XXXIA in FIG. 30B.
FIG. 31B is a cross sectional view taken along the line XXXIB-XXXIB in FIG. 30A.
Figure 34A:
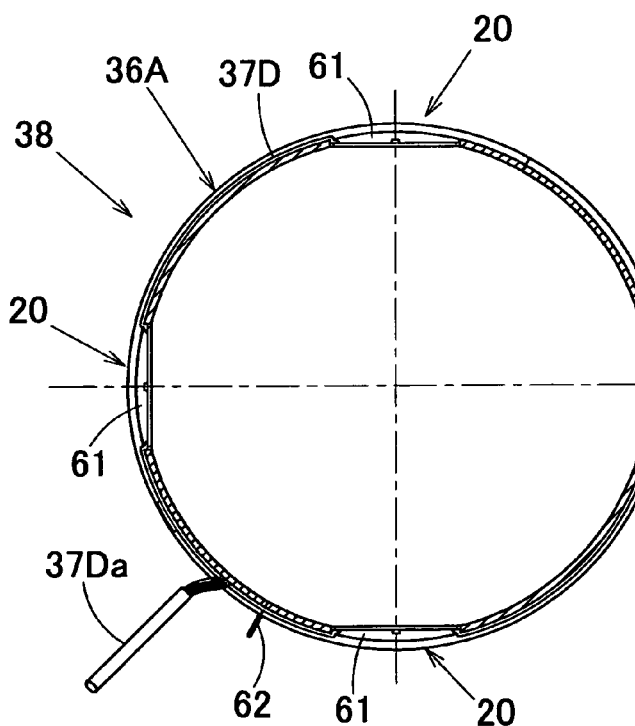
FIG. 34A is a cross sectional view taken along the line XXXIVA-XXXIVA in FIG. 33B.
Figure 34B:
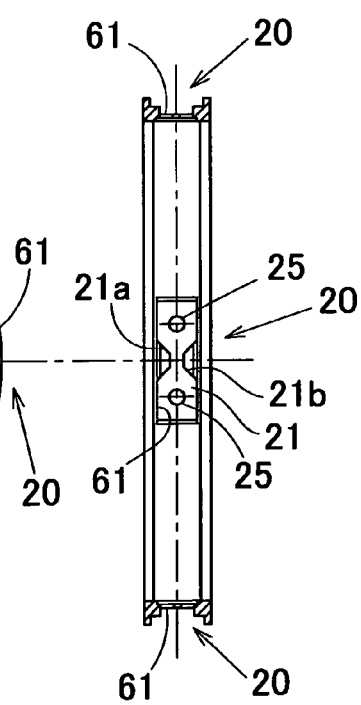
FIG. 34B is a cross sectional view taken along the line XXXIVB-XXXIVB in FIG. 33A.

As best shown in FIGS. 31A and 31B in cross sectional views taken respectively along the lines XXXIA-XXXIA in FIG. 30B and XXXIB-XXXIB in FIG. 30A, the protective covering 36A has the groove 60 defined in an outer diametric surface thereof so as to extend in a direction circumferentially thereof, and at four circumferential locations of the groove 60, where respective sites of installation of the four sensor units 20 are defined, corresponding openings 61 opening in a direction radially of the protective covering 36A are defined. Opposite side edges on an inner diametric side of those openings 61 along the circumferential direction are provided with flat engagement steps 61a with which the corresponding strain generating members 21 of the sensor units 20 are engaged. Accordingly, as shown in FIGS. 34A and 34B in cross sectional views taken respectively along the lines XXXIVA-XXXIVA in FIG. 33B and XXXIVB-XXXIVB in FIG. 33A, each of the sensor unit 20 is disposed in the respective opening 61 in the protective covering 36A with its strain generating member 21 exposed radially inwardly of the protective covering 36A.

Figure 35A:
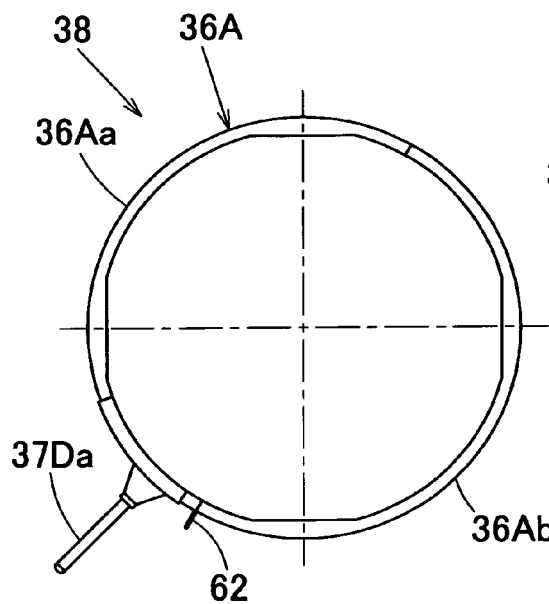
FIG. 35A is a front elevational view showing a condition in which the sensor assembly is closed.
Figure 35B:
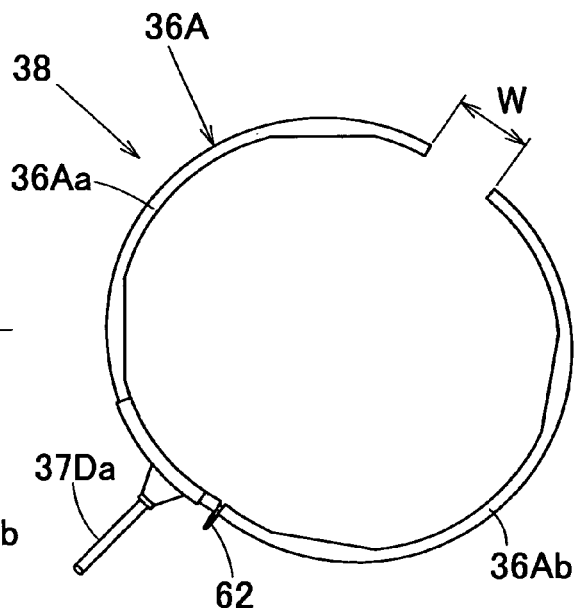
FIG. 35B is a front elevational view showing a condition in which the sensor assembly is opened.

The annular sensor assembly 38 referred to above is, as best shown in FIGS. 35A and 35B, capable of being split into two components. More specifically, the annular protective covering 36A is made up of two split bodies 36Aa and 36Ab that are hingedly connected with each other at one end thereof by means of a hinge 62 for movement between opened and closed positions about the hinge axis, and two semicircular components forming the sensor assembly 38 are therefore rendered to be movable between opened and closed positions about the hinge axis of the hinge 62. In the opened position, the sensor assembly 38 has a maximum opening size W greater than the outer diameter D (FIG. 28) of the outer member 1. Accordingly, the sensor assembly 38 can be fitted to the outer diametric surface of the outer member 1 when the sensor assembly 38 is opened to the maximum opening size W thereof.

Figure 28:
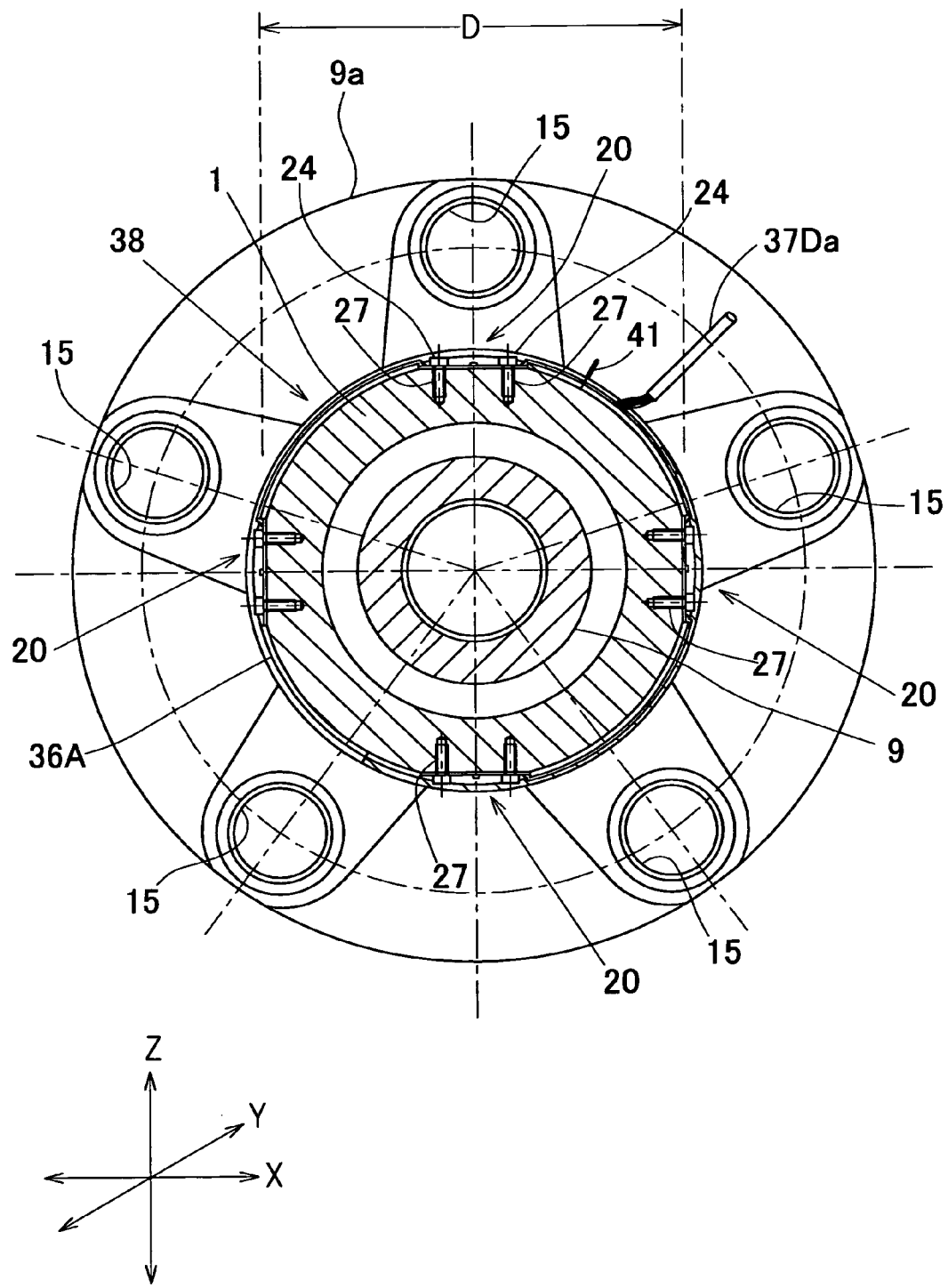
FIG. 28 is a cross sectional view taken along the line XXVIII-XXVIII in FIG. 27.
Figure 29:
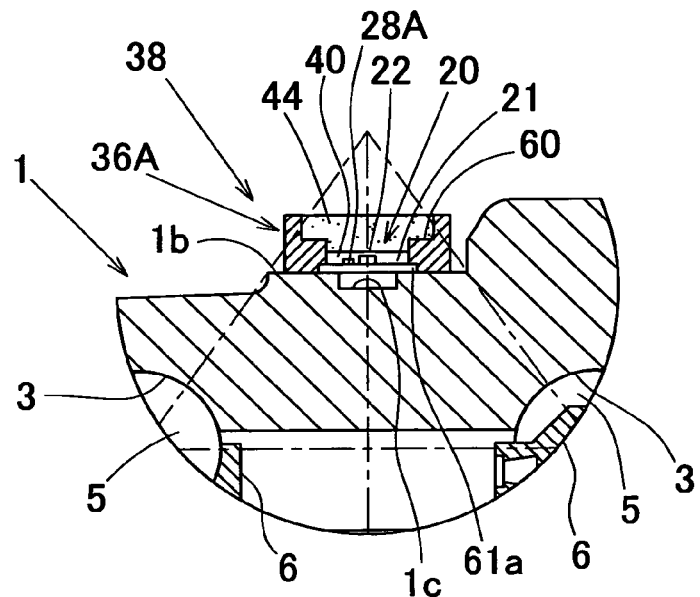
FIG. 29 is an enlarged sectional view showing a site of the outer member, shown in FIG. 27, where a sensor assembly is installed.

An axial position of the outer diametric surface of the outer member 1 shown in FIG. 28, where the sensor assembly 38 of the type discussed above is fitted, has its entire circumference rendered to be a cylindrically ground surface area and circumferentially spaced four portions, that is, upper, lower, left and right portions, of the cylindrically ground surface area of the outer member 1 are rendered to be flat surface areas 1b as best shown in FIG. 29. Accordingly, the respective strain generating members 21 of the sensor units 20 can be assuredly held in contact with the flat surface areas 1b of the outer member 1. Also, the flat surface areas 1b are provided with internally threaded holes 27 (FIG. 28) alignable with the respective bolt insertion holes 25 defined in the associated strain generating members 21. Accordingly, when, after the sensor assembly 38 has been assembled onto the outer diametric surface of the outer member 1, the bolts 24 (FIG. 28) inserted through the bolt insertion holes 25 in the strain generating members 21 are threaded into the internally threaded holes 27, the sensor units 20 are fixed to the outer diametric surface of the outer member 1 and, at the same time, the sensor assemblies 38 as a whole are fixed in position. A portion of each of the flat surface areas 1b, which is situated intermediate between the corresponding two internally threaded holes 27, is provided with an axially extending groove 1c (FIG. 29). Accordingly, since the constricted bridge portion of the respective strain generating member 21, bound between the cutouts 21b, is separated from the associated flat surface area 1b, a strain induced deformation takes place easily in the vicinity of the cutouts 21b. The four sensor units 20 are provided at respective positions so that the respective strain sensors 22 can be held at the respective positions to give the same dimension of the sensor 22 with respect to the axial direction of the outer member 1.

A portion of the outer member 1, where the respective sensor assembly 38 in the practice of the fifth embodiment of the present invention is fitted is best shown in FIG. 29 on an enlarged scale. As shown therein, after the sensor assembly 38 has been fitted to the outer diametric surface of the outer member 1, a portion of the sensor unit 20 in the sensor assembly 38, which is exposed from the protective covering 36A, is covered by the heat insulating material 44 and, accordingly, the sensor unit 20 is shielded by the heat insulating material 44 from the ambient air. Also, respective portions of the electronic component parts (the signal processing IC 55, the signal cable 37D) of the sensor assembly 38, which are exposed form the protective covering 36A, are also sealed by a molding material (not shown). More specifically, the molding material is filled in the entire circumference of the groove 60 in the protective covering 36A with the exposed portions of the electronic component parts sealed. The molding material may be the same material as the heat insulating material 44. In order for the protective covering 36A to have a sufficient strength and a sufficient corrosion resistance and, also, to increase the effect of shielding the sensor units from the ambient air, material for the protective covering 36A is preferably chosen to be stainless steel.

The strain sensor 22 and the sensor temperature sensor 28A, both included in the sensor unit 20, are connected with the signal processing IC 55 through the temperature corrector 35B employed in the fourth embodiment shown in FIGS. 23 to 26. The signal processing IC 55 includes the load estimating section (corresponding to the load estimating section 30 shown in and described with reference to FIGS. 23 to 26 in connection with the fourth embodiment of the present invention) for estimating the force (the vertical load Fz, the load Fx expected to become the driving force and the axial load Fy) acting on the wheel support bearing assembly or between the vehicle wheel and the road surface (the tire tread or contact surface) in reference to the output signal of the strain sensor 22 and includes a signal processing circuit and a correcting circuit. The correcting circuit is connected with the temperature corrector 35B. Other structural features than those described above are similar to those employed in the fourth embodiment of the present invention shown in FIGS. 23 to 26.

Even in this fifth embodiment of the present invention, the design has been made that in the operation of the signal processing IC 55, which forms a load estimating section, the temperature corrector 35B corrects the output signal of the strain sensor 22 with the output of the sensor temperature sensor 28A and the load acting on the wheel support bearing assembly or the wheel tire is estimated from the signal so corrected. During the operation, since the sensor unit 20 is shielded by the heat insulating material 44 from the ambient air, the difference between the temperature of the outer member 1 and the temperature detected by the sensor temperature sensor 28A can be reduced and influences brought about by the ambient environment can be minimized, allowing the load acting on the wheel support bearing assembly or the tire tread surface can be highly accurately detected in a stabilized fashion.

Also, in this fifth embodiment, the electronic component parts including the plurality of the sensor units 20, the signal processing IC 55 for processing the output signals of the strain sensors 22 and the signal cables 37D for drawing the processed output signals to the outside of the wheel support bearing assembly are arranged inwardly of the annular protective covering 36A to define the respective annular sensor assemblies 38 which are in turn fitted to the outer diametric surface of the outer member 1 in a coaxial relation with the outer member 1, damages (such as caused by stepping stones, corrosion caused by muddy water and/or salty water) brought about by the external environment to the electronic component parts including the sensor units 20 can be avoided and the load can be accurately detected for a substantially prolonged period of service. Also, wiring of the signal cables 37D and installation of the strain sensors 22 can be facilitated. In addition, since the protective covering 36A is of a structure effective to cover the sensor units 20, protection of the sensor units 20 and shielding thereof from the ambient air can be realized with a compact structure.

Also, since in this fifth embodiment, the sensor assembly 38 is so designed and so configured as to have a capability of being split into two components, fitting it to the outer diametric surface of the outer member 1 serving as the stationary member can be made easy and the assemblability can be increased.

Yet, since in this fifth embodiment, the strain generating member 21 of the sensor unit 20 is fixed directly to the outer diametric surface of the outer member 1 serving as the stationary member with the use of the bolts 24, the sensor unit 20 can be firmly fixed and no slip occur in a fixing portion even under the loaded condition and the detecting accuracy can be increased correspondingly. Also, fixing of the sensor unit 20 to the outer member 1 with the use of the bolts 24 is effective to allow the sensor assembly 38 to be equally fitted to the outer member 1 and, therefore, the assemblability can be increased.

If the axial dimension of each of the sensor units 20, that is fixed to the outer diametric surface of the outer member 1 serving as the stationary member, differs from each other, the strain transmitted from the outer diametric surface of the outer member 1 to each of the strain generating members 21 also differs from each other. In view of this fact, in this fifth embodiment, the sensor units 20 are provided at such locations, where the strain sensors 22 assume the same dimensions with respect to the axial direction of the outer member 1, and, therefore, the electronic component parts including the plurality of the sensor units 20 can be protected by the protective covering 36A which encircles such axial positions, allowing the protective covering 36A to be fabricated compact in size.

Figure 36:
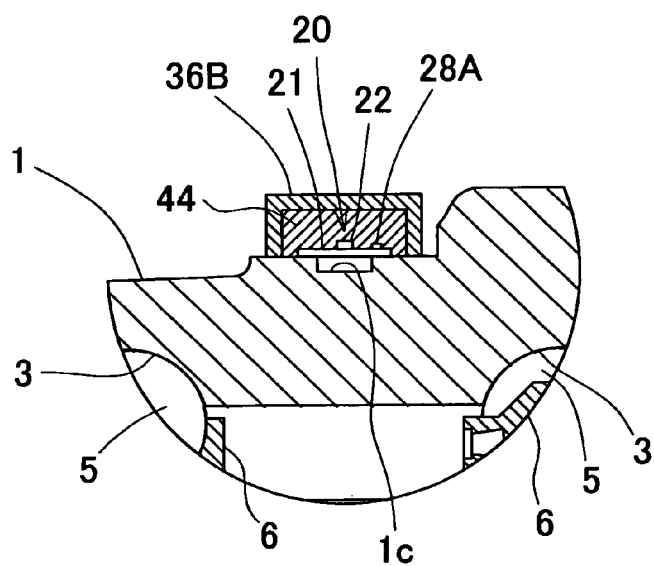
FIG. 36 is a fragmentary enlarged sectional view showing a portion of the sensor equipped wheel support bearing assembly according to a sixth preferred embodiment of the present invention.

FIG. 36 illustrates a sixth preferred embodiment of the present invention. This sensor equipped wheel support bearing assembly according to the sixth embodiment differs from the previously described fifth embodiment shown in FIG. 27 to FIGS. 35A and 35B in that the protective covering 36B is not concurrently used as a mounting member for the sensor units 20, but is employed in the form of an exclusively dedicated component for covering the sensor unit 20. In this embodiment as shown, the protective covering 36B is rendered to be an annular component of a groove shape or a U-sectioned shape having a portion thereof on the outer member 1 side opening and is fitted to the outer periphery of the outer member 1 in a mounted fashion covering the sensor units 20. In the instance as shown in FIG. 36, the protective covering 36B is rendered to have a sectional shape representing a groove shape, having been made up of an outer peripheral wall and a pair of side walls. The heat insulating material 44 used to shield the sensor unit 20 from the ambient air is filled in the entire interior of the protective covering 36B. Material for the protective covering 36B is, as is the case with that for the protective covering 36A shown in and described with particular reference to FIG. 27 to FIGS. 35A and 35B, preferably employed in the form of stainless steel. Other structural features than those described above are similar to those in the previously described fifth embodiment shown in and described with reference to FIG. 27 to FIGS. 35A and 35B.

Figure 37:
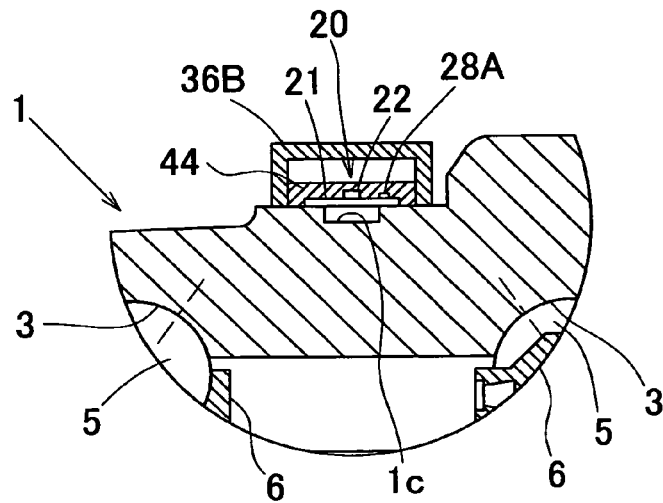
FIG. 37 is a fragmentary enlarged sectional view showing that portion of the sensor equipped wheel support bearing assembly according to a seventh preferred embodiment of the present invention.

FIG. 37 illustrates a seventh preferred embodiment of the present invention. The sensor equipped wheel support bearing assembly according to this seventh embodiment is similar to that according to the previously described sixth embodiment shown in FIG. 36, but differs therefrom in that the heat shielding material 44 used to shield the sensor unit 20 from the ambient air is not filled in the entire interior of the protective covering 36B, but is employed to cover only a surface of each of the sensor units 20. An air layer is formed between the surface of the sensor unit 20 and an inner surface of the outer peripheral wall of the protective covering 36B. This air layer functions as a heat insulating material and is cooperable with the previously described heat insulating material 44 to form a double layered heat insulating layer. Other structural features than those described above are similar to those in the previously described sixth embodiment shown in FIG. 36.

Figure 38:
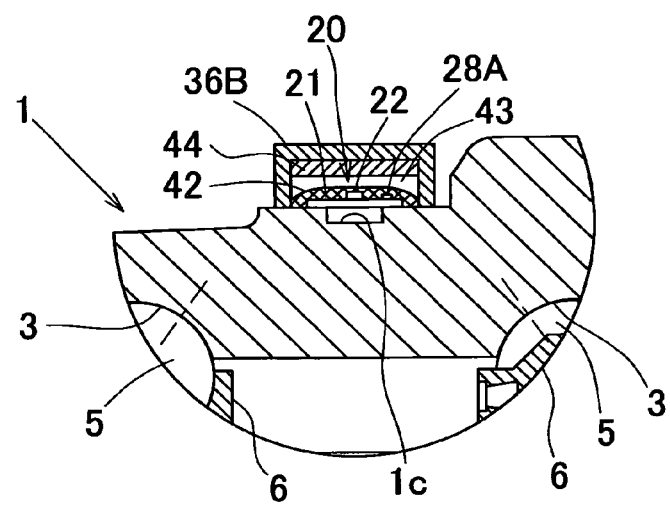
FIG. 38 is a fragmentary enlarged sectional view showing that portion of the sensor equipped wheel support bearing assembly according to an eighth preferred embodiment of the present invention.

FIG. 38 illustrates an eighth preferred embodiment of the present invention. The sensor equipped wheel support bearing assembly according to this eighth embodiment is similar to that according to the previously described sixth embodiment shown in FIG. 36, but differs therefrom in that within the interior of the protective covering 36B, the surface of the sensor unit 20 and surroundings of the site of installation of the sensor unit 20 on the outer diametric surface of the outer member 1 are covered by a material 42 of a high thermal conductivity and the heat insulating material 44 is filled in a space thereabove. For the material 42 of a high heat conductivity, a material having a heat conductivity as high as possible is desirable, but may suffices provided that it has a heat conductivity higher than the average heat conductivity of a resin material and, for example, the material 42 of a high heat conductivity may be employed in the form of a heat conductive paste or silicone rubber. The heat insulating material 44 referred to above is provided along the inner surface of the outer peripheral wall of the protective covering 36B and an air layer 43 is formed between the heat insulating material 44 and the material 42 of a high heat conductivity. This air layer 43 functions as a heat insulating material and is hence cooperable with the previously described heat insulating material 44 to define a double layered heat insulating layer. Other structural features than those described above are similar to those of the previously described sixth embodiment shown in FIG. 36.

According to the eighth embodiment described above, since the surface of the sensor unit 20 and the surroundings of the site of installation of the sensor unit 20 on the outer diametric surface of the outer member 1 are covered by the material 42 of a high heat conductivity to thereby reduce the difference in temperature between the outer diametric surface of the outer member 1 and the sensor unit 20, the displacement between the temperature of the outer member 1 and the temperature detected by the temperature sensor 28A can be minimized to allow the load, acting on the wheel support bearing assembly or the tire tread surface, to be stably detected with a high accuracy.

Figure 39:
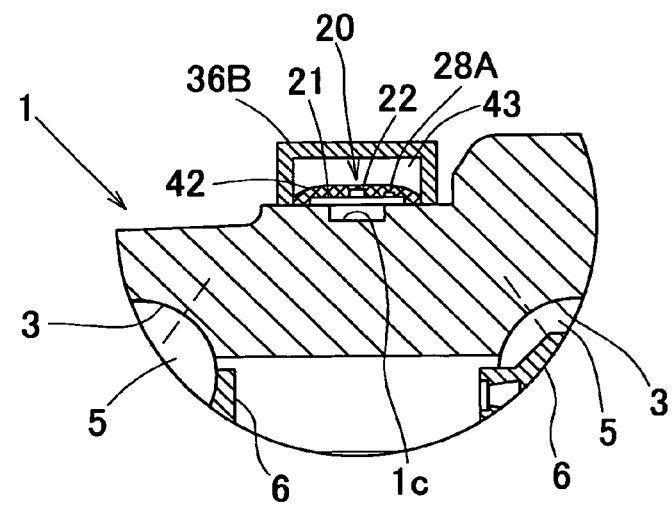
FIG. 39 is a fragmentary enlarged sectional view showing that portion of the sensor equipped wheel support bearing assembly according to a ninth preferred embodiment of the present invention.

FIG. 39 illustrates a ninth preferred embodiment of the present invention. The sensor equipped wheel support bearing assembly according to the ninth embodiment is similar to that according to the previously described sixth embodiment shown in FIG. 36, but differs therefrom in that within the interior of the protective covering 36B, not only are the surface of the sensor unit 20 and surroundings of the site of installation of the sensor unit 20 on the outer diametric surface of the outer member 1 are covered by a material 42 of a high thermal conductivity, and a space thereabove is formed as a sealing space for the air layer 43 so that the air layer 43 can be used in place of the previously described heat insulating material 44. Other structural features than those described above are similar to those of the previously described sixth embodiment shown in FIG. 36.

Figure 41:
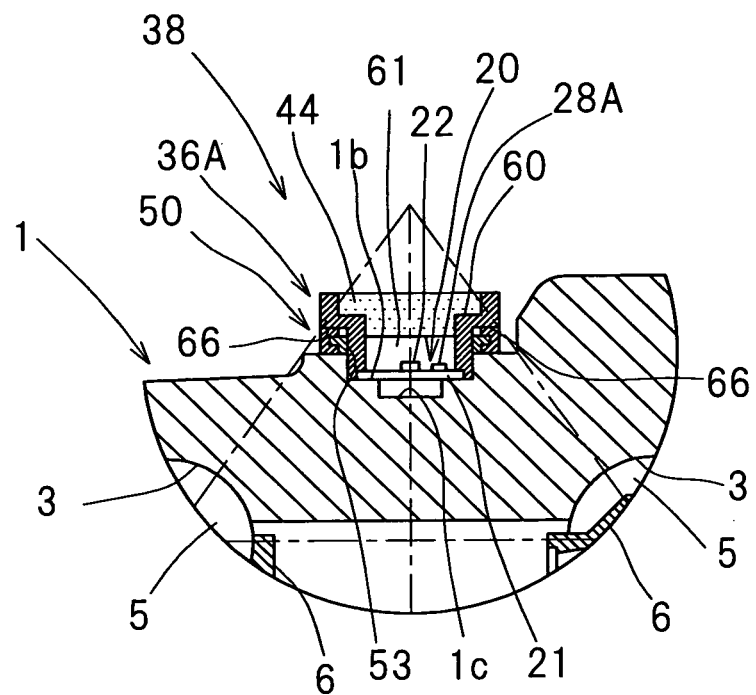
FIG. 41 is an enlarged sectional view showing the sensor assembly of the outer member of the sensor equipped wheel support bearing assembly at a circumferential position, where the sensor unit is installed.
Figure 42:
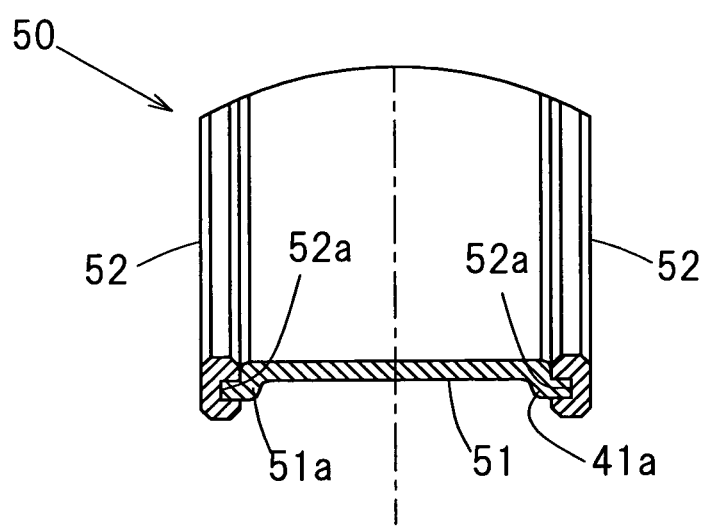
FIG. 42 is a fragmentary enlarged sectional view showing a sealing device.

FIGS. 40 to 42 illustrate a tenth preferred embodiment of the present invention. The sensor equipped wheel support bearing assembly according to the tenth embodiment is similar to that according to the previously described fifth embodiment shown in FIG. 27 to FIGS. 35A and 35B, but differs therefrom in that the annular sensor assembly 38 is fitted to the outer peripheral surface of the outer member 1 serving as the stationary member of the wheel support bearing assembly through a sealing device 50 in a fashion coaxial with the outer member 1. As shown in a fragmentary enlarged sectional representation in FIG. 42, the sealing device 50 is made up of a ring shaped core metal 51, extending along the inner diametric surface of the protective covering 36A, and a pair of ring shaped elastic bodies 52 each joined to the entire circumference of an opposite side edge portions of the core metal 51 from an inner diametric surface to an outer diametric surface. Circumferential locations of the sealing device 50, which confronts the sites of installation of the sensor units 20 in the sensor assembly 38, are provided with respective sensor unit exposure openings 53 (FIG. 41) each extending radially thereof. Accordingly, while the sensor assembly 38 is fitted to the outer diametric surface of the outer member 1, it is possible to allow the sensor unit 20 to contact the outer diametric surface of the outer member 1 through the sensor unit exposure opening 53 in the sealing device 50.

The core metal 51 of the sealing device 50 is in the form of a press work product made of a corrosion resistant steel material and the opposite side edges thereof, which are joined with the respective ring shaped elastic bodies 52, are rendered to be diametrically expanded bent portion 51a that is diametrically outwardly expanded. Each of the ring shaped elastic bodies 52 is rendered to have a generally U-sectioned configuration having a circumferentially extending groove 52a defined in an inwardly oriented side face thereof, and the ring shaped elastic bodies 52 are joined to the opposite side edges of the core metal 51 with the grooves 52a of the elastic bodies 52 press-fitted with the diametrically expanded bent portion 51a of the core metal 51. By employing such a joining structure as described above, the ring shaped elastic bodies 52 can be easily and simply joined to the opposite side edges of the core metal 51.

Also, opposite side portions of the inner diametric surface of the protective covering 36A for the annular sensor assembly 38 are formed with inner diametric side grooves 66 with which the ring shaped elastic bodies 52 of the sealing device 50 can be held in tight contact as best shown in FIG. 41. The sensor assembly 38 is, after the sealing device 50 has been press-fitted to the outer diametric surface of the outer member 1, fitted to the sealing device 50 in an overlapped fashion. Other structural features than those described above are similar to those of the previously described fifth embodiment shown in FIG. 27 to FIGS. 35A and 35B.

According to the tenth embodiment described above, since the sealing device 50 is made up of the ring shaped core metal 51, extending along the inner diametric surface of the protective covering 36A, and the pair of the ring shaped elastic bodies 52 joined to the entire circumferences of the opposite side edges of the core metal 51 so as to extend from the inner diametric surface to the outer diametric surface, the elastic bodies 52 at the opposite side edges of the sealing device 50 can be sandwiched between the outer diametric surface of the outer member 1 and the inner diametric surface of the protective covering 36A, allowing the elastic bodies 52 to shield the interior of the protective covering 36A from the ambient air, and, accordingly, the sealing effect of the sealing device 50 can be increased.

An eleventh preferred embodiment of the present invention will now be described in detail with particular reference to FIGS. 43 to 50. It is, however, to be noted that in FIGS. 43 to 40, component parts similar to those employed in the first embodiment shown in and described with reference to FIGS. 1 to 11 are designated by like reference numeral and, therefore, the details thereof are not reiterated for the sake of brevity. As compared with the previously described first embodiment, this eleventh embodiment differs therefrom in that the sensor equipped wheel support bearing assembly according to the eleventh embodiment further includes a first load estimating section 56 for calculating and estimating a load acting on the wheel support bearing assembly by the utilization of the average value of the output signals of the sensors, a second load estimating section 57 for calculating and estimating a load acting on the wheel support bearing assembly by the utilization of the amplitude value of the output signals of the sensors or the amplitude value thereof and the average value referred to above, and an output selector 65 for selecting a signal of either one of estimated load values of the first and second load estimating sections 56 and 57 in dependence on the wheel rotational speed and then outputting it.

Figure 43:
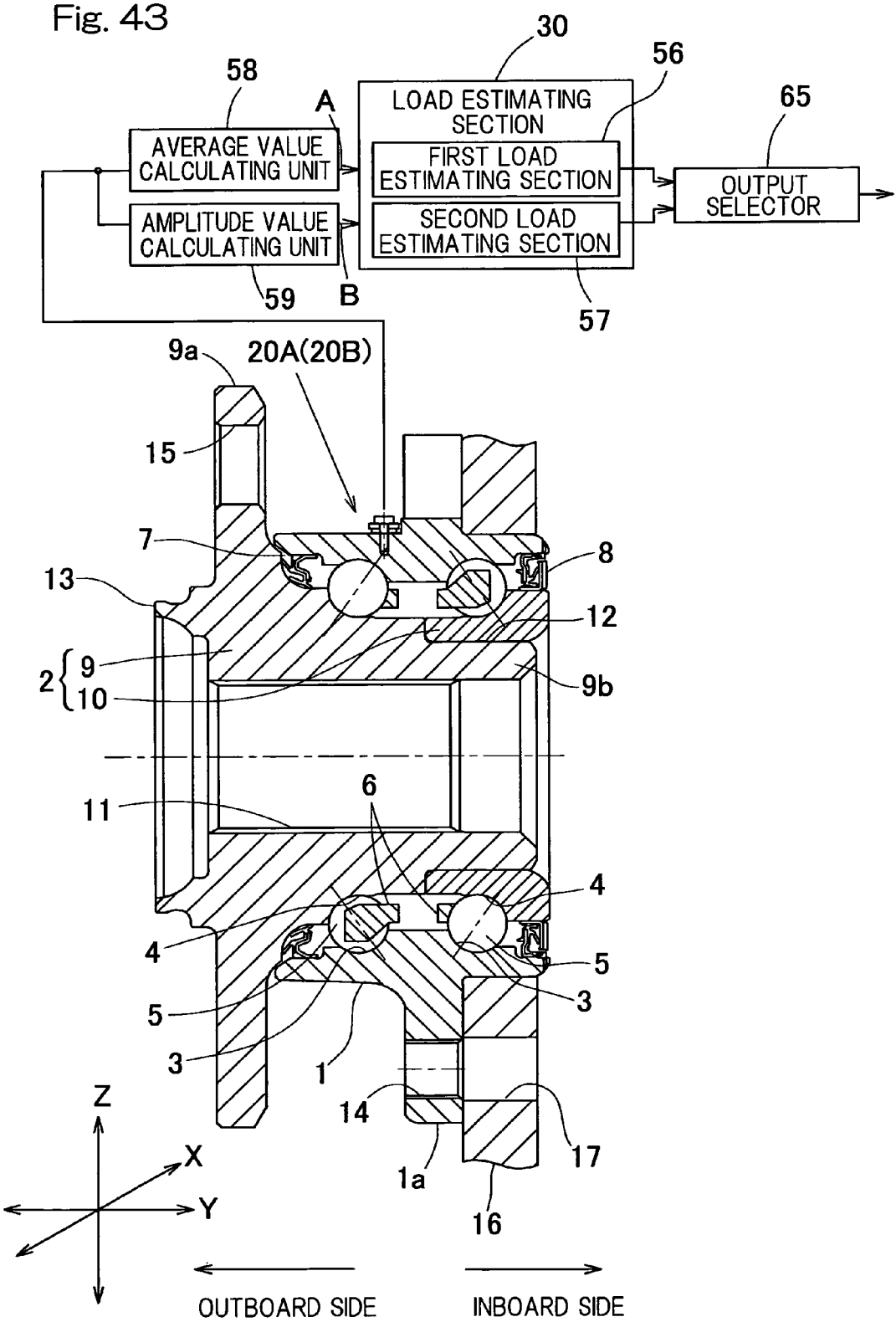
FIG. 43 is a diagram showing a sectional view of the sensor equipped wheel support bearing assembly according to an eleventh preferred embodiment of the present invention, shown together with a block diagram of a conceptual construction of a detecting system therefor.
Figure 44:
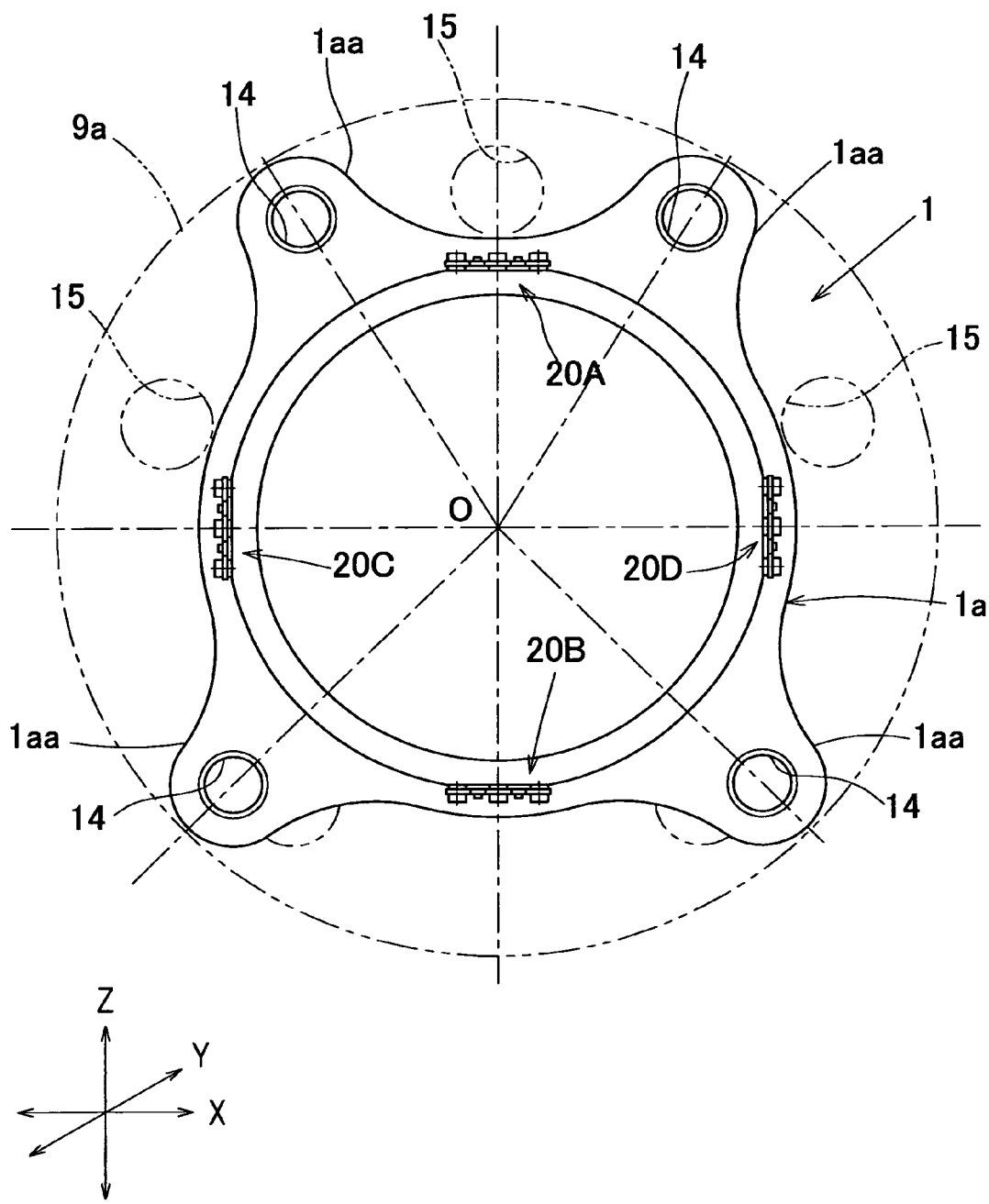
FIG. 44 is a front elevational view showing the outer member of the sensor equipped wheel support bearing assembly as viewed from the outboard side.

As shown in FIG. 44 showing a front elevational view of the outer member of FIG. 43 as viewed from the outboard side, in the practice of this eleventh embodiment, four sensor units 20A, 20B, 20C and 20D are on the upper, lower, left and right locations of the outer diametric surface of the outer member 1, which corresponds to the top, bottom, forward and rearward positions relative to the tire tread surface and are equidistantly arranged in a fashion spaced a distance to have a 90° in phase difference therebetween in a direction circumferentially thereof.

Positioning of those four sensor units 20A to 20D makes it possible to estimate the vertical load Fz acting on the wheel support bearing assembly, the load Fx expected to become the driving force or the braking force, and the axial load Fy. In the description that follows, for the sake of brevity, reference is made to only two of the four sensor units, for example, the first and second sensor units 20A and 20B.

Figure 45:
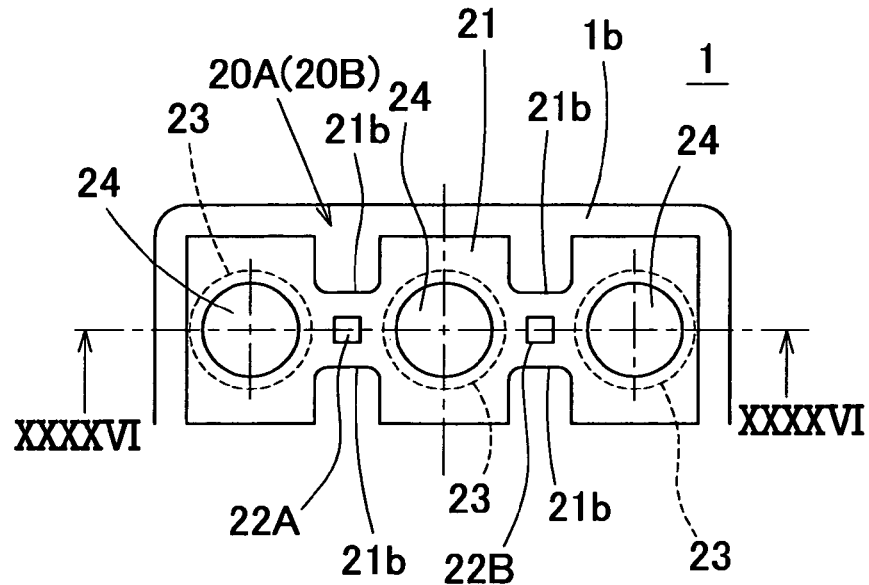
FIG. 45 is an enlarged plan view showing the sensor unit employed in the sensor equipped wheel support bearing assembly.
Figure 46:
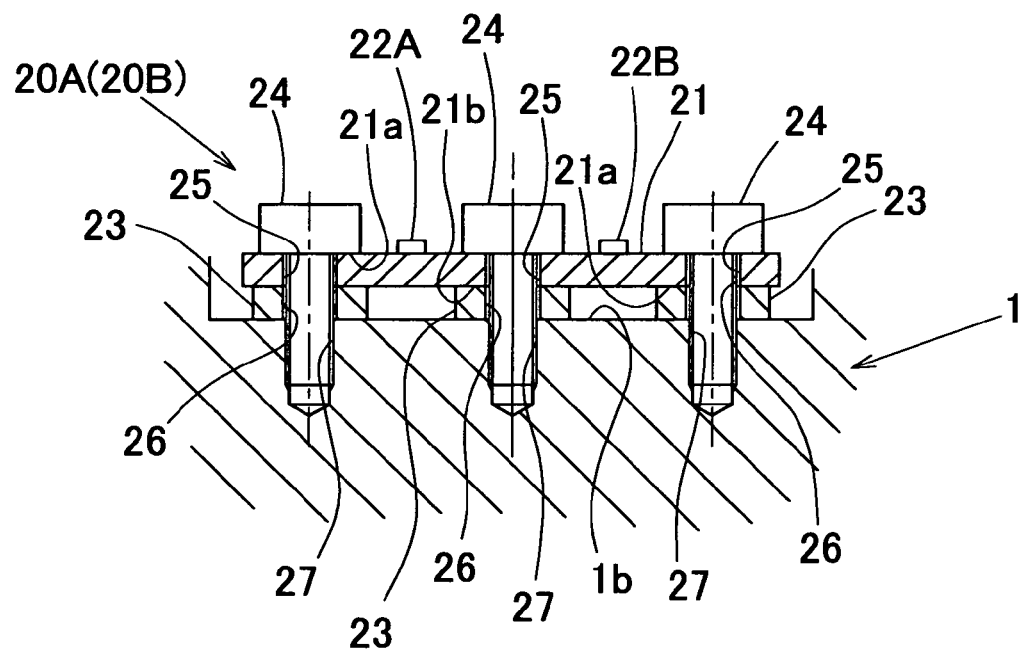
FIG. 46 is a cross sectional view taken along the line XXXXVI-XXXXVI in FIG. 45.

As shown in an enlarged plan view in FIG. 45 and in an enlarged sectional view in FIG. 46, each of the first and second sensor units 20A and 20B includes a strain generating member 21 and two or more (for example, two, in the instance as shown) strain sensors 22 fitted to this strain generating member 21 for detecting a strain occurring in the strain generating member 21. Corners of each of the cutouts 21b are rendered to represent an arcuate sectional shape. Also, the strain generating member 21 has two or more (for example, three, in the instance as shown) contact fixing segments 21a that are fixed to the outer diametric surface of the outer member 1 in contact therewith through respective spacers 23. The three contact fixing segments 21a are arranged in a row conforming to a lengthwise direction of the strain generating member 21, that is, a circumferential direction of the outer member 1. The two strain sensors 22 are pasted to respective portions of the strain generating members 21 where the considerable strain appears relative to the load acting in the various directions. More specifically, those strain sensors 22 are positioned on an outer surface side of the strain generating member 21 at respective locations each between the neighboring contact fixing segments 21a. In other words, as best shown in FIG. 46, one of the strain sensors, for example, the first stain sensor 22A is arranged between the left contact fixing segment 21a and the intermediate contact fixing segment 21a and the other of the strain sensors, that is, the second strain sensor 22B is arranged between the intermediate contact fixing segment 21a and the right contact fixing segment 21b. As best shown in FIG. 45, the cutouts 21b are formed at two locations on the opposite side edges of the strain generating member 21, which correspond respectively to the sites of installation of the strain sensors 22. Accordingly, the strain sensors 22 detect the strain, which acts in the lengthwise direction and appears in the vicinity of the cutouts 21b in the strain generating member 21. It is to be noted that the strain generating member 21 is preferably of a type which does not undergo any plastic deformation even when as the external force acting on the outer member 1 serving as the stationary member or between the wheel tire and the road surface, the maximum expected force is applied. That is because once the plastic deformation occurs, deformation of the outer member 1 will not be transmitted to the outer member 1 and measurement of the strain is adversely affected accordingly.

Figure 47:
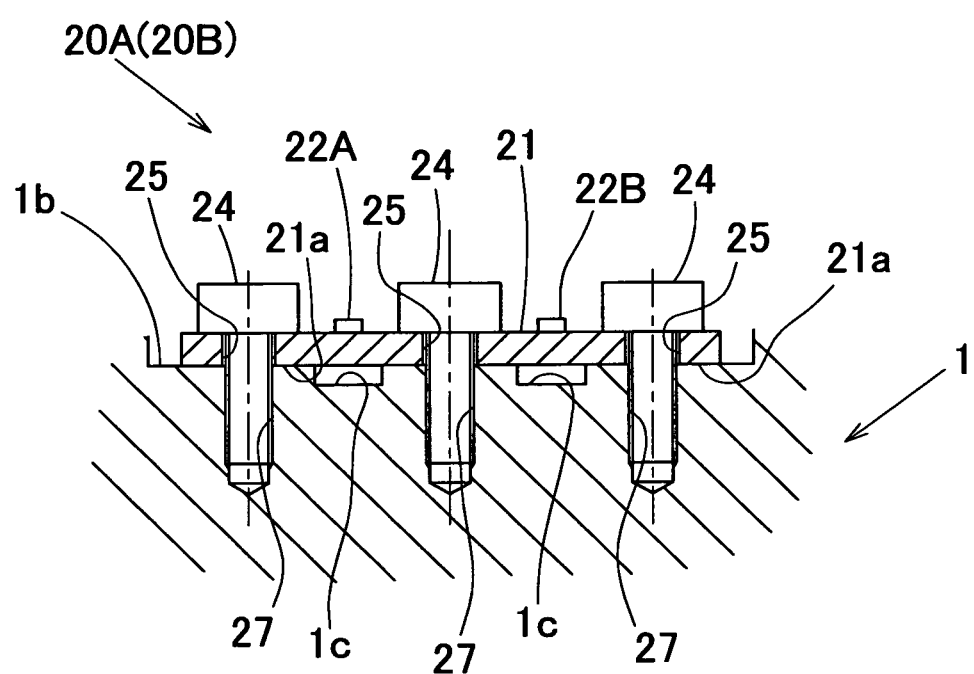
FIG. 47 is a sectional view showing a different manner of installation of the sensor unit.

Other than those described above, as best shown in a sectional representation in FIG. 47, grooves 1c may be provided at a location intermediate between the neighboring members of the three locations at which the three contact fixing segments 21a of the strain generating member 21 are fixed to the outer diametric surface of the outer member 1, so that respective constricted bridge portions of the strain generating member 21, which correspond to the cutouts 21b, can be separated from the outer diametric surface of the outer member 1 while the use of the associated spacer 23 is dispensed with.

Figure 49:
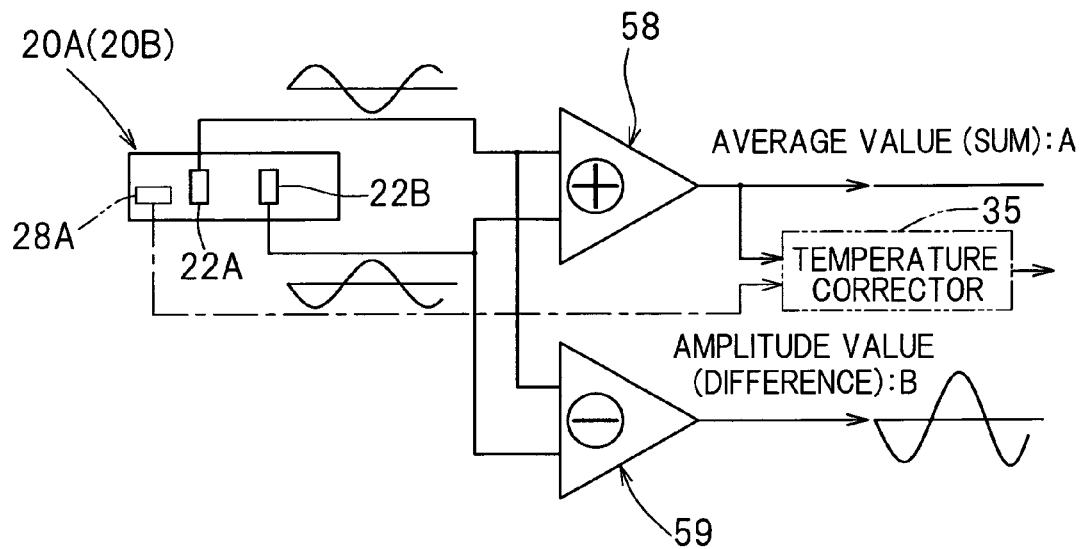
FIG. 49 is a block circuit diagram showing a calculator unit for calculating the average value and the amplitude value of the sensor output signal.

The two strain sensors 22A and 22B of the sensor units 20A (20B) are connected with an average value calculating unit 58 and an amplitude value calculating unit 59. As shown in FIG. 49, the average value calculating unit 58 is in the form of an adder and is operable to perform a summation of respective output signals of the two strain sensors 22A and 22B and then to output the summation as an average value A. The amplitude value calculating unit 59 is in the form of a subtractor and is operable to calculate the difference between the output signals of the two strain sensors 22A and 22B to extract a variable component so that an amplitude value B can be determined by means of a processing circuit and/or a calculating process.

The average value calculating unit 58 and the amplitude value calculating unit 59 are connected with the load estimating section 30. The load estimating section 30 is operable to calculate and estimate the force F (for example, the vertical load Fz) acting on the wheel support bearing assembly or between the vehicle wheel and the tire tread surface (the tire tread or contact surface) from the average value A and the amplitude value B calculated from the respective sensor output signals of each of the sensor units 20A and 20B. This load estimating section 30 includes a first load estimating section 56 for calculating and estimating the load F, acting on the wheel support bearing assembly, by the utilization of the average value of the respective output signals of the strain sensors 22A and 22B and a second load estimating section 57 for calculating and estimating the load F, acting on the wheel support bearing assembly, by the utilization of the average value A and the amplitude value B of the respective output signals of the strain sensors 22A and 22B.

In general, the relation between the load vector F, acting on the wheel support bearing assembly, and the output signal vector S of a plurality of strain sensors can be expressed by the following formula (1), except for the offset within a linear range, and from this formula (1), the load F can be estimated, in which M1 represents a correction coefficient determinant:

$$F = M1 \times S \quad (1)$$

In the first load estimating section 56, the load F is calculated and estimated from the following linear equation (2), using the average value vector A, as variable, with an offset component excluded from the average value signal of the plurality of the sensor units, and this variable is multiplied by a predetermined correction coefficient M1:

$$F = M1 \times A \quad (2)$$

In the second load estimating section 57, using the average value vector A and the amplitude value vector B as input variables, the load F is calculated and estimated from the following linear equation (3), in which those variables are multiplied by predetermined correction coefficients M2 and M3:

$$F = M2 \times A + M3 \times B \quad (3)$$

With those two variables being used, the load estimating accuracy can be further increased.

In those calculation equations, the value of each of the correction coefficients is determined beforehand by means of a series of experiments and/or simulations. Respective calculations performed by the first load estimating section 56 and the second load estimating section 57 are performed in parallel to each other. It is to be noted that in the equation (3) above, the average value A which is a variable may be dispensed with. In other words, the second load estimating section 57 may calculate and estimates the load F using only the amplitude value B as a variable.

Figure 48A:
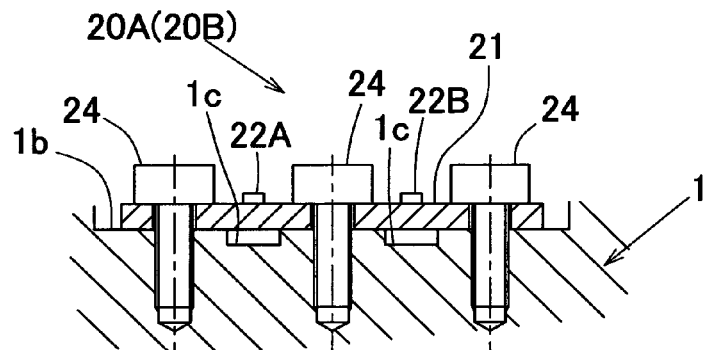
FIGS. 48A to 48C are explanatory diagrams showing how the rolling element position is affected relative to an output signal of the sensor unit.
Figure 48B:
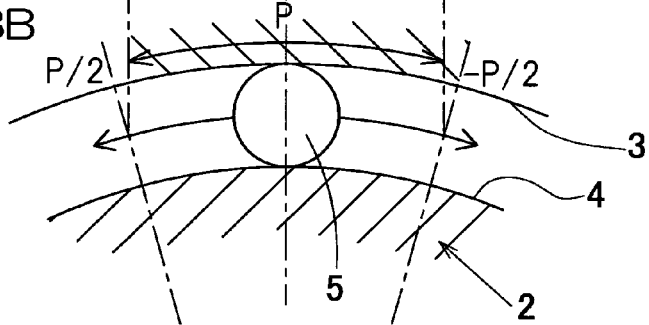
Figure 48C:
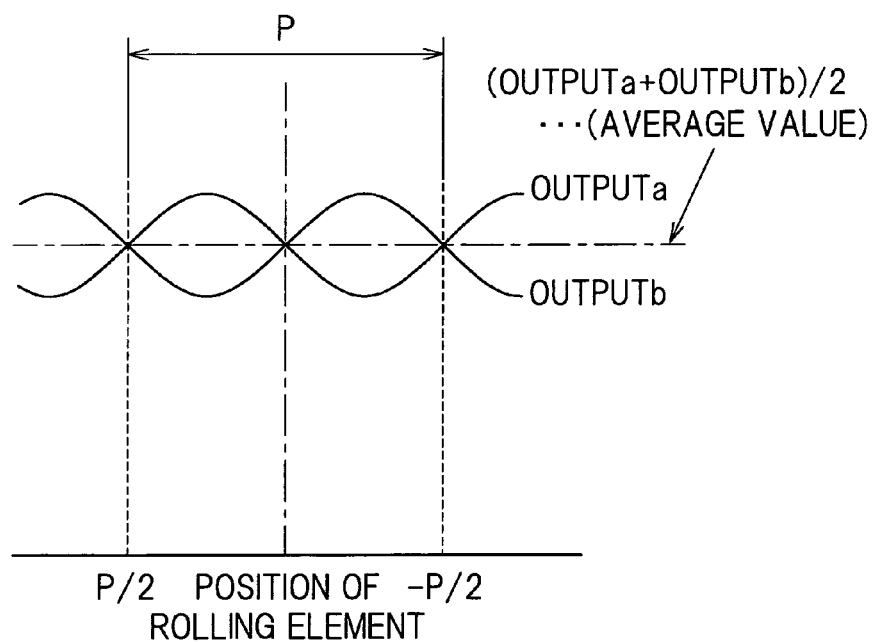

Since the sensor unit 20 is provided at an axial location, which will become perimeters of the outboard row of the rolling surface 3 in the outer member 1, the respective output signals a and b of the strain sensors 22A and 22B are affected by the rolling elements 5 then moving past the vicinity of the site of installation of the sensor unit 20 as shown in FIGS. 48A to 48C. In other words, the influence brought about by the rolling elements 5 acts as an offset component as hereinabove described. Also, even at the time of halt of the wheel support bearing assembly, the respective output signals a and b of the strain sensors 22A and 22B are affected by the position of the rolling elements 5. In other words, when the rolling element 5 move past the position closest to the strain sensors 22A and 22B (or when the rolling elements 5 are held at that position), the respective output signals a and b of the strain sensors 22A and 22B attain the maximum value, but as the rolling elements 5 move away from that position as shown in FIGS. 48A and 48B (or when the rolling element 5 are held at the position distant from that position), they decreases. During the rotation of the wheel support bearing assembly, since the rolling elements 5 move sequentially past the vicinity of the site of installation of the sensor unit 20 at a predetermined pitch P of arrangement of the rolling elements 5, the respective output signals a and b of the strain sensors 22A and 22B represent a waveform similar to a sinusoidal wave, in which the amplitude thereof cyclically varies as shown by the solid line in FIG. 48C with the pitch P of arrangement of the rolling elements 5 taken as a cycle. In the illustrated embodiment now under discussion, the sum of the respective output signals a and b of the two strain sensors 22A and 22B is rendered to be the average value as hereinabove described and the amplitude determined from the difference in amplitudes (absolute value) is rendered to be the amplitude value B. By so doing, the average value A represents such a value in which the variable component brought about by the passage of the rolling elements 5 has been cancelled. Also, the amplitude value is less sensitive to the influence brought about by temperature and is therefore stabilized, and since the two signals are used, the detecting accuracy can be increased. Accordingly, with the average value A and the amplitude value B being used, the load acting on the wheel support bearing assembly or the tire tread surface can be detected accurately.

In FIGS. 48A to 48C, showing the example in which the sensor unit 20 is of the structure shown in FIG. 47, of the three contact fixing segments 21a arranged in a row extending in a direction conforming to the circumferential direction of the outer diametric surface of the outer member 1 serving as the stationary member, the distance between two of those contact fixing segments 21*a* positioned on opposite ends of such row of arrangement is chosen to be the same as the pitch P of arrangement of the rolling elements 5. In such case, the distance in the circumferential direction between the two strain sensors 22A and 22B each arranged at a location intermediate between the neighboring contact fixing segments 21*a* is about ½ of the pitch P of arrangement of the rolling elements 5. As a result, the respective output signals a and b of the two strain sensors 22A and 22B will have about a 180° phase difference and the average value A, which is determined as the sum thereof, is of a nature from which the variable component resulting from the passage of the rolling elements 5 has been cancelled. Also, the difference thereof is less sensitive to the influence brought about by temperature and is therefore stabilized and, since the two signals are employed, the detecting accuracy can be increased.

In FIGS. 48A to 48C, the distance between the contact fixing segments 21*a* on opposite ends has been chosen to be the same as the pitch P of arrangement of the rolling elements 5 with each of the strain sensors 22A and 22B disposed at the position intermediate between the neighboring contact segments 21*a* so that the distance between the two strain sensors 22A and 22B in the circumferential direction can be about ½ of the pitch P of arrangement of the rolling elements 5. Separate therefrom, the distance between the two strain sensors 22A and 22B in the circumferential direction may be set directly to about ½ of the pitch P of arrangement of the rolling elements 5.

In such case, the distance between the two strain sensors 22A and 22B may be set to a value which is the pitch P of arrangement of the rolling elements 5 multiplied by [½+n], wherein n represents an integer, or a value approximating to those values. Even in this case, the average value A, which is determined as the sum of the respective output signals a and b of the strain sensors 22A and 22B, represents the value from which the variable component brought about by the passage of the rolling elements 5 has been cancelled, and, accordingly, the amplitude value B determined from the difference therebetween is insensitive to the influence brought about by temperature and is therefore stabilized, and, yet, the detecting accuracy can be increased because of the use of the two signals.

Figure 50:
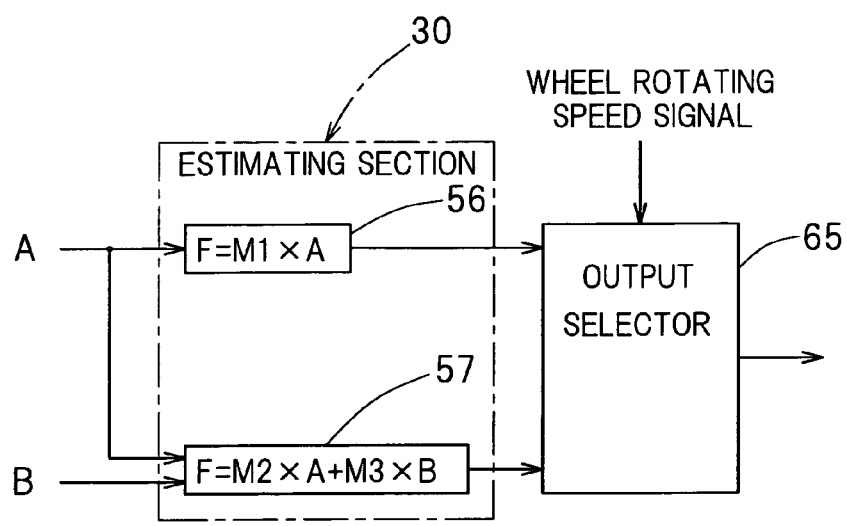
FIG. 50 is a block circuit diagram showing a calculator unit for estimating and outputting a load from the average value and the amplitude value.

As best shown in FIG. 50, the load estimating section 30 is connected with an output selector 65 in the subsequent stage to the load estimating section 30. This output selector 33 is operable to switch over to select, and then output, one of the estimated load values, estimated respectively by the first and second load estimating sections 56 and 57 in dependence on the vehicle wheel rotating speed. More specifically, if the vehicle wheel rotating speed is lower than a predetermined lower limit speed, the output selector 65 selects and outputs the estimated load value of the first load estimating section 56. The predetermined lowermost speed referred to above may be any arbitrarily chosen value, but may be chosen to be, for example, a value about equal to the human walking speed (4 Km per hour) or lower than it.

During the low speed rotation of the vehicle wheel, the length of processing time required to detect the amplitude of the sensor output signal is large and, at the halt of the rotation, the detection of the amplitude would be impossible. Accordingly, as hereinabove described, when the vehicle wheel rotating speed is lower than the predetermined lowermost speed, by selecting and then outputting the load estimated value from the first load estimating section 56 utilizing only the average value A, the detected load signal can be outputted with no delay.

The output selector 65, when receiving information on the vehicle wheel rotating speed from, for example, the outside, performs switching and selection based on this information. In such case, as the information on the vehicle wheel rotating speed from the outside, the vehicle wheel rotating speed may be estimated by using a rotation sensor signal such as, for example, an ABS sensor from the side of the automotive body structure. Alternatively, arrangement may be made that the output selector 65 receives a switching and selecting command from an upper control device connected with a communication path inside the automotive vehicle on the side of the automotive body structure, in place of the information on the vehicle wheel rotating speed. In addition, the vehicle wheel rotating speed may be estimated by detecting a communication frequency of the rolling elements 5 from the output signals a and b of the strain sensors 22A and 22B as the information on the vehicle wheel rotating speed.

In the eleventh embodiment of the present invention shown in FIGS. 43 and 44, since the four sensor units 20A, 20B, 20C and 20D are equidistantly arranged on the upper, lower, left and right surface areas of the outer diametric surface of the outer member 1 serving as the stationary member and spaced 90° phase in difference from each other in the circumferential direction, the vertical load Fz acting on the wheel support bearing assembly can be detected accurately.

Also, as best shown in FIG. 49, the sensor temperature sensor 28A, which is a temperature sensor, may be fitted to the sensor units 20A and 20B, along with a temperature corrector 35 for correcting the average value A of the sensor output signals based on a detection signal of the sensor temperature sensor 28A.

Change of the temperature of the wheel support bearing assembly resulting from the heat emission incident to the rotation of the wheel support bearing assembly and/or the ambient environment may accompany a change in the sensor output signals of the sensor units 20A and 20B due to thermal expansion even though no load change, and, therefore, the influence of temperature remains in the detected load. Accordingly, if the temperature corrector 35 for correcting the average value A of the sensor output signals in dependence on the temperature of the wheel support bearing assembly or the ambient temperature is used, the detected load error resulting form the temperature can be reduced.

When a load acts between the tire on the vehicle wheel and the road surface, such load is applied to the outer member 1, which is the stationary member of the wheel support bearing assembly, accompanied by deformation of the outer member 1. Since in the instance as shown the two or more contact fixing segments 21*a* of the strain generating member 21 in the sensor unit 20A (20B) are fixed to the outer member 1 in contact therewith, the strain appearing in the outer member 1 can be easily transmitted to the strain generating member 21 after having been amplified, wherefore such strain is highly sensitively detected by the strain sensors 22A and 22B.

In particular, the provision has been made of the first load estimating section 56 for calculating and estimating the load, acting on the wheel support bearing assembly, by the utilization of the average value A determined by the sum of the respective output signals of the strain sensors 22A and 22B in the sensor unit 20, the second load estimating section 57 for calculating and estimating the load, acting on the wheel support bearing assembly, by the utilization of the amplitude value B of the sensor output signals and the previously described average value A, and the output selector 65 for switching and selecting the load values to be estimated by either one of the first and second load estimating sections 56 and 57, in dependence on the wheel rotating speed. Therefore, such that when the vehicle wheel is halted or at a low speed rotating condition, the estimated load value of the first load estimating section 56 that is determined from the average value A determined without the time averaging process being performed is outputted, and as a result, the length of the detecting and processing time can be reduced. Also, when the vehicle wheel is at a normal speed rotating condition, the average value A of the sensor output signals and the amplitude value B can be accurately calculated and, therefore, the estimated load value of the second load estimating section 57 that is obtained from the average value A and the amplitude value B is outputted and, as a result, the error in the estimated load is minimized and the length of the detecting time delayed can be reduced.

As a result thereof, the load acting on the vehicle wheel can be accurately estimated and the detected load signal can be outputted with no delay taking place. For this reason, the response in controlling, and the controllability of, the automotive vehicle utilizing the load signal can be increased and the further safety and the traveling stability can be enhanced.

Although in the foregoing description, the use of the strain sensors 22A and 22B have been referred to, the description similar to the foregoing description equally applied to the use of the strain sensors 22C and 22D and, in view of the use of the four strain sensors 22A to 22D, the vertical load Fz, the load Fx expected to become the driving force or the braking force and the axial load Fy can be estimated.

Figure 51:
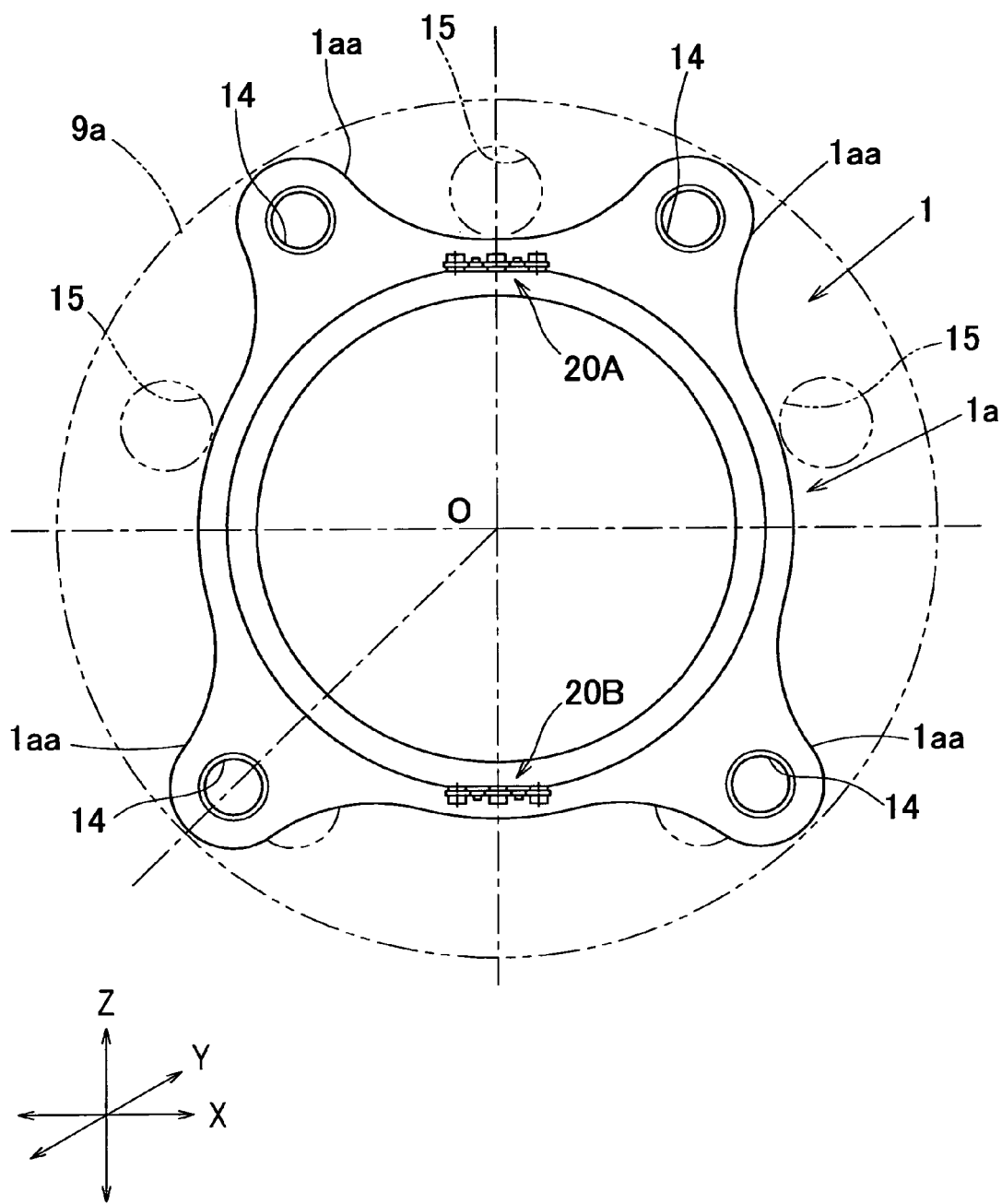
FIG. 51 is a front elevational view showing the outer member of the sensor equipped wheel support bearing assembly according to a first applied case of the present invention as viewed from the outboard side.
Figure 52:
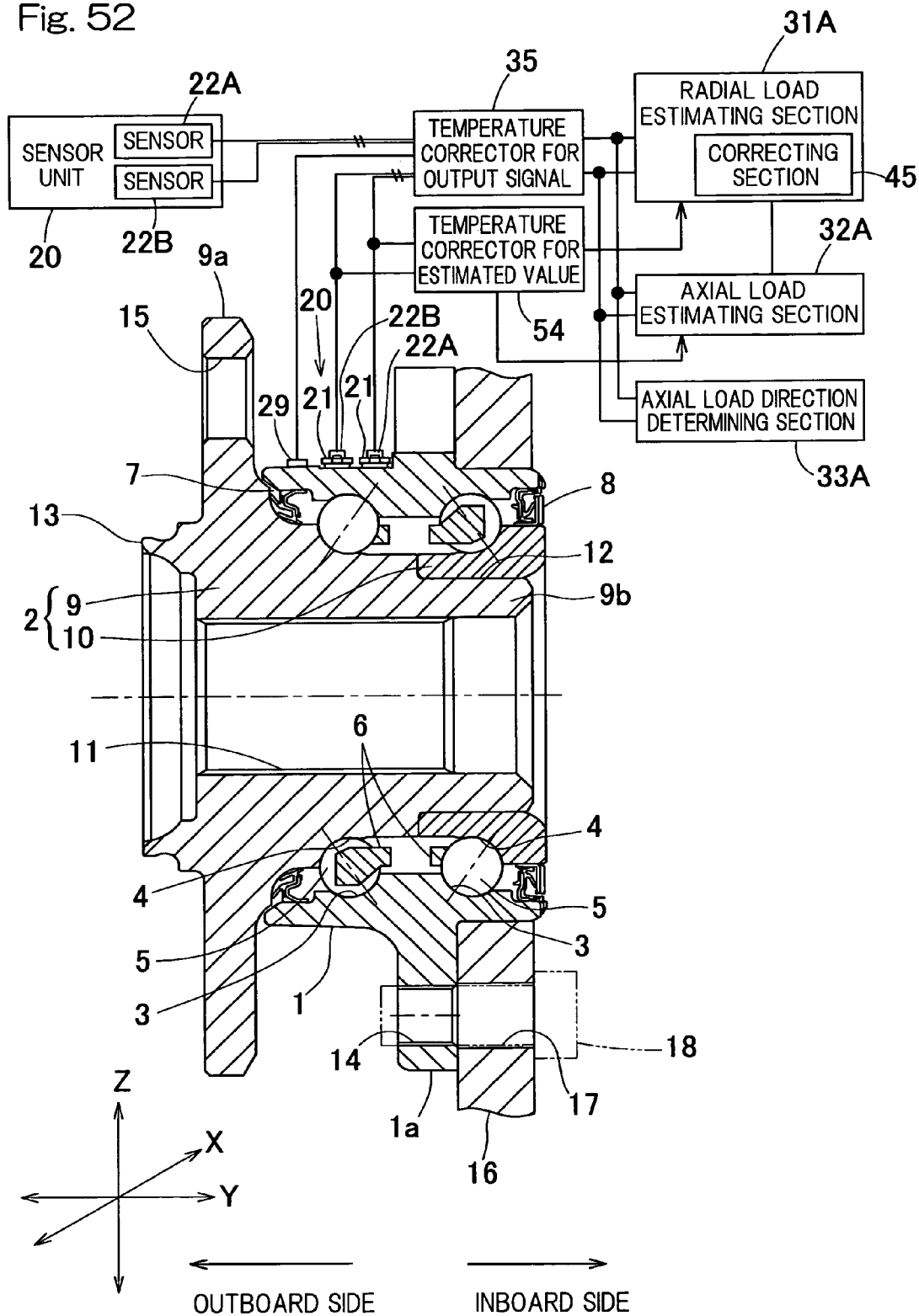
FIG. 52 is a diagram showing a sectional view of the sensor equipped wheel support bearing assembly according to a second applied case of the present invention, shown together with a block diagram of a conceptual construction of a detecting system therefor.

FIG. 51 illustrates a front elevational view of the outer member 1, employed in the sensor equipped wheel support bearing assembly according to a first applied case of the present invention, as viewed from the outboard side, from which it is clear that two sensor units 20A and 20B are provided on the outer diametric surface of the outer member 1 serving as the stationary member. In the instance as shown, those sensor units 20A and 20B are disposed on the upper and lower surface areas of the outer diametric surface of the outer member 1, which correspond to the top and bottom positions relative to the tire tread surface (the tire tread surface). Other structural features than those described above are similar to those in the eleventh embodiment of the present invention shown in and described with reference to FIGS. 43 to 50 and, therefore, the details thereof are not reiterated for the sake of brevity.

Hereinafter, a second applied case of the present invention will be described with particular reference to FIGS. 52 to 61. In FIGS. 52 to 61, component parts similar to those employed in the first embodiment shown in and described with reference to FIGS. 1 to 11 are designated by like reference numeral and, therefore, the details thereof are not reiterated for the sake of brevity. This second applied case makes use of two sensor units 30 as is the case with those in the previously described first applied case.

In this second applied case, a sensor unit pair 19 comprised of two sensor units 20 is provided on the outer diametric surface of the outer member 1 serving as the stationary member. Those two sensor units 20 are positioned on the outer diametric surface of the outer member 1 at respective locations spaced from each other a distance enough to have a 180° phase difference therebetween in a direction circumferentially of the outer member 1. The sensor unit pair 19 referred to above may be provided in two or more in number. In the instance as shown, the two sensor units 20 forming the sensor unit pair 19 are provided at the respective locations, that is, the upper and lower surface areas of the outer diametric surface of the outer member 1, which correspond to the vertically top position and bottom portion relative to the tire tread surface, respectively, so that a load acting on the wheel support bearing assembly in a direction up and down (a vertical load) Fz can be detected thereby. More specifically, as best shown in FIG. 53, one of the sensor units 20 is disposed on an upper surface portion of the outer diametric surface of the outer member 1, which is situated intermediate between the neighboring flange lugs 1*aa*, whereas the other of the sensor units 20 disposed on a lower surface portion of the outer diametric surface of the outer member 1, which is situated intermediate between the neighboring flange lugs 1*aa*.

Figure 54:
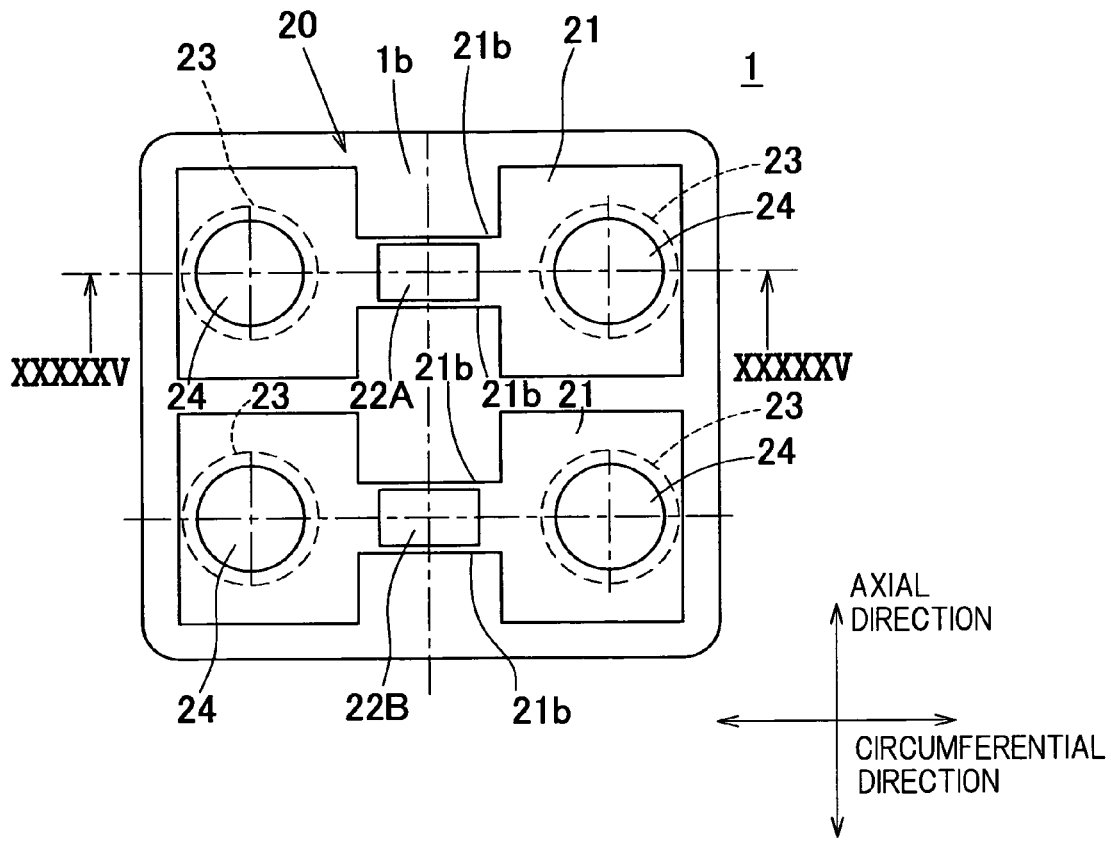
FIG. 54 is an enlarged plan view showing the sensor unit employed in the sensor equipped wheel support bearing assembly according to the second applied case.
Figure 55:
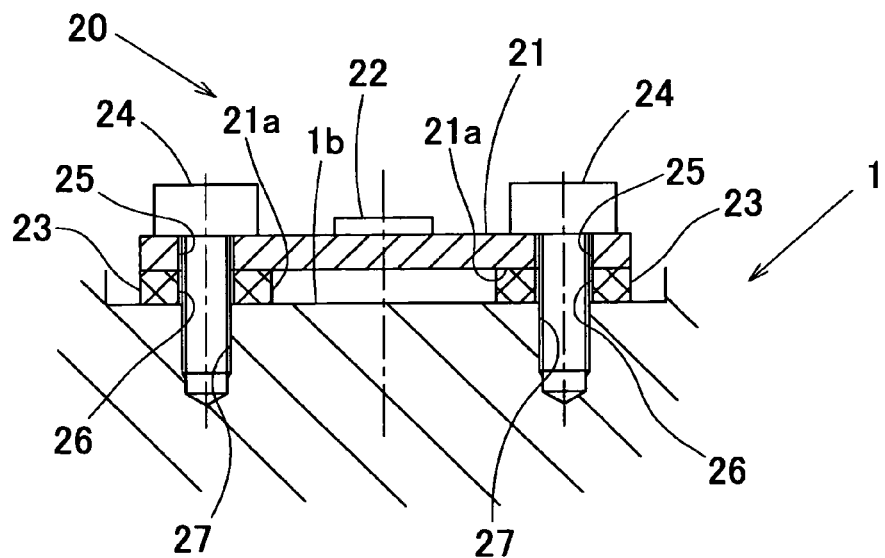
FIG. 55 is a cross sectional view taken along the line XXXXXV-XXXXXV in FIG. 54.
Figure 56:
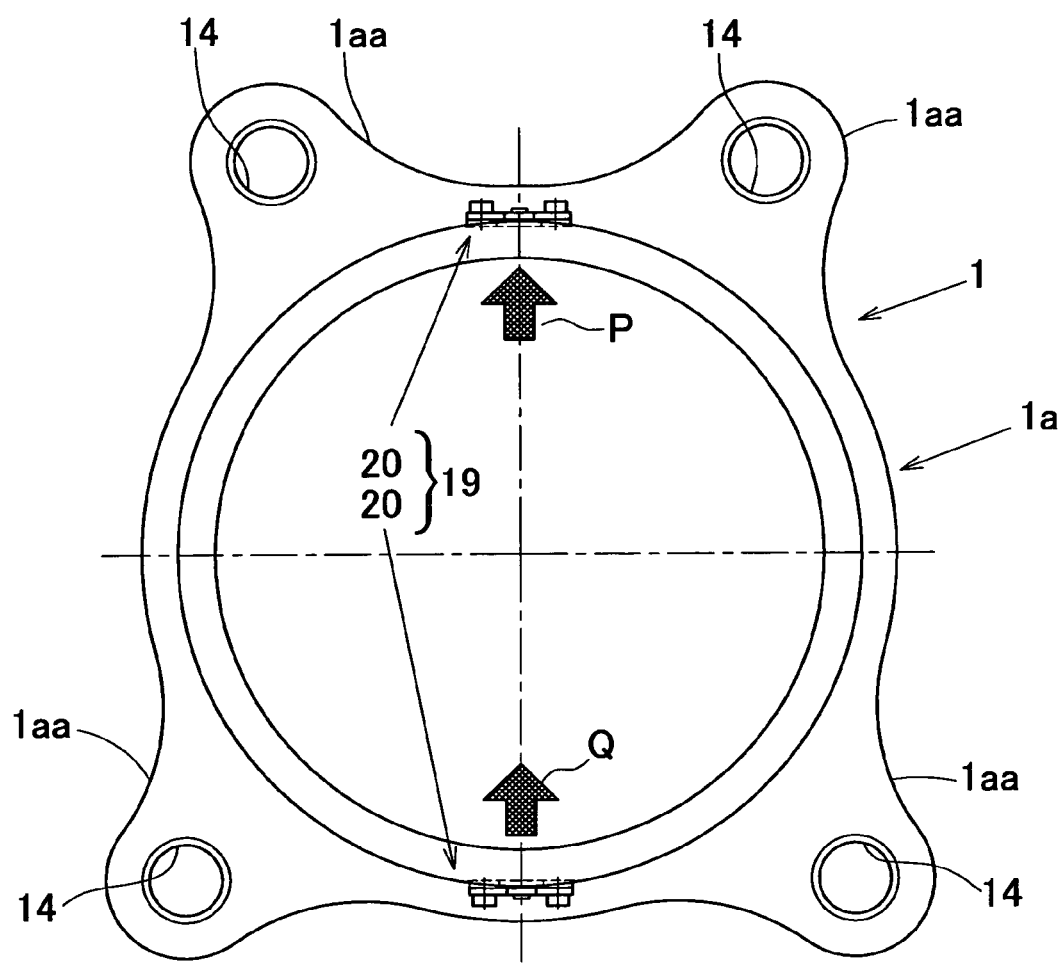
FIG. 56 is an explanatory diagram showing one example of the deformation mode occurring in the outer member outer diametric surface in the sensor equipped wheel support bearing assembly according to the second applied case.

As shown in an enlarged plan view in FIG. 54 and an enlarged sectional view in FIG. 55, each of the sensor units 20 includes two strain generating members 21, disposed parallel to each other, and strain sensors 22A and 22B mounted on those strain generating members 21, respectively, for detecting strains appearing in the strain generating members 21.

The two strain sensors 22A and 22B in each of the sensor units 20 are disposed at respective axial positions and at the same phase position in a direction circumferentially of the outer member 1 as best shown in FIG. 54. Also, one of the two strain sensors, for example, the strain sensor 22B is arranged on the outboard side of the other of the strain sensors, that is, the strain sensor 22A, that is, on the side where deformation that may occur in the outer member 1 is small.

Figure 53:
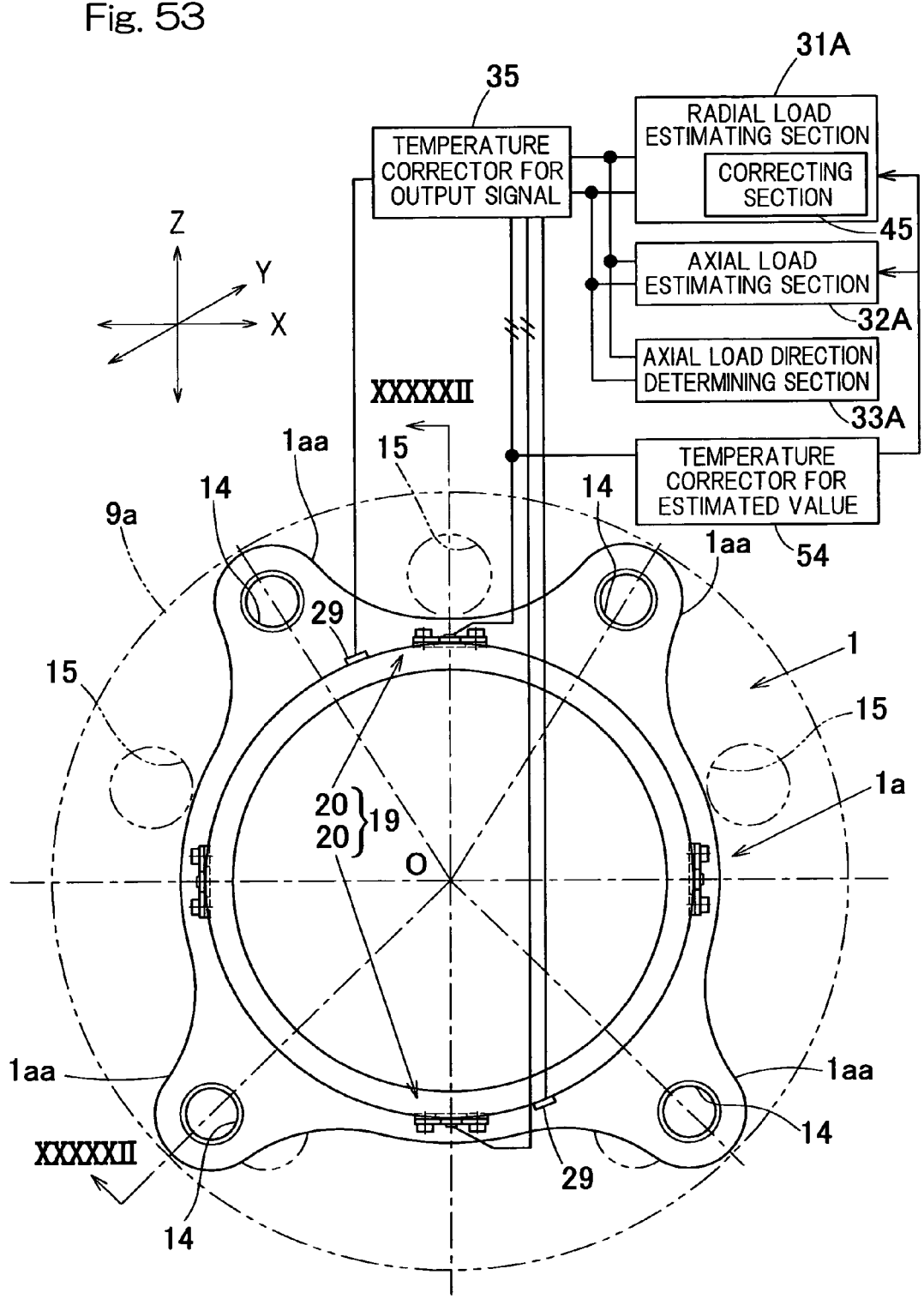
FIG. 53 is a diagram showing a front elevational view of the outer member of the sensor equipped wheel support bearing assembly according to the second applied case, shown together with a block diagram showing a conceptual construction of the detecting system.

The strain sensors 22A and 22B of the sensor unit pair 19 are connected with the radial load estimating section 31A and the axial load estimating section 32A as best shown in FIG. 53. The radial load estimating section 31A is operable to estimate the radial load (the vertical load Fz in the instance as shown), acting on the wheel support bearing assembly, from the difference between respective sensor output signals of those two sensor units 20. On the other hand, the axial load estimating section 32A is operable to estimate the axial load (the cornering force), acting on the wheel support bearing assembly, from the sum of the respective sensor output signals of the two sensor units 20.

Hereinafter, the method of estimating the vertical load Fz with the radial load estimating section 31A referred to above and the method of estimating the axial load Fy with the axial load estimating section 32A referred to above will now be described. In the event that while the axial load Fy is zero the vertical load Fz is applied, the mode of deformation of the outer diametric surface of the outer member 1 is such as shown by the arrows P and Q in FIG. 56 and the upper surface area of the outer diametric surface of the outer member 1 undergoes deformation in an outer diametric direction whereas the lower surface area thereof undergoes deformation in an inner diametric direction. In this second applied case, the sensor units 20 are arranged so as to detect the strains appearing in the circumferential direction while the two contact fixing segments 21*a* thereof are arranged at the same axial locations on the outer diametric surface of the outer member 1 and spaced a distance from each other in the circumferential direction. Accordingly, the strain generating member 21 of the sensor unit 20 fixed to the upper surface area is deformed in a tensile direction, where the strain becomes large, whereas the strain generating member 21 of the sensor unit 20 fixed to the lower surface area is deformed in a compressive direction where the strain becomes small. Accordingly, when the difference between the respective sensor outputs A and B (shown by the dashed lines in the chart of FIG. 58) of the two sensor units 20 of the sensor unit pair 19 is determined, an output curve having a large gradient as shown by the solid line C in the chart of FIG. 58 can be obtained. Also, when the sum of those sensor output signals A and B of the two sensor units 20 is determined, another output curve having a small gradient as shown by the solid line D in the chart of FIG. 58 can be obtained.

Figure 57:
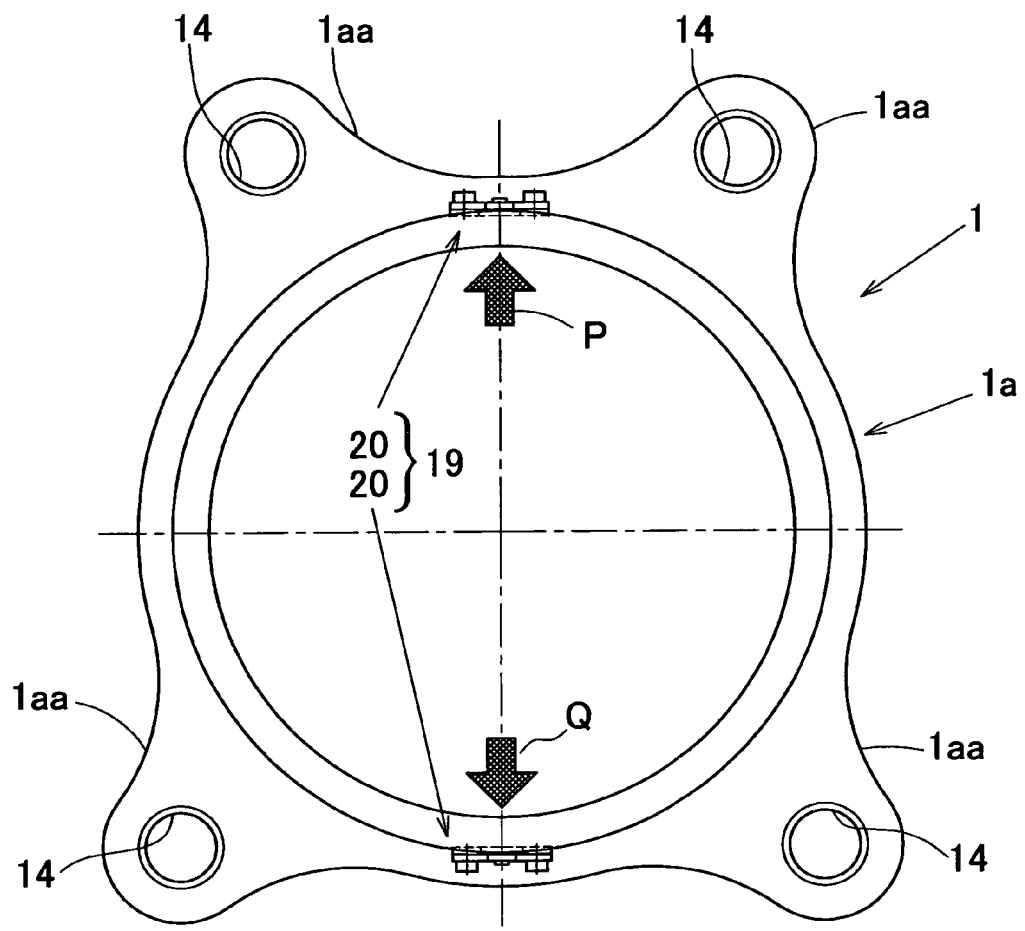
FIG. 57 is an explanatory diagram showing another example of the deformation mode occurring in the outer member outer diametric surface in the sensor equipped wheel support bearing assembly according to the second applied case.

On the other hand, in the event that the axial load Fy is applied while the vertical load Fz is zero, the mode of deformation of the outer diametric surface of the outer member 1 is such as shown by the arrow P and Q in FIG. 57 and both of the upper and lower surface areas of the outer diametric surface of the outer member 1 deform in an outer diametric direction. Accordingly, not only is the strain generating member 21 of the sensor unit 20 fixed to the upper surface area, but also the strain generating member 21 of the sensor unit 20 fixed to the lower surface area deformed in a tensile direction in which the strain increased. Accordingly, when the difference between the respective sensor outputs A and B (shown by the dashed lines in the chart of FIG. 59) of the two sensor units 20 of the sensor unit pair 19 is determined, an output curve having a small gradient as shown by the solid line C in the chart of FIG. 59 can be obtained. Also, when the sum of those sensor output signals A and B of the two sensor units 20 is determined, another output curve having a large gradient as shown by the solid line D in the chart of FIG. 59 can be obtained.

As described above, by the utilization of the difference between the mode of deformation of the outer diametric surface of the outer member 1, when the vertical load Fz is applied, and that when the axial load Fy is applied, estimation of the vertical load Fz with the radial load estimating section 31A and estimation of the axial load Fy with the axial load estimating section 32A are carried out in the following manner.

(1) The axial load estimating section 32A determines the sum of the respective sensor output signals A and B of the two sensor units 20 and then estimates the axial load (the cornering force) Fy. In such case, since the gradient of the sum of the sensor outputs A and B relative to the vertical load Fx is small and the amount of strain of the axial load Fy is much larger than the vertical load Fz, the variable component brought about by the vertical load Fz will be little affected.

(2) The radial load estimating section 31A determines the difference between the respective sensor output signals A and B of the two sensor unit 20 and then estimates the vertical load Fz by correcting it with a value of the axial load Fy determined by the axial load estimating section 32A. The amount of deformation of the outer member 1 relative to not only the vertical load Fz, but also to the radial load (including the load Fx expected to become the driving force) acting on the wheel support bearing assembly in the radial direction is apt to be affected by the axial load Fy, since such amount of deformation is extremely small as compared with the amount of deformation relative to the axial load Fy. Accordingly, as hereinbefore described, if the value estimated by the radial load estimating section 31A is corrected with the value of the axial load Fy determined by the axial load estimating section 32A, the radial load (the vertical load Fz in the instance now under discussion) can be estimated accurately. The radial load estimating section 31A includes a correcting section 45 capable of accomplishing such correction as described above. For example, where the amount of strain and the vertical load Fz are in a proportional relationship, the correcting section 45 corrects the offset amount and the gradient with the value of the axial load Fy.

Figure 58:
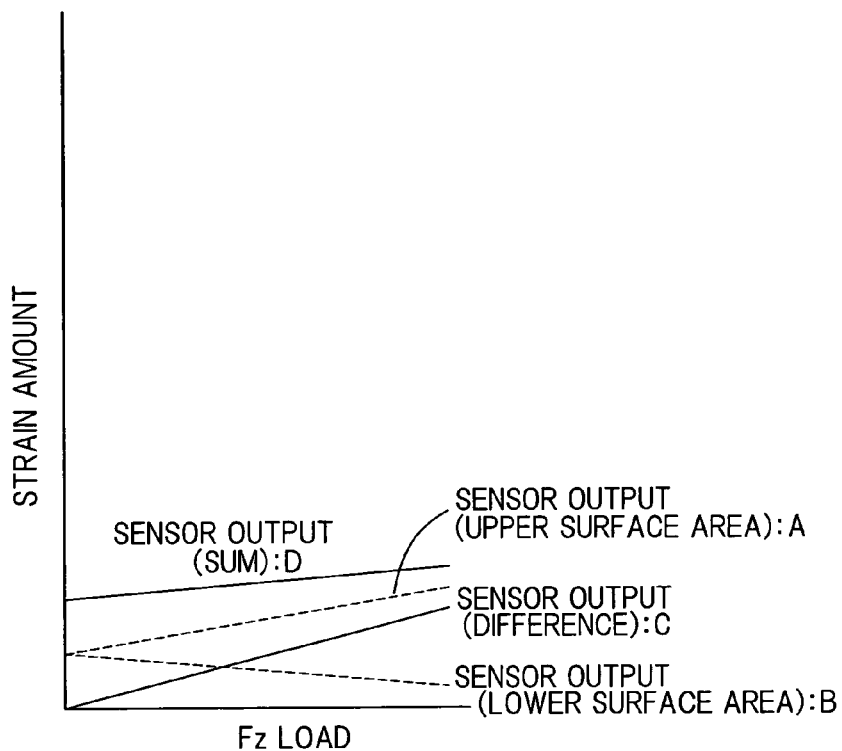
FIG. 58 is a chart showing the relation between the sensor output and the vertical load in the sensor equipped wheel support bearing assembly according to the second applied case.
Figure 59:
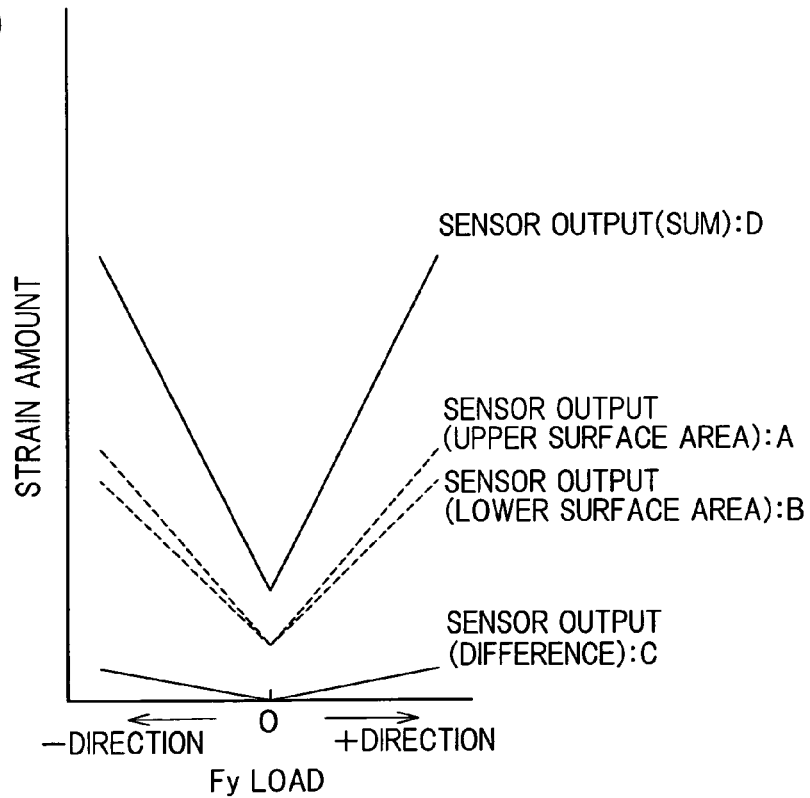
FIG. 59 is a chart showing the relation between the sensor output and the axial load in the sensor equipped wheel support bearing assembly according to the second applied case.

Both of the radial load estimating section 31A and the axial load estimating section 32A includes a relation setting module (not shown), in which relations (such as, for example, the load Fz and the amount of strain (difference), the load Fy and the amount of strain (sum), the load Fy and the amount of strain (difference)), shown in the respective charts in FIGS. 58 and 59, which are determined by means of a series of experiments and/or analyses, are set in the form of calculation equations or tables. Accordingly, the radial load estimating section 31A and the axial load estimating section 32A can make use of the relation setting module to estimate the vertical load Fz and the axial load Fy from the respective output signals A and B of the two sensor units 20 which have been inputted thereto.

It is, however, to be noted that as shown by the V-shaped curves in the chart in FIG. 59, in the event in both of the positive and negative directions (outboard and inboard directions) of the axial load Fy, the strain generating member 21 of the sensor unit 20 deforms in the tensile direction, it is necessary to determine a direction of the axial load Fy. As an example of section for determining the direction of the axial load Fy, a steering angle sensor can be employed, but in the instance now under discussion an axial load direction determining section 33A is employed for determining the direction of the axial load Fy in the following manner from the amplitudes of the respective output signals of the sensors 22A and 22B of the sensor unit 20 in the sensor unit pair 19.

In this second applied case, the two sensor units 20 forming the sensor unit pair 19 are arranged on the upper and lower surface areas of the outer diametric surface of the outer member 1 of the wheel support bearing assembly serving as the stationary member, which areas correspond respectively to the top and bottom positions relative to the tire tread surface (the tire tread surface). In addition, since the sensor units 20 are arranged in the axial positions, which will become the perimeter of one of the rows of the rolling surfaces, that is, the outboard row of the rolling surface 3, in the outer member 1, the cyclic change similar to that shown in FIG. 8, which has been described in connection with the previously described first embodiment of the present invention, occurs in the amplitudes of the output signals of the strain sensors 22A and 22B of the sensor unit 20. The reason therefor has already set forth in the previous description and is not therefore reiterated for the sake of brevity.

The sensor outputs in this second applied case exhibit a tendency similar to those shown in FIGS. 9A and 9B, reference to which has already been made in connection with the first embodiment of the present invention and, therefore, the details thereof are not reiterated for the sake of brevity.

Figure 60A:
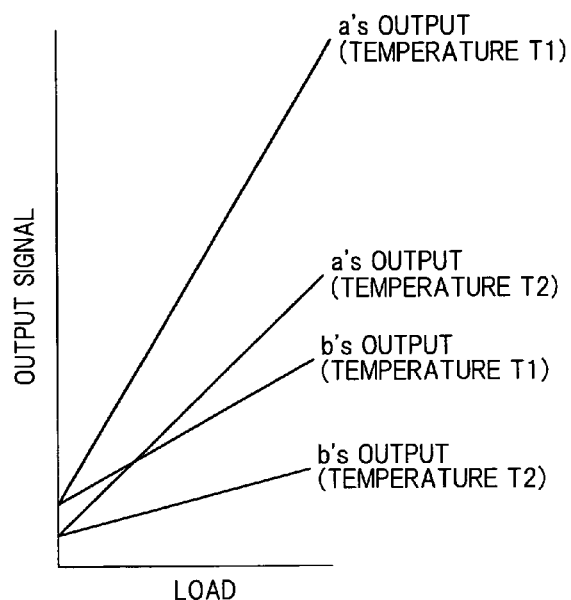
FIG. 60A is a chart showing the relation between the sensor output signal and the load when temperature is used as a parameter.

Even in this second applied case, in a manner similar to that shown in the chart in FIG. 11, which illustrates the relation between the sensor output signals of the sensor units 20 and the temperature of the outer member 1 in the previously described first embodiment of the present invention, the sensor output signal drifts in dependence on temperature. This drift results from expansion and contraction of the outer member 1 with change in temperature and, when a load is applied to the outer member 1 under a different temperature condition, the output signals a and b of the two strain sensors 22A and 22B will represent signal forms such as shown in FIG. 60A. In other words, even when the same load is applied, the output signal a of the strain sensor 22A becomes larger when the temperature of the outer member 1 is high (temperature T1) than when such temperature is low (temperature T2), and a tendency similar to that described previously can be found in the output signal b of the strain sensor 22B.

For the reason described above, in order to increase the accuracy with which the vertical load Fz and the axial load Fy that are estimated respectively by the radial load estimating section 31A and the axial load estimating section 32A, it is necessary to correct the estimated values, determined thereby, with temperature. Although this temperature correction can be accomplished if a temperature sensor is added to the sensor unit 20, such a problem will arise in such case that an error in temperature correction will occur under a transient condition in which an abrupt temperature change occurs as a result of an external disturbance and/or change in load.

In view of the above, in this second applied case, a temperature corrector 54 for the estimated value is employed, which is operable to correct a variable component, resulting from a change in temperature, of the vertical load Fz and the axial load Fy, which are estimated respectively by the radial load estimating section 31A and the axial load estimating section 32A, based on the difference between the output signals a and b of the two strain sensors 22A and 22B in the sensor unit 20.

Figure 60B:
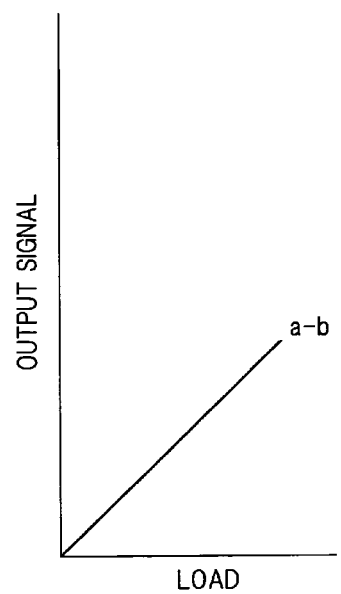
FIG. 60B is a chart showing the relation between the difference between the respective output signals of the two sensors in the sensor unit and the load.

Since the two strain sensors 22A and 22B in the sensor unit 20 are arranged on the circumferential positions of the same phase relative to each other and since one of the strain sensors, for example, the strain sensor 22B is positioned on the outboard side of the other of the strain sensors, that is, the strain sensor 22A, that is, at a location where the change resulting from the load in the outer member 1 is smaller than that with the strain sensor 22A, determination of the difference (a−b) between the output signal a of the strain sensor 22A and the output signal b of the strain sensor 22B as shown in FIG. 60B is effective to remove the influence brought about by temperature. As a result thereof, the detecting accuracy is increased by the temperature dependent correction of the vertical load Fz and the axial load Fy, which are estimated respectively by the radial load estimating section 31A and the axial load estimating section 32A, through the temperature corrector 54 for the estimated value.

Also, in this second applied case, separate from the temperature corrector 54 for the estimated value described above, a temperature corrector 35 is employed for correcting the respective output signals a and b of the two strain sensors 22A and 22B in the sensor unit 20 in dependence on the temperature of the wheel support bearing assembly or the ambient temperature, in a manner similar to that employed in the practice of the first preferred embodiment of the present invention. As shown in FIG. 53, in the vicinity of the site of installation of each of the sensor units 20 on the outer diametric surface of the outer member 1, a temperature sensor 29 for detecting the outer diametric surface temperature of the outer member 1 is employed in a manner similar to the previously described first embodiment of the present invention. The operation of this temperature corrector 35 is similar to that described in connection with the previously described first embodiment and, therefore, it will not be reiterated for the sake of brevity.

The description concerning the operation made in connection with the previously described first embodiment of the present invention applies directly even in the case of this second applied case and, therefore, it is not reiterated for the sake of brevity.

Since in this second applied case the strain sensors 22A and 22B of the sensor unit 20 are arranged at the circumferential locations of the same phase in the outer member 1 serving as the stationary member and since the temperature corrector 54 for the estimated value is employed, which, based on the difference between the output signals of those two strain sensors 22A and 22B, corrects the variable component of the estimated values (the vertical load Fz and the axial load Fy) of the radial load estimating section 31A and the axial load estimating section 32A resulting from the temperature change in the outer member 1, the load can be further accurately estimated with the influence of the temperature change removed.

Also, as hereinabove described, during the rotation of the wheel support bearing assembly, the cyclic change such as shown in the waveform of FIGS. 9A and 9B, reference to which has already been made, occurs in the amplitude of the sensor output signal of the sensor unit 20 depending on the presence or absence of the rolling elements 5 moving past the vicinity of the sensor unit on the rolling surface 3. Accordingly, when the cycle of peak values in the detection signal is measured by, for example, the radial load estimating section 31A, the speed at which the rolling elements 5 move, that is, the number of revolutions of the vehicle wheel can be detected as well. Thus, in this way, where the change appears in the output signal, the radial load estimating section 31A can calculate the difference of the sensor output signals of the two sensor units 20 in the sensor unit pair 19 from the average value or the amplitude of each of the output signals. In the event of the absence of any change, it can be calculated from the absolute value.

In addition, in this second applied case, although reference has been made that the two sensor units 20 forming the sensor unit pair 19 are arranged on the upper and lower surface areas of the outer diametric surface of the outer member 1, which correspond respectively to the top and bottom positions relative to the tire tread surface (the tire tread surface), the second applied case is not necessarily limited thereto and they may be arranged on left and right surface areas of the outer diametric surface of the outer member 1. In such case, as the radial load, the load Fx brought about by the driving force/the braking force acting in a direction lengthwise of the automotive vehicle can be estimated by the radial load estimating section 31A.

Figure 61:
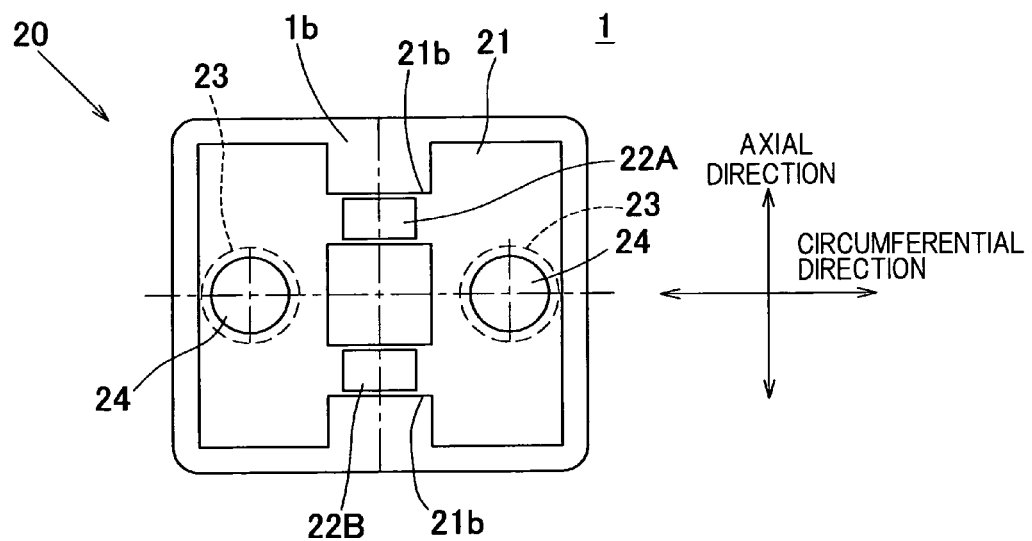
FIG. 61 is a top plan view showing a different structure of the sensor unit.
Figure 62:
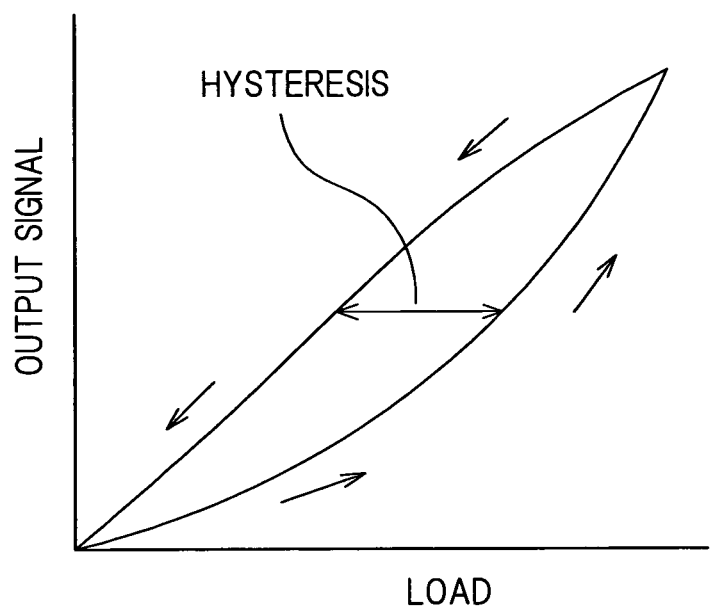
FIG. 62 is an explanatory diagram showing the hysteresis appearing in the output signal in the prior art.

Furthermore, in this second applied mode, one strain sensor 22A and 22B has been shown and described as fitted to each of the two strain generating member 21 to form the sensor unit 20, but as shown in FIG. 61, the two strain sensors 22A and 22B may be fitted to one strain generating member 21 to form the sensor unit 20. In such case, arrangement of those two strain sensors 22A and 22B at the position of the same phase in the circumferential direction relative to the outer member 1 and the structure of the strain generating member 21 are similar to those in the previously described preferred embodiment of the present invention.

In each of the foregoing preferred embodiments of the present invention as well as each of the applied cases, reference has been made to the stationary member that is constituted by the outer member 1, but the present invention can be equally applied to the wheel support bearing assembly, in which the inner member serves as the stationary member. In such case, the sensor unit 20 is provided on a peripheral surface which forms an inner periphery of the inner member.

Also, although in describing the foregoing preferred embodiments of the present invention and the applied cases, the present invention has been shown and described as applied to the wheel support bearing assembly of the third generation type, the present invention can be equally applied to the wheel support bearing assembly of the first or second generation type, in which the bearing unit and the hub unit are members separate from each other, and also to the wheel support bearing assembly of the fourth generation type in which a portion of the inner member is constituted by an outer ring of a constant velocity universal joint. In addition, the present invention can be applied not only to the wheel support bearing assembly for the support of a vehicle driven wheel and, yet, to the wheel support bearing assembly of any of the generation types, which makes use of tapered rollers. In such case, the sensor unit or the sensor assembly is provided on the outer periphery of the inner member.

Hereinafter, some modes of application, that do not require the necessity to use at least three or more sensor units, which has been shown and described in connection with each of the preferred embodiments of the present invention, will be enumerated:

[Mode 1]

The sensor equipped wheel support bearing assembly according to the first mode 1 is a wheel support bearing assembly for rotatably supporting a vehicle wheel relative to a vehicle body structure, which includes an outer member having an inner periphery formed with double row rolling surfaces, an inner member having an outer periphery formed with rolling surfaces held in face-to-face relation with the rolling surfaces of the outer member, and double row rolling elements interposed between the respective rolling surfaces in the outer and inner members; in which at least one sensor unit pair comprised of two sensor units is arranged on an outer diametric surface of one of the outer and inner members, which serves as a stationary member, at respective locations spaced a distance enough to have a 180° phase difference from each other in a direction circumferentially of the stationary member; and each of the sensor units includes a strain generating member having two or more contact fixing segments, that are adapted to be fixed to the outer diametric surface of the stationary member, and two or more sensors fitted to the strain generating member for detecting a strain appearing in the strain generating member; and in which a radial load estimating section is provided for estimating a radial load, acting in a direction radially of the wheel support bearing assembly, from the difference between respective output signals of the sensors in those two sensor units of the sensor pair and an axial load estimating section is also provided for estimating an axial load, acting in a direction axially of the wheel support bearing assembly, from the sum of the respective output signals of the sensors of those two sensor units of the sensor unit pair.

[Mode 2]

The sensor equipped wheel support bearing assembly according to a second mode 2 is a wheel support bearing assembly for rotatably supporting a vehicle wheel relative to a vehicle body structure, which includes an outer member having an inner periphery formed with double row rolling surfaces, an inner member having an outer periphery formed with rolling surfaces held in face-to-face relation with the rolling surfaces of the outer member, and double row rolling elements interposed between the respective rolling surfaces in the outer and inner members; in which one or more sensor units are provided each including a strain generating member, having two or more contact fixing segments adapted to be fixed to one of the outer and inner members, which serves as a stationary member, in contact therewith, a sensor fitted to the strain generating member for detecting a strain appearing in the strain generating member, and a sensor temperature sensor fitted to the strain generating member for detecting the temperature at a site of installation of the sensor, and in which a rolling surface temperature sensor for detecting the temperature in the vicinity of the rolling surface is provided at a circumferential location of the stationary member in the vicinity of the sensor unit, and in which a load estimating section is provided for estimating a load acting on the wheel support bearing assembly or a tire tread surface from a signal, which corresponds to a sensor output signal of the sensor unit, which has been corrected with respective outputs of the sensor temperature sensor and the rolling surface temperature sensor.

[Mode 3]

The sensor equipped wheel support bearing assembly according to a third mode 3 is a wheel support bearing assembly for rotatably supporting a vehicle wheel relative to a vehicle body structure, which includes an outer member having an inner periphery formed with double row rolling surfaces, an inner member having an outer periphery formed with rolling surfaces held in face-to-face relation with the rolling surfaces of the outer member, and double row rolling elements interposed between the respective rolling surfaces in the outer and inner members; in which a sensor unit is provided on a peripheral surface of one of the outer and inner members, which serves as a stationary member, and includes a strain generating member, having two or more contact fixing segments adapted to be fixed to the peripheral surface of the stationary member in contact therewith, one or more strain sensors fitted to the strain generating member for detecting a strain appearing in the strain generating member, and a temperature sensor fitted to the strain generating member for detecting the temperature of a site of installation of the sensor; and in which a heat insulating material is interposed between the sensor unit and an ambient air around the sensor unit and a load estimating section is also provided for estimating a load, acting on the wheel support bearing assembly or a vehicle tire, from a signal corresponding to a sensor output signal of the sensor unit which has been corrected with an output of the temperature sensor.

[Mode 4]

The sensor equipped wheel support bearing assembly according to a fourth mode 4 is a wheel support bearing assembly for rotatably supporting a vehicle wheel relative to a vehicle body structure, which includes an outer member having an inner periphery formed with double row rolling surfaces, an inner member having an outer periphery formed with rolling surfaces held in face-to-face relation with the rolling surfaces of the outer member, and double row rolling elements interposed between the respective rolling surfaces in the outer and inner members; in which a load detecting sensor unit is provided, the sensor unit including a strain generating member, having two or more contact fixing segments adapted to be fixed to the stationary member in contact therewith, and one or more sensors fitted to the strain generating member for detecting a strain appearing in the strain generating member; and in which there are provided a first load estimating section for calculating and estimating a load, acting on the wheel support bearing assembly, using an average value of an output signal of the or each sensors, a second load estimating section for calculating and estimating a load, acting on the wheel support bearing assembly, using an amplitude value of the sensor output signal of the or each sensor or the amplitude value thereof and the average value, and an output selector for switching and selecting either one of respective estimated load values of the first and second load estimating sections in dependence on a wheel rotating speed and then outputting it.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1: Outer member
2: Inner member
3, 4: Rolling surface

5: Rolling element
20: Strain generating member
21a: Contact fixing segment
21b: Cutout
22, 22A, 22B: Strain sensor
28A: Sensor temperature sensor
28B: Rolling surface sensor
29: Temperature sensor
30: Load estimating section
31, 31A: Radial load estimating section
32, 32A: Axial load estimating section
33, 33A: Axial load direction determining section
34: Output signal separator
35, 35A, 35B, 35C: Temperature corrector
36, 36A, 36B: Protective covering
44: Heat insulating material
45: Correcting section
56: First load estimating section
57: Second load estimating section
65: Output selector

What is claimed is:

1. A sensor equipped wheel support bearing assembly for rotatably supporting a vehicle wheel relative to a vehicle body structure, which comprises:
    an outer member having an inner periphery formed with double row rolling surfaces;
    an inner member having an outer periphery formed with rolling surfaces held in face-to-face relation with the rolling surfaces of the outer member; and
    double row rolling elements interposed between the respective rolling surfaces in the outer and inner members,
    in which one of the inner and outer members, which serves as a stationary member, has an outer diametric surface provided with at least three or more sensor units,
    in which each of the sensor units includes a strain generating member, having two or more contact fixing segments fixed to the outer diametric surface of the stationary member in contact with such outer diametric surface, and one or more strain sensors fitted to the strain generating member for detecting a strain occurring in the strain generating member,
    in which a load estimating section is provided for estimating a radial load, acting in a direction radially of the wheel support bearing assembly, and an axial load, acting in a direction axially of the wheel support bearing assembly, from respective output signals of the sensors of the three or more sensor units,
    in which an output signal separator is provided for separating the output signal of each of the sensor units into a direct current component and an alternating current component and then inputting them to the load estimating section, and
    in which the load estimating section is operable to estimate a load in various directions from a linear equation, in which using amplitude values of the direct and alternating current components as variables, those variables are multiplied by a correction coefficient determined for each of the loads in the various directions that are estimated for each of the variables.

2. The sensor equipped wheel support bearing assembly as claimed in claim 1, further comprising:
    a temperature sensor fitted to the strain generating member for detecting a temperature of a site of installation of the strain sensor;
    a heat insulating material interposed between the sensor unit and an ambient air in around such sensor unit; and
    a temperature corrector for correcting the sensor output signal of the sensor unit with an output of the temperature sensor; and
    in which the load estimating section estimates a load, acting on the wheel support bearing assembly or the wheel tire, from a signal which has been corrected by the temperature corrector.

3. The sensor equipped wheel support bearing assembly as claimed in claim 1, in which the load estimating section comprises:
    a radial load estimating section for estimating a radial load, acting in a direction radially of the wheel support bearing assembly, from a difference between the respective output signals of the sensors in two of the three or more sensor units; and
    an axial load estimating section for estimating an axial load, acting in a direction axially of the wheel support bearing assembly, from a sum of the respective output signals of the sensors of such two of the three or more sensor units.

4. The sensor equipped wheel support bearing assembly as claimed in claim 3, in which two of the three or more sensor units are arranged on upper and lower surface areas of the outer diametric surface of the stationary member, which correspond respectively to top and bottom positions relative to a tire tread surface and the radial load estimating section estimates a vertical load, acting on the wheel support bearing assembly, from a difference between the respective output signals of the sensors of such two sensor units.

5. The sensor equipped wheel support bearing assembly as claimed in claim 3, in which two of the three or more sensor units are arranged on left and right surface areas of the outer diametric surface of the stationary member, which correspond respectively to forward and rearward positions relative to a tire tread surface and the radial load estimating section estimates a load, expected to become a driving force, from a difference between the respective output signals of the sensors of such two sensor units.

6. The sensor equipped wheel support bearing assembly as claimed in claim 3, in which the radial load estimating section comprises a correcting section for correcting a estimated value, given thereby, with an estimated value given by the axial load estimating section.

7. The sensor equipped wheel support bearing assembly as claimed in claim 1, in which two of the three or more sensor units are arranged on upper and lower surface areas of the outer diametric surface of the stationary member, which correspond respectively to top and bottom positions relative to a tire tread surface, and
    further comprising an axial load direction determining section for determining a direction of the axial load, acting in a direction axially of the wheel support bearing assembly, from amplitudes of the respective output signals of the sensors of such two sensor units.

8. The sensor equipped wheel support bearing assembly as claimed in claim 1, further comprising a temperature corrector for correcting the sensor output signal of the sensor unit in dependence on a temperature of the wheel support bearing assembly or an ambient temperature thereof.

9. The sensor equipped wheel support bearing assembly as claimed in claim 1, further comprising:
    a sensor temperature sensor fitted to the strain generating member for detecting a temperature of a site of installation of the strain sensor;

a rolling surface temperature sensor fitted to a circumferential location of the stationary member in the vicinity of the sensor unit for detecting a temperature in the vicinity of the rolling surface; and a temperature corrector for correcting the output signal of the sensor of the sensor unit with respective outputs of the sensor temperature sensor and the rolling surface temperature sensor;

in which the load estimating section estimates the load acting on the wheel support bearing assembly or the wheel tire from a signal which has been corrected by the temperature corrector.

10. The sensor equipped wheel support bearing assembly as claimed in claim 9, in which the rolling surface temperature is employed in a number equal to the number of the sensor units employed and in which the rolling surface temperature sensor is provided in accord with the circumferential location and the phase of the sensor units in the stationary member.

11. The sensor equipped wheel support bearing assembly as claimed in claim 9, in which the temperature corrector corrects the output signal of the sensor of the sensor unit in dependence on a difference between an output of the sensor temperature sensor and an output of the rolling surface temperature sensor, and the amount of correction is determined according to a linear approximate relational equation which has been formulated beforehand using the difference between the respective outputs of the sensor temperature sensor and the rolling surface temperature sensor.

12. The sensor equipped wheel support bearing assembly as claimed in claim 2, in which the sensor units, a signal processing IC for processing the output signal of the sensors and a wiring system for the sensors and the signal processing IC are arranged on an inner side of an annular protective covering that is fitted to a peripheral surface of the stationary member, in which the protective covering has an opening defined at sites of installation of the sensor units to permit the sensor units to be exposed, and in which the opening is sealed by the heat insulating material.

13. A sensor equipped wheel support bearing assembly for rotatably supporting a vehicle wheel relative to a vehicle body structure, which comprises:

an outer member having an inner periphery formed with double row rolling surfaces;

an inner member having an outer periphery formed with rolling surfaces held in face-to-face relation with the rolling surfaces of the outer member; and double row rolling elements interposed between the respective rolling surfaces in the outer and inner members, in which one of the inner and outer members, which serves as a stationary member, has an outer diametric surface provided with at least three or more sensor units, in which each of the sensor units includes a strain generating member, having two or more contact fixing segments fixed to the outer diametric surface of the stationary member in contact with such outer diametric surface, and one or more strain sensors fitted to the strain generating member for detecting a strain occurring in the strain generating member, and in which a load estimating section is provided for estimating a radial load, acting in a direction radially of the wheel support bearing assembly, and an axial load, acting in a direction axially of the wheel support bearing assembly, from respective output signals of the sensors of the three or more sensor units, in which the load estimating section comprises:
a first load estimating section for calculating and estimating a load, acting on the wheel support bearing assembly, using an average value of the output signals of the sensors;

a second load estimating section for calculating and estimating a load, acting on the wheel support bearing assembly, using an amplitude value of the output signals of the sensors, or the amplitude value and the average value; and an output selector for selectively switching one of the loads estimated by the first and second load estimating sections in dependence on a vehicle wheel rotating speed.

14. The sensor equipped wheel support bearing assembly as claimed in claim 13, in which when the vehicle wheel rotating speed is lower than a predetermined lowermost speed, the output selector selects and outputs the load estimated by the first load estimating section.

* * * * *